(12) United States Patent
Liberman

(10) Patent No.: US 12,205,114 B2
(45) Date of Patent: Jan. 21, 2025

(54) HIERARCHICAL CONSENSUS PROTOCOL FRAMEWORK FOR IMPLEMENTING ELECTRONIC TRANSACTION PROCESSING SYSTEMS

(71) Applicant: Chicago Mercantile Exchange Inc., Chicago, IL (US)

(72) Inventor: Stanislav Liberman, Highland Park, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 260 days.

(21) Appl. No.: 17/976,266

(22) Filed: Oct. 28, 2022

(65) Prior Publication Data
US 2023/0063172 A1 Mar. 2, 2023

Related U.S. Application Data

(63) Continuation of application No. 15/646,941, filed on Jul. 11, 2017, now Pat. No. 11,514,448.
(Continued)

(51) Int. Cl.
| | | |
|---|---|---|
| *G06Q 20/00* | (2012.01) | |
| *G06Q 20/38* | (2012.01) | |
| *G06Q 20/40* | (2012.01) | |

(52) U.S. Cl.
CPC ....... *G06Q 20/401* (2013.01); *G06Q 20/3829* (2013.01); *G06Q 2220/00* (2013.01)

(58) Field of Classification Search
CPC ............ G06Q 20/401; G06Q 20/3829; G06Q 2220/00; G06Q 20/0655; G06Q 20/389; G06Q 20/405
(Continued)

(56) References Cited

U.S. PATENT DOCUMENTS

| | | | |
|---|---|---|---|
| 7,636,703 B2 | 12/2009 | Taylor | |
| 7,840,482 B2 | 11/2010 | Singla et al. | |

(Continued)

FOREIGN PATENT DOCUMENTS

| | | |
|---|---|---|
| CN | 109428349 A | 3/2019 |
| EP | 3413225 A1 | 12/2018 |

(Continued)

OTHER PUBLICATIONS

"Central Processing Unit", Wikipedia, Feb. 27, 2009, https://en.wikipedia.org/wiki/Central_processing_unit.
(Continued)

*Primary Examiner* — Dante Ravetti
(74) *Attorney, Agent, or Firm* — Lempia Summerfield Katz LLC

(57) ABSTRACT

The disclosed embodiments relate to implementation of an electronic framework, also referred to as a protocol or architecture, for electronically achieving, recording and implementing, via an electronic communications network, consensus among participants for the definition, implementation and operation of an electronic transaction processing system as a precursor to the operation of that transaction processing system in processing transactions according to the consensus among the participants. The disclosed consensus framework provides a system and protocol by which new electronic transaction processing systems may be developed and implemented among participants via an electronic negotiation and implementation of the operational rules therefore. The disclosed embodiments eliminate the need for out of band consensus negotiations and provide flexibility for participants to negotiate acceptable operational rules which can support complex transactional processes in an electronic environment.

40 Claims, 18 Drawing Sheets

Related U.S. Application Data

(60) Provisional application No. 62/360,831, filed on Jul. 11, 2016.

(58) Field of Classification Search
USPC .............. 705/16, 21, 59; 380/44, 262, 278
See application file for complete search history.

(56) References Cited

U.S. PATENT DOCUMENTS

| | | | |
|---|---|---|---|
| 7,921,046 | B2 | 4/2011 | Parsons et al. |
| 7,954,114 | B2 | 5/2011 | Chamberlain et al. |
| 8,069,102 | B2 | 11/2011 | Indeck et al. |
| 8,407,122 | B2 | 3/2013 | Parsons et al. |
| 8,458,081 | B2 | 6/2013 | Parsons et al. |
| 8,548,900 | B1 | 10/2013 | Glackin et al. |
| 8,650,645 | B1 | 2/2014 | Thompson et al. |
| 9,608,829 | B2 | 3/2017 | Spanos et al. |
| 10,015,173 | B1 | 7/2018 | Efstathopoulos |
| 10,389,692 | B2 | 8/2019 | He |
| 2004/0186803 | A1 | 9/2004 | Weber et al. |
| 2005/0149428 | A1 | 7/2005 | Gooch et al. |
| 2006/0095360 | A1 | 5/2006 | Apple et al. |
| 2006/0106707 | A1 | 5/2006 | Shetty et al. |
| 2007/0118460 | A1 | 5/2007 | Bauerschmidt et al. |
| 2008/0010183 | A1 | 1/2008 | Holmes et al. |
| 2008/0126853 | A1 | 5/2008 | Callaway et al. |
| 2009/0012892 | A1 | 1/2009 | Biase |
| 2009/0171723 | A1 | 7/2009 | Jenkins |
| 2009/0182683 | A1 | 7/2009 | Taylor et al. |
| 2009/0287628 | A1 | 11/2009 | Indeck et al. |
| 2010/0153254 | A1 | 6/2010 | Shalen |
| 2010/0241758 | A1 | 9/2010 | Oddie et al. |
| 2011/0047098 | A1 | 2/2011 | Erlanger |
| 2011/0145447 | A1 | 6/2011 | Dimond |
| 2011/0178911 | A1 | 7/2011 | Parsons et al. |
| 2011/0178912 | A1 | 7/2011 | Parsons et al. |
| 2011/0178917 | A1 | 7/2011 | Parsons et al. |
| 2011/0178918 | A1 | 7/2011 | Parsons et al. |
| 2011/0178919 | A1 | 7/2011 | Parsons et al. |
| 2011/0178957 | A1 | 7/2011 | Parsons et al. |
| 2011/0179050 | A1 | 7/2011 | Parsons et al. |
| 2011/0184844 | A1 | 7/2011 | Parsons et al. |
| 2011/0246351 | A1 | 10/2011 | Sulavka |
| 2011/0264578 | A1 | 10/2011 | Chapman et al. |
| 2011/0320335 | A1 | 12/2011 | Gorelik et al. |
| 2012/0047062 | A1 | 2/2012 | Robinson |
| 2012/0089496 | A1 | 4/2012 | Taylor et al. |
| 2012/0089497 | A1 | 4/2012 | Taylor et al. |
| 2012/0095893 | A1 | 4/2012 | Taylor et al. |
| 2012/0185449 | A1 | 7/2012 | Gould et al. |
| 2012/0246052 | A1 | 9/2012 | Taylor et al. |
| 2012/0259757 | A1 | 10/2012 | Nager |
| 2012/0290460 | A1 | 11/2012 | Curry, Jr. et al. |
| 2013/0030963 | A1 | 1/2013 | Cramer et al. |
| 2013/0226764 | A1 | 8/2013 | Battyani |
| 2014/0143121 | A1 | 5/2014 | Stevens |
| 2014/0279342 | A1 | 9/2014 | Maynard |
| 2014/0289094 | A1 | 9/2014 | Gaber et al. |
| 2015/0127512 | A1 | 5/2015 | Studnitzer et al. |
| 2016/0104346 | A1* | 4/2016 | Ovalle ................ G07F 17/3223 463/17 |
| 2016/0192110 | A1 | 6/2016 | Yang et al. |
| 2017/0132626 | A1 | 5/2017 | Kennedy |
| 2017/0149882 | A1 | 5/2017 | Roy |
| 2017/0180134 | A1 | 6/2017 | King |
| 2018/0039667 | A1 | 2/2018 | Pierce et al. |
| 2018/0183897 | A1 | 6/2018 | Singhal |
| 2018/0255599 | A1 | 9/2018 | Chau |

FOREIGN PATENT DOCUMENTS

| | | |
|---|---|---|
| WO | 2008/154306 | 12/2008 |
| WO | 2011/134975 | 11/2011 |
| WO | 2012/079041 | 6/2012 |

OTHER PUBLICATIONS

"Data Transmission", Wikipedia, Feb. 1, 2009, http://web.archive.org/web/20090201120014/http://en.wikipedia.org/wiki/Data_transmission.
"Distributed Concurrence Ledgers", Whitepaper, Packet Dynamics LLC, Feb. 23, 2016, 7 pages.
"Ethereum", Wikipedia, 7 pages, downloaded Jun. 2, 2016, https://en.wikipedia.org/wiki/Ethereum.
"Ethereum", Wikipedia, Jun. 2, 2016, https://en.wikipedia.org/wiki/Ethereum.
"High Performance Trading—Deployment of Leading Edge Technology Thinking", Argon Design, 2013, 2 pages.
"Logic Components", Oklahoma State University, SAS Institute Inc., Jan. 8, 2007, http://web.archive.org/web/20070108163801/http://www.okstate.edu/sas/v8/sashtml/qsim/chap2/sect4.htm.
"Real-time Operating System", Wikipedia, Retrieved May 19, 2013, http://en.wikipedia.org/wiki/Real-time_operating_System, 6 pages.
"Solace Message Routers and Cisco Ethernet Switches: Unified Infrastructure for Financial Services Middleware", White Paper, 2010, 15 pages, Cisco Systems, Inc.
"What is a Real-Time Operating System (RTOS)?", National Instruments, Oct. 2, 2012, 2 pages.
Benjamin Geib, "Investigating Low Latency Trading with an HT Enabled FPGA", Universitat Heidelberg, Aug. 2, 2011, 17 pages.
Bitcoin Developer Guide, obtained from https://bitcoin.org/en/develpoer-guide#block-chain, available as early as May 31, 2017.
C. Leber et al., "High Frequency Trading Acceleration Using FPGAs", International Conference on Field Programmable Logic and Applications, 2011, 317-322.
Cisco Systems, Inc., "Design Best Practices for Latency Optimization", 1992-2007, 8 pages.
Corvil, "Nanosecond Latency Management", Whitepaper, 2011, 10 pages.
Digitial Asset's proposed code contribution to the Linux Foundation's Hyperledger Project written in Java and Scala, Digital Asset, 5 pages, retrieved on Mar. 31, 2016, https://github.com/DigitalAssetCom/hlp-candidate.
Dr. Gideon Greenspan, "MultiChain Private Blockchain—White Paper", Coin Sciences Ltd, 2015, 17 pages.
Ethereum Project, Ethereum, 12 pages, downloaded Jun. 2, 2016, https://www.ethereum.org/.
Gavin Andresen, "Blockchain Rule Update Process", Apr. 10, 2012, 7 pages, https://gist.github.com/gavinandresen/2355445.
Gendal, "Introducing R3 Corda™: A Distributed Ledger Designed for Financial Services", Apr. 5, 2016, https://gendal.me/2016/04/05/introducing-r3-corda-a-distributed-ledger-designed-for-financial-services/.
George Howard, "Imogen Heap Gets Specific About Mycelia: A Fair Trade Music Business Inspired by Blockchain", Forbes, Jul. 28, 2015, 12 pages.
George Howard, "Imogen Heap's Mycelia: An Artists' Approach for A Fair Trade Music Business, Inspired by Blockchain", Forbes, Jul. 17, 2015, 19 pages.
Hyperledger Project, 2 pages, retrieved Mar. 31, 2016, https://github.com/hyperledger/hyperledger.
International Search Report and Written Opinion, from PCT/US2014/064001, Feb. 13, 2015, WO.
International Search Report in International Patent Application No. PCT/AU2009/000849, dated Aug. 6, 2009, 4 pages.
International Search Report in International Patent Application No. PCT/EP2011/056611, Jan. 20, 2012, 3 pages.
Leber et al., "How to Get World's Best Possible Ultra Low Latency in High Frequency Trading (Tick to Trade Method)", 2012.
Lockwood, et al., "A Low-Latency Library in FPGA Hardware for High-Frequency Trading (HFT)", 2012 IEEE 20th Annual Symposium on High-Performance Interconnects, 2012, pp. 9-16.
Low-latency.com, "Groundbreaking Results for High Performance Trading with FPGA and x86 Technologies", Newswire, Sep. 25, 2013, 2 pages.

(56) References Cited

OTHER PUBLICATIONS

McLean et al., "Demystifying Blockchain and Distributed Ledger Technology—Hype or Hero?", Morrison & Foerster, Apr. 5, 2016, 8 pages.
Open Blockchain Whitepaper, 10 pages, retrieved Mar. 31, 2016, https://github.com/openblockchain/obc-docs/blob/master/whitepaper.md.
Risca et al., "Trading Floor Architecture", Cisco Systems, 2008, 36 pages.
Robert Kowalski, "Algorithm=Logic+Control", Communications of the ACM, Jul. 1979, 13 pages, vol. 22, No. 7.
Scott Caudell, "Co-location, Performance Management and Technology Innovation for Ultra-low Latency Trading", High Performance Technologies for Trading, Apr. 2010, 5 pages, Issue 5.
The Periodic Table of Elements, The Elements Project, 1 page, retrieved Mar. 31, 2016, https://www.elementsproject.org/elements/.
The World's Fastest and Most Secure Payment System, Ripple, 4 pages, retrieved Mar. 31, 2016, https://github.com/ripple/rippled.
Tse et al., "High Frequency Trading—Measurement, Detection and Response", Trading Strategy, Dec. 6, 2012, 12 pages.
Tse et al., "High Frequency Trading—The Good, The Bad, and The Regulation", Trading Strategy, Dec. 5, 2012, 7 pages.
Wikipedia, "Real-time Business Intelligence", Retrieved May 19, 2013, 4 pages, http://en.wikipedia.org/wiki/Real-time_business_intelligence.

\* cited by examiner

1400

HIERARCHICAL CONSENSUS PROTOCOL FRAMEWORK FOR IMPLEMENTING ELECTRONIC TRANSACTION PROCESSING SYSTEMS

REFERENCE TO RELATED APPLICATIONS

This application is a continuation under 37 C.F.R. § 1.53(b) of U.S. patent application Ser. No. 15/646,941 filed Jul. 11, 2017, now U.S. Pat. No. 11,514,448, which claims the benefit of the filing date under 35 U.S.C. § 119(e) of U.S. Provisional Application Ser. No. 62/360,831 filed Jul. 11, 2016, which are hereby incorporated by reference in their entirety.

BACKGROUND

Various electronic mechanisms are used for storing data which multiple parties need to access, modify and/or maintain, including electronic ledgers and database managements systems.

A ledger may be a collection of entries (obligations, assertions, debts, credits, etc.) in a notebook or other physical or electronic form and are akin to a transaction log whereby the current "state" of a ledger may be ascertained by netting or otherwise totaling all of the entries up to the current time period. For example, "Party A loans $X to Party B" could be an entry representative of a transaction in a ledger. "Party B repays $X to Party A" may be a subsequent entry of another transaction in that ledger. The net result of these two entries is the extinguishing of the debt of B to A. Ledgers typically utilize double-entry book keeping whereby separate ledger entries, or separate ledgers, are maintained for each side (account/party) to a transaction and transactions are recorded as a pair of opposing transactions, e.g. credits vs. debits, to each respective account/party, either in the same ledger or in separate ledgers, each maintained by the respective party.

Ledgers may be held by individual parties, or ledgers may contain entries for multiple parties and be replicated/distributed amongst a variety of sources. A ledger which comprises many distributed copies may be referred to as a replicated ledger. An example of an electronic replicated ledger is the "blockchain" methodology employed by the bitcoin digital currency. Generally, a block chain, or blockchain, is a distributed database that maintains a continuously-growing list of data records, typically hardened against tampering and revision. It consists of data structure blocks which, in some implementations, hold exclusively data and both data and programs in other implementations, wherein each block stores batches of individual transactions and the results of any blockchain executables. Each block typically further contains a timestamp and information linking it to a previous block. Effectively, blockchain is an electronic public replicated ledger in which transactions, such as those involving the cryptographic currency Bitcoin, are recorded. Each of the replicated blockchains communicates with the others via a network, such as the Internet. The Bitcoin blockchain, as previously implemented, operates completely transparently, so all data is transmitted to, and is readable by, all participants in the bitcoin system. That is, each party in the bitcoin system, with some exceptions, maintains a copy of the ledger, stored by their own copy of the blockchain, in which copies of all transactions are recorded, referred to as "full replication." In the case of bitcoin, this replicated ledger makes all transactions "open transactions" and viewable by all participants on the blockchain network which is a necessary property required to prevent double spending of bitcoins, i.e., parties attempting to send the same bitcoin to multiple parties. While Bitcoin is an evolving system under continued development, this property of visibility of all transactions in prior versions of the bitcoin network is also a drawback of a blockchain, because those implementations do not allow for the confidentiality of transactions. Every participant in the bitcoin network has access to every transaction on the blockchain. This facilitates the ability to track digital assets, e.g. bitcoins. While the integrity of transactions recorded in each ledger is cryptographically protected, i.e. "signed," via a transacting party's privately held cryptographic key, if someone were to steal a blockchain/bitcoin user's private key, the thief would have all of the information necessary, e.g. the transactional record and the cryptographic key thereto, to be able to see all of the transactions to which the user is a party, and the thief would be able to create transactions using the private key without the consent of the true owner of the private key.

Using the replicated ledgers of blockchain along with cryptographically linking/chaining the transactions stored therein enable all users to ensure the reliability of the transaction data, i.e. that transactions are recorded accurately and subsequent thereto, protected from alteration, as each user has a copy of all of the transactions and any unintended alterations to a transaction, e.g. via errors or fraudulent activity, are readily detectable via both the cryptographic discrepancies within the chained transactions that would be created as well as the discrepancies that such alterations will create among the various copies of the blockchain ledger.

A database is a structured collection of information or content, typically held in a computer, e.g. stored in a memory or other storage device that can be readily accessed, managed and updated, for storing the current value or net/cumulative result of a series of transactions. As used herein, a database refers not only to the underlying data structure(s) which are used to actually contain data but also the mechanisms coupled therewith to enable access, management, updating, etc. Together, this may also be referred to as a database management system ("DBMS"). As opposed to a ledger which records a sequence of transactions, a database typically records only the net result of the performance of those transactions. While the transactions recorded in ledgers are periodically netted to determine a current state, databases reflect the current state of data as soon as a transaction has been "committed," i.e., the record in the database has been updated in manner considered to be permanent, e.g. visible to all users of that database.

Usually, the information is organized in a structured manner, i.e. using a particular format, protocol or structure for organizing and storing the data therein, and the information may be accessed, or edited via transactions, i.e. single database operations, according to a particular set of principles. In mission critical implementations where the reliability of the data stored in a database is desirable, databases may be implemented in accordance with certain properties which guarantee the reliable processing of transactions. The properties may include atomicity, consistency, isolation, and durability, commonly referred to as "ACID". Adherence to these properties by a database/DBMS helps to guarantee that database transactions are processed reliably.

Atomicity requires that each transaction be "all or nothing": if one part of the transaction fails, then the entire transaction fails, and the database state is left unchanged. An atomic system must guarantee atomicity in each and every situation, including power failures, errors, and crashes. To the outside world, a committed, i.e. completed, transaction appears (by its effects on the database) to be indivisible ("atomic"), and an aborted transaction does not happen.

The consistency property ensures that any transaction will bring the database from one valid state to another. Any data written to the database must be valid according to all defined rules, including constraints, cascades, triggers, and any combination thereof. This does not guarantee correctness of the transaction in all ways the application programmer might have wanted (that is the responsibility of application-level code) but merely that any programming errors cannot result in the violation of any defined rules.

The isolation property ensures that the concurrent execution of transactions results in a system state that would be obtained if transactions were executed serially, i.e., one after the other. Providing isolation is the main goal of concurrency control. Depending on the concurrency control method (i.e., using strict, as opposed to relaxed, serializability), the effects of an incomplete transaction might not even be visible to another transaction.

The durability property ensures that once a transaction has been committed, it will remain so, even in the event of power loss, crashes, or errors. In a relational database, for instance, once a group of SQL statements execute, the results need to be stored permanently (even if the database crashes immediately thereafter). To defend against power loss, transactions (or their effects) may be recorded in a non-volatile memory.

However, the ACID approach to database management has drawbacks. For example, most implementations of the ACID approach require that data/records in the database be locked while that data is being interacted with, e.g. modified. This may effectively serialize access to data by multiple requestors and impede any operations which are dependent thereon.

Many business applications rely upon centralized databases/DBMS's, i.e. a database under the control of single or central entity, which, because they do not feature the replicated structure of blockchain or the cryptographic chaining of transactions, are typically implemented as a System of Record. A system of record (SOR) or Source System of Record (SSoR) is data management term for an information storage system, e.g. a computer implemented database/DBMS that is designated as the authoritative data source for a given data element or piece of information. Accordingly, while other entities may maintain copies of the data stored by an SOR, in the event of dispute between the value of particular data as stored in the SOR and as stored in a copy, the value stored by the SOR will be considered the true value. The need to identify systems of record can become acute in organizations where management information systems have been built by taking output data from multiple source systems, re-processing this data, and then re-presenting the result for a new business use. In these cases, multiple information systems may disagree about the same piece of information. These disagreements may stem from semantic differences, differences in opinion, use of different sources, differences in the timing of the extraction, transformation, and loading operations that create the data they report against, or may simply be the result of bugs. The integrity and validity of any data set is open to question when there is no traceable connection to a good source, such as a known System of Record. Where the integrity of the data is vital, if there is an agreed system of record, the data element must either be linked to, or extracted directly from it. Generally, a "system of record" approach may be used where there is a single authority over all data consumers, and those consumers have similar needs.

Generally, a system of record ("SOR") model is used for recording business related data such as transactions and agreements. In a SOR model, a trusted party holds and exclusively controls records of transactions in a centralized database. Individuals or other entities place their trust in the institution that hosts/controls the SOR, or otherwise agree that the SOR is the authoritative data source. Government and government agencies, financial institutions and even private/public companies may host/control the data and the SOR. For example, banks, 401k providers, utility companies, and many of the service agencies that people or business entities transact with are the SOR for that individual's or business entity's transaction records, e.g. account balance and/or transaction history with that service or agency. In the event of a dispute as to whether data in the SOR is correct as compared to another copy of that data which may differ, the institution that holds the SOR is typically deemed to have the correct data unless there is evidence to the contrary. Alternatively, when both parties are large institutions and neither institution is the SOR (e.g. two major financial institutions, such as two banks), messages are exchanged for every transaction and at the end of a period of time, e.g. at the end of the business day, a reconciliation process is undertaken by which each party validates their mutual understanding of each transaction which "seals" the transactions and, e.g. any end of day account balance resulting therefrom. In the event of a dispute, such as due to a bug, lost message or tampering, the parties must undertake a resolution process to determine the correct results, e.g. by reviewing network communication logs and/or transactional timestamps to determine the order of events. The SOR model, and the reconciliation process, referred to as a "trust and reconciliation" process, are commonly used in the implementation of electronic financial instrument trading systems.

Financial instrument trading systems are one example of complex systems that utilize databases according to an SOR model. Generally, a financial instrument trading system, such as a futures exchange, referred to herein also as an "Exchange", such as the Chicago Mercantile Exchange Inc. (CME), provides a contract market where financial instruments, for example futures, options on futures and spread contracts, are traded among market participants, e.g. traders, brokers, etc. Futures is a term used to designate all contracts for the purchase or sale of financial instruments or physical commodities for future delivery or cash settlement, and which are traded on a commodity futures exchange. A futures contract is a standardized legally binding agreement to buy (long) or sell (short) a commodity or financial instrument at a specified price at a predetermined future time. An option is the right, but not the obligation, to sell (put) or buy (call) the underlying instrument (for example, a futures contract) at a specified price within a specified time. The commodity or instrument to be delivered in fulfillment of the contract, or alternatively the commodity, instrument or reference for which the cash market price shall determine the final settlement price of the futures contract, is known as the contract's "underlying" reference, instrument or commodity, also referred to as the "underlier." The terms and conditions of each futures contract are standardized as to the specification of the contract's underlier, the quality and quantity of such underlier, delivery date, and means of contract settlement, i.e. physical delivery or cash settlement. Cash Settlement is a method of settling a futures contract whereby the parties effect final settlement when the contract expires by paying/receiving the pecuniary loss/gain of the contract, e.g. by comparing the contract price to the market price or other reference price of the underlier at the time of settlement, related to the contract in cash, rather than by effecting physical delivery, i.e. the actual exchange of the underlying reference or commodity at a price determined by the futures contract.

Typically, the Exchange provides for centralized "clearing" by which all trades are confirmed and matched, and open positions are settled each day until expired (such as in the case of an option), offset or delivered. Matching, which is a function typically performed by the Exchange, is a process, for a given order which specifies a desire to buy or sell a quantity of a particular instrument at a particular price, of seeking/identifying one or more wholly or partially, with respect to quantity, satisfying counter orders thereto, e.g. a sell counter to an order to buy, or vice versa, for the same instrument at the same, or sometimes better, price (but not necessarily the same quantity), which are then paired for execution to complete a trade between the respective market participants (via the Exchange) and at least partially satisfy the desired quantity of one or both of the order and/or the counter order, with any residual unsatisfied quantity left to await another suitable counter order, referred to as "resting."

A "Clearing House," which is typically an adjunct to the Exchange and may be an operating division thereof, is responsible for settling trading accounts, clearing trades, collecting and maintaining performance bond funds, regulating delivery, and reporting trading data to market regulators and to the market participants. An essential role of the clearing house is to mitigate credit risk via the clearing process. Clearing is the procedure through which the Clearing House becomes buyer to each seller of a futures contract, and seller to each buyer, also referred to as a "novation," and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via a communications network. These "electronic" marketplaces, implemented by, and also referred to as, "electronic trading systems," are an alternative trading forum to pit based trading systems whereby the traders, or their representatives, all physically stand in a designated location, i.e. a trading pit, and trade with each other via oral and visual/hand based communication.

In particular, electronic trading of financial instruments, such as futures contracts, is conducted by market participants sending orders, such as to buy or sell one or more futures contracts, in electronic form to the Exchange. These electronically submitted orders to buy and sell are then matched, if possible, by the Exchange, i.e. by the Exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g. instrument, traded on the electronic trading system and generally defines or otherwise represents the state of the market for that product, i.e. the current prices at which the market participants are willing buy or sell that product. As such, as used herein, an order book for a product may also be referred to as a market for that product.

In a futures exchange both trading and clearing may operate under a Central Counter Party ("CCP") model, where the futures exchange functions as a counter party to each trade and to the clearing of each trade, referred to above as a novation. CCPs benefit both parties in a transaction because they bear most of the credit risk. In a scenario outside of a financial exchange, where two individuals deal with one another by themselves, the buyer bears the credit risk of the seller, and the seller bears the credit risk of the buyer. Conversely, when a CCP is used the credit risk that is held against both buyer and seller is coming from the CCP. One consequence of a CCP model is that all communication and transactions must flow through the CCP, i.e. the CCP is the SOR, and thus information and trading may only be as fast as the CCP may process it and transmit it out to the interested parties. Records are usually kept by the CCP in a database as the source of truth and communicated to other parties using messaging. The CCP's client, e.g. a clearing member, may further have its own database of at least a subset of these records and periodically, typically daily, may reconcile them with the CCP. Further, the customers of a clearing member may have their own database, necessitating similar reconciliation. This effectively serializes the distribution of data from the CCP to all interested parties and increases the latency thereof.

Underpinning any transaction processing system, such as the electronic trading system or Bitcoin electronic currency system describe above, which is based on electronic data storage mechanisms, such as electronic ledgers or DBMS's, is the need for consensus among the transacting participants on the rules for conducting transactions so that everyone understands how to submit, respond to and complete transactions as well as what rights they obtain and what obligations are undertaken thereby.

DETAILED DESCRIPTION

Figure 1:
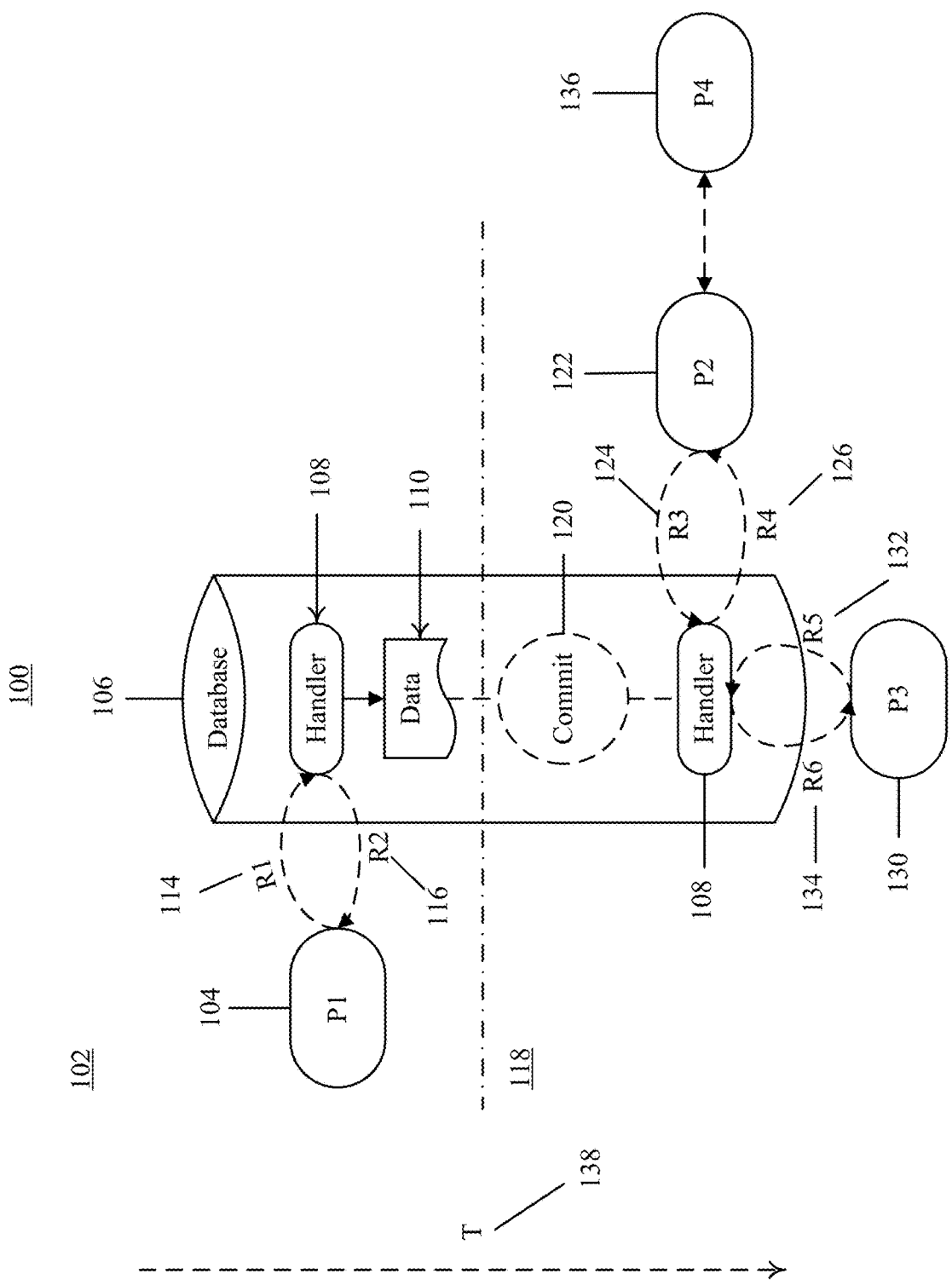
FIG. 1 depicts example operation of an illustrative electronic database.

The disclosed embodiments relate to implementation of an electronic framework, also referred to as a protocol or architecture, for electronically achieving, recording and implementing, via an electronic communications network, consensus among participants for the operation of an electronic transaction processing system as a precursor to the operation of that transaction processing system in processing transactions according to the consensus among the participants. The disclosed embodiments may be used to define, implement and operate an electronic transaction processing system which operates in accordance with rules, agreed upon via the disclosed consensus protocol, which specify participation, access, validation protocols, etc.

As alluded to above, consensus is a fundamental concept in electronic transaction processing systems, such as financial systems. Whether it be a ledger reconciliation or value transfer, agreement among the involved parties is at the core of any solution.

In the non-electronic world, parties may meet to negotiate and agree upon terms in order to achieve consensus as to the operations of a transactional system. Alternatively, one party may issue or regulate terms, such as terms of service, legal/regulatory frameworks, etc., to which interested parties must agree in order to participate in a transaction. In either case, documents, physically executed or not, may serve as the evidence of the agreement and measure of enforcement. For example, electronic trading systems are covered by user/service agreements which must be agreed to in order for one to use the system. In another example, the Bitcoin electronic currency system features operational rules encoded into the software which enables the system to operate and to which participants must inherently agree to when they use the software to transact in Bitcoin.

The disclosed consensus framework provides a system and protocol by which new electronic transaction processing systems may be developed, implemented and operated among participants via an electronic negotiation and implementation of the operational rules therefore. The disclosed embodiments eliminate the need for out of band consensus negotiations and provide flexibility for participants to negotiate acceptable operational rules which can support complex transactional processes in an electronic environment.

As will be described, the disclosed embodiments may be used to implement a wide variety of electronic transaction processing systems, such a Bitcoin-like crypto-currency or a bilateral assertion model ("BAM") for interacting with a data structure which stores data of interest to, or otherwise shared among, multiple parties, and, in particular an implementation of a BAM using a bilateral distributed ledger ("BDL"), as a substrate, having the properties of immutability (and implicit durability), irrefutability, confidentiality, recoverability, and atomicity. As will be described, the BDL provides a selectively distributed data structure, e.g. an electronic ledger, which tracks bilaterally associated assertions among pairs of participants.

Moreover, the disclosed framework may also be used to implement and operate electronic transaction processing systems which interact with other electronic transaction processing systems, including those that exist today. For example, the disclosed embodiments may be used to implement and operate a new electronic transaction processing system which interacts with the Bitcoin electronic currency system, e.g. to record transactions in the Bitcoin blockchain as will be described.

In one embodiment, the disclosed embodiments may be used to implement "smart contracts", i.e. electronic protocols intended to facilitate, verify, or enforce the negotiation or performance of a legal contract or agreement. For example, a smart contract may comprise a computerized electronic transaction protocol that executes the terms of a contract or agreement with the general objectives being to satisfy common contractual conditions (such as payment terms, liens, confidentiality, and even enforcement), minimize exceptions both malicious and accidental, and minimize the need for trusted intermediaries. Such smart contract may lower fraud loss, arbitrations and enforcement costs, and other transaction costs.

As was described above, while Bitcoin blockchain may be one solution to the many inefficiencies of the current financial system. However, Bitcoin blockchain solves very specific problems and trying to apply this solution to a different domain may fail to achieve the desired goals.

In particular, to implement a pure virtual decentralized currency system, with distributed function of issuance, double-spend prevention, irrefutable payments, and anonymity, blockchain with proof-of-work consensus is a suitable implementation.

When looking at larger financial system use cases, however, it becomes evident that properties required from such systems are quite different. Moreover, the solutions will vary greatly depending on the parties involved.

The fundamental promise of Bitcoin blockchain is a distributed consensus on the state of the ledger. There are several base assumptions and requirements for such a system, when the environment is an open and public network, in which anyone may participate and no implicit trust is possible. This environment differs significantly from the systems used to operate the capital markets, where privacy and confidentiality become primary concern.

For example, blockchain also has a unique property of being able to record the ownership of cryptocurrencies. This is made possible by the fact that the blockchain itself is the issuing authority of these digital assets. It thus represents the system of record of the ownership of each and every issued token. Any other asset that is transacted on this ledger can only represent claim ownership, unless the legal system recognizes Bitcoin as an authoritative system of record of ownership of an asset (it is noted that at least one state jurisdiction is working to allow publicly traded entities to issue and trade equity interests therein, i.e. stock, via an implementation of a blockchain. The other practical reason for this is the fact that the entity issuing the digital asset is "promising" to hold the real asset in its custody on behalf of the holder of the digital token. However, by definition of "untrust" we cannot rely on that issuer's token to represent ownership since control is not enforceable, albeit may be legally binding (if signed with a proper certificate).

Bitcoin puts forward the assumption of "untrust", which is fundamentally di f ferent from the regulated financial world where KYC/AML requirements are such that only authorized parties are allowed to participate and fair degree of trust is assumed.

The problem of double spending in digital world is when a user spends (transfers the ownership) the same asset multiple times. This is an obvious problem in an environment where making a perfect copy is trivial and free. It is akin to counterfeiting, where a fake copy of the cash bill is created and spent. While the problem of issuing a forgery is solved through hash chaining, the issue of double spend remains when there is no central party accounting for each coin.

Bitcoin solves this by providing each participant with a complete copy of the ledger they can verify all transactions against. The decision of which transactions are committed to the ledger is made by each participant (miner), when they bundle transactions into blocks and then compete for the right to add it to the chain by providing the proof-of-work. This has the effect of creating a single validating party, which is in turn kept honest by the majority of nodes in the system. This problem is specific to a ledger, which keeps track of non-fungible assets and does not wish to have to trust any other party.

In contrast, most financial systems operate using more complex constructs, so a "double spend" may be a perfectly legal operation. Smart contract built on top of a blockchain may be used to expose such an interface, but the underlying ledger will still be operating on the basis of a simple token ownership transfer.

Bitcoins are not fungible by their nature as they each represent a unique token with a specific value. Bitcoin multilateral transactions achieve fungibility, by pooling the face value of inputs into a given transaction and then distributing them to the outputs from that transaction. Any remainder is implicitly treated as fees to the miner validating the transaction. "Colored coins," which is a mechanism used to store non-bitcoin assets of blockchain, do this by creating sub-pools by color.

Another important attribute of Bitcoin transaction is lack of recourse. Once a transaction has been confirmed on the ledger it cannot be revoked even by mutual agreement in any way other than submitting a new transaction, which reverses the effects of the transaction in question. This property is achieved in blockchain through immutability and irrefutability.

These properties are desirable for most financial systems, provided there exists a protocol for correcting the ledger afterwards. Such correction need not be a mutation of an existing record, but simply an overriding entry, which clearly marks previous record as no longer valid.

The property of immutability says that an entry once recorded/stored cannot be modified, i.e. changed in an undetectable manner. In the world of technology today, there are very few truly immutable recording mediums. Anything that is stored on a media, which allows mutation, such as hard drive, flash memory, DRAM, etc. cannot be truly immutable. There are very few mechanisms for immutable storage, generally described by write-once-read-many or WORM storage. CD-ROM is an example of one, there are few others as well. Such systems are expensive and very cumbersome to use. Accordingly, immutability is typically implemented, as described below, via mechanisms for making any such changes detectable.

Transactional storage would have requirements for reasonably high performance and flexibility of use, so use of specialized hardware is not feasible for general case. Bitcoin solves the practical problem of immutability through providing tamper-evident data structure by use of Merkle Trees (a hash tree in which every non-leaf node is labelled with the hash of the labels or values (in case of leaves) of its child nodes) and hash chaining coupled with complete replication of the data. Proof of work leader election for write permission makes it infeasible to modify the ledger. While media may still allow mutation, any such change will invalidate the entirety of subsequent data and will be known to all players and they can subsequently recover from valid peers and may blacklist or exclude a malicious or faulty actor.

Irrefutability refers to a property of the system, where one cannot refute recorded data. Digital signatures make it provable that one is the owner of the token and only they are able to transfer the ownership by "sending" it to the new owner.

Bitcoin blockchain is commonly presented as the disruptor of financial world. However, a deeper analysis of both the technology and practical use cases shows that solutions need to be tailored substantially for each individual scenario. In particular, taking only the relevant pieces of the blockchain and using them as building blocks to solve specific problems of financial institutions, reveals a need for a new level of abstraction.

A simple abstraction of a data store is not sufficient though. Transactional data usually contains multiple segments/elements, which represent individual parts of a transaction, such as an agreement to buy/pay and the counter-agreement to sell/deliver, and must be committed atomically. For these scenarios, an ability to specify different consensus protocols for each of the data segments/elements may be required. Further, a single protocol may not be able to satisfy various use cases possible in such system. To alleviate these deficiencies, the disclosed embodiments provide a framework for defining one or more specific protocols, each of which defines a behavior for a consensus data store, with the ability to define di f ferent consensus protocols for different segments/elements of data, i.e. by apportioning the data store into layers, referred to as substrates defined below. Using the disclosed framework, different protocols may be defined to implement different consensus systems depending on the requirement of the application, e.g. BDL vs Bitcoin.

The disclosed embodiments, which may be referred to as "Sancus" (from the Roman god of trust, honesty and oaths), provides a framework, which may be used to implement the BAM/BDL described in more detail below, allows users to define a consensus data store or consensus data structure, where a sequence of consensus rules, also referred to as a "validation script," is applied before data, e.g. a transaction, assertion, etc., is considered valid and is persisted, i.e. stored in an immutable or pseudo immutable form. These consensus validation rules may be disseminated in advance by the proposer to all parties whose participation is required.

A data store definition may consist of multiple independent partitions, containers or layers, referred to as "substrates," each of which include a set of consensus validation rules, a specification of a network transmission protocol paired with data representation specification (referred to herein as a "commitment fabric"), may additionally include a validation script, used to validate a proposed entry, e.g. transaction, and may further include one or more delegation rules which define interaction between a substrate and another substrate. These delegation rules may also include an optional transformation rule, which will morph or otherwise transform the data, e.g. a transaction payload or transaction envelope containing a transaction payload, into a format appropriate for a destination substrate. Each of these substrates is responsible for validating one or more submitted transactions following the validation rules, specified for the substrate or attached to the transaction if any, reaching consensus according to the consensus validation rules, to store or otherwise persist those transactions in the substrate, or another substrate, and, when completed, applying the delegation rules where specified, as will be described. As will be described, substrates may be used for different purposes, such as validation, anchoring, etc. and may be referred to by reference to the function for which the substrate is being used, e.g. "validation substrate", "anchoring substrate", etc.

Morphing validity and consistency are provided by virtue of all participants going through initial consensus negotiation of the operational consensus and validation rules of the transaction processing system to be implemented. Initial negotiation involves an invitation flow, which includes an initiator, also referred to as proposer or leader, selecting or creating a substrate to submit the transaction, finding or generating a substrate definition, i.e. a set of consensus and validation rules as well as a commitment fabric, and transmitting it to all involved parties, and then collecting their acknowledgements, which serve as confirmations for accepting the rules (consensus protocol, entry validation, delegation, transformation) defined in the substrate. Once the operational rules are agreed upon, they define an electronic transaction processing system and the disclosed framework enables commencement of operation as defined thereby.

Since this framework is an abstraction, which is designed to provide a super set of features of transaction processing systems, such as Bitcoin blockchain, it will enable definition of a bona fide blockchain with all the features and properties associated with it. It will also enable definition of a variety of other distributed ledger systems, such as the bilateral distributed ledger (BDL) described above as well as other implementations of the Bilateral Assertion Model (BAM) described above. Examples of such implementations are specified below.

The disclosed framework is built around a concept of the data store being logically partitioned/arranged as a set of one or more substrates where a substrate is a logical structure combining the consensus protocol with persistence so as to be able to record data, such as transactions. The disclosed framework further includes communication media, defining an electronic communications protocol and electronic data/messaging format, for interaction among the participants, the communication media being referred to as a "commitment fabric." In one embodiment, each substrate may include one or more consensus validation rules, optionally one or more delegation rules as well as one or more entries, described in more detail below, that have been validated. As will be described, substrate participants join the substrate using invitations, i.e. sent by a "leader," and are then able to participate in consensus decisions, i.e. application of consensus validation rules to establish consensus as to storage/commitment of an entry to a substrate and data validation rules, regarding transactions, also referred to as entries or events, which reference those participants or submit new entries into the system. As will be described, multiple substrates may be arranged in a hierarchical arrangement and interact with one another via one or more delegation rules. Furthermore, each substrate may be permissioned or otherwise feature restricted participation such that only certain participants have access to certain substrates and the data/transactions contained therein but substrates may interact with one another, i.e. to store data from one to another and/or to consider or factor into validation decisions, etc. In this manner, electronic transactions may be partitioned or otherwise segmented securely and/or anonymously among participants allowing complex transactional interactions.

The following terms are defined for use herein:

Anchoring is a process of recording a validated entry in an anchoring substrate, which has the effect of sealing the current substrate.

Anchoring Definition is a descriptor containing a policy and anchoring substrate definition.

Anchoring Policy is an algorithm used to determine when an entry should be anchored.

Anchoring Substrate is a definition or reference for a substrate, in which data is recorded as final. Some of the examples are: self-current substrate, parent, or a dynamic substrate definition supplier.

Commitment fabric is the electronic medium, i.e. communications protocol and data format, used for recording completed entries. This definition is a part of substrate definition and is implementation specific, since some protocols may specify both network and local storage requirements and some may only wish to provide a database-backed store. Participants agree to the commitment fabric specification as part of agreeing on a substrate definition to confirm their ability to transmit and receive transactions from other participants as well as their ability to interpret those transactions.

Consensus protocol is a combination of the following items:
  Leader election algorithm.
  Consensus validation logic, e.g., one or more consensus validation rules, following one of the consensus types. The consensus validation logic, also referred to as a validation script, is the set of validation rules stored in the substrate and used to validate agreement decision on the entries for storage therein. Only validated entries can be transmitted to the commitment fabric as accepted for commitment to the local ledger data store. Followers can validate leader's commitments by executing the same validation algorithm.
  Validation substrate supplier.

Durable substrate is a substrate, which is used for multiple entries and can be rejoined by participants. Durable substrates can be joined without an invitation, but acceptance should still be processed by the substrate leader. Generally, a durable substrate is one whose data is recoverable, in particular because it is replicated among participants allowing one participant to recover the contents from the copy held by another participant. A durable substrate may be distinct from and ephemeral substrate, primarily by the fact that it exists independent of either the leader or the participants. Having this property, it may be joined late and provide a mechanism for catching up to the latest state of other copies. It also provides the property of not having a requirement to send the substrate invitation to each participant each time, since they may already have the invitation with the definition of the commitment fabric. This may be a result of late joining of a durable substrate, which was previously joined but connection loss occurred. Other scenarios in which one may have an invitation to join the substrate include recovery from failure or data loss or out of band substrate definition transmission.

An Entry is a transaction envelope, container or wrapper that contains the data, e.g. event, transaction, assertion, or other payload, etc. on which consensus is sought. The data may further comprise data to be interpreted or executed by an application coupled with the disclosed consensus system. The data may also comprise one or more proposed data validation rules, which once these rules are themselves are validated, are used to validate subsequently received entries, and/or the data contained therein, as described herein. An entry may further include data validation rules, referred to as explicit data validation rules, and/or may refer to other data validation rules, referred to as implicit data validation rules, which are to be applied to the data contained in the entry by a recipient thereof in order validate the entry and store it in a substrate as described herein. Implicit validation rules may define a "smart contract."

Ephemeral substrate is a substrate created for handling a single transaction validation operation at run-time. Ephemeral substrates may be invitation only. Such a substrate ceases to be valid after an operation concluded.

Foreign substrate is a substrate, which can only be used for anchoring and may be a gateway to an existing network (e.g. Bitcoin blockchain) or system (e.g. a relational database management system ("RDBMS")).

Participant is an entity participating in the system. Participants can be either leaders or followers as determined by the consensus protocol. Each participant may have a unicast mailbox for secure and private receipt of direct communications.

Participant mailbox is a unique address for a participant. It can be used to receive unicast messages directly bypassing the fabric and substrate. Essentially this refers some mechanism for communication outside of the disclosed framework/system and be used for dissemination of invitations to join a particular substrate or for other non-transaction specific or operational communications. Alternatively, or in addition thereto, a commonly accessible substrate may be created for each participant pair allowing direct communications.

A substrate is a container responsible for writing results of consensus onto the commitment fabric. As described herein, a substrate includes consensus rules which are used to validate, i.e. reach consensus, on whether to store an entry or not. Furthermore, the substrate manages the process of soliciting, receiving and recording the validations of the entries, i.e. the consensus decisions/votes, of other participants, concluding when consensus has been reached and the entry has been validated, and storing the validated entry in the substrate or an anchoring substrate, etc.

Substrate definition is a combination of at least the following:
  consensus protocol definition—the set of consensus validation rules to be applied
  commitment fabric definition
  anchoring definition—where validated entries, or hashes thereof, are to be stored.
  initial participant list Substrate Invitation is a message sent via unicast mechanism to participant mailbox or, alternatively, communicated out of band for durable substrates. It contains:
  substrate definition
  substrate secret
  permissions granted Substrate leader is a participant(s), which has the responsibility for collecting signatures and executing all the tasks for commitment of entries. In one embodiment, the substrate leader solicits validation decisions from a set of invited participants, stores those decisions in the substrate and evaluates the collection of the decisions to determine when consensus has been reached. Leader election rules are part of the consensus protocol definition included in substrate definition.

Substrate secret is a shared secret used for symmetric encryption on the substrate, based on substrate seed and participant list.

Substrate seed is the first transaction on durable substrate and may be referred to as a "genesis" transaction. The substrate seed may include either the body of the substrate definition, its hash or an Elliptic Curve Digital Signature Algorithm ("ECDSA") signature of SHA256 hash of the substrate definition. Other digital signature algorithms, as well as other hash functions can be used to define the seed value. The actual values of the algorithms used are also included in the Substrate definition.

Substrate update is a message containing the changes to the previously distributed Substrate Definition incremental to other updates. Acceptance of this update is subject to the same validation and consensus rules as were previously defined for the substrate. In other embodiments this may be referred to as a configuration transaction.

Succession order is an order of participants in which they would assume leadership of the substrate. It will be agreed upon by all substrate members using the defined consensus protocol.

Validation substrate is the substrate, which is used for entry validation procedure. It could be referred to by a substrate reference (if durable) or a substrate definition (if ephemeral).

Entries may specify which participants must be included in consensus decision, referred to as "validation substrate participants," i.e. each of those included participants will validate an entry for storage in the substrate by applying the applicable validation rules. A consensus leader is elected based on a "Leader Election" protocol included in the substrate definition. This algorithm may be further applied to the current list of participants by any member to confirm the authority of the leader. For example, in a central counterparty (CCP) use case, the algorithm may always elect CCP as the leader. For blockchain, for example, leader election may be done through the proof of work, i.e. in addition to serving as a rate limiting mechanism, the miner to first solve the proof-of-work to add a block to the Bitcoin blockchain is, by the operation thereof, the leader of that block. Other examples, as will be described, include PBFT, Round Robin, etc.

Leader election also includes establishing the succession, e.g. if a leader fails to act within an agreed time interval, participants may elect a leader from the succession order and evict or demote the previous leader in absentia. Such eviction may not always be possible, based on the rules of the substrate, which may lead to an error on the current action. A leader election algorithm need not be specified or may be null resulting in no leader and all participants being equals, i.e. each party must follow validation rules in order to commit an entry. It will be appreciated that a leader election algorithm may be specified which define that there is no particular leader.

The leader is responsible for collecting participants' decisions on the data using a specified validation substrate which includes the requisite validation rules, and then, once validated, applying delegation rules to submit the consensus result to the validation substrate or to an anchoring substrate. The process of collecting the responses, also referred to as decisions or votes, is specific to a particular commitment fabric and consensus protocol rules. A protocol, such as PBFT, RAFT, Proof-of-work, Round Robin, etc., used to determine consensus must be included in the validation substrate definition. This protocol need not be Byzantine fault tolerant based on the requirements of a specific system being built. The other participants may be referred to as "followers."

Delegation rules, which facilitate interaction among substrates and which may allow substrates to be arranged in a hierarchical arrangement, may include: sharding (a type of database partitioning that separates very large databases the into smaller, faster, more easily managed parts called data shards), aggregation, and/or pass through. When sharding, a tree of shards is composed to point to the original data. When aggregating, a tree is composed of the data entries pointing to the new composite. Such a tree can be represented by an implementation of a Merkle Tree, which has the property of enabling the confirmation of validity of the whole data, given the root hash value and Merkle tree path with hash values of the branches. Structuring the tree in such a fashion may allow all participants keep track of the original data, as well as mutated shards.

A delegation rule may specifically provide for creation, by including a substrate definition, of another substrate in the data structure which the delegation rule will operate with respect to, e.g. a substrate can include a delegation rule which creates a child substrate. Alternatively, or in addition thereto, a delegation rule may operate with respect to an existing substrate, which may be a foreign substrate, by specifying the substrate by reference thereto.

For the purposes of negotiating the consensus on the operation of transaction processing system overall, or with respect to a specific transaction/entry, a validation substrate may be used. Such a substrate can be either ephemeral or durable. In one embodiment, it will only include those participants relevant to a particular data entry that is the subject of the consensus/validation decision. If an entry contains sub-records, then a new validation substrate may be used for each of them thus forming a hierarchy of substrates, which commit the consensus decisions to the parent using delegation rules within each substrate. When a final decision is reached on the top-most substrate, it may be committed to the fabric as final.

Ephemeral substrates may be generated by an entry itself that is, for example, not associated with another substrate. In one embodiment, the disclosed system includes logic, referred to as a dynamic substrate generator or provider, which, based on entry submitted by a participant, dynamically generates a substrate, which may be ephemeral or durable, in which to store the entry once validated.

If a validation substrate is not specified, or is explicitly null, then the behavior may be defined so as to use the current substrate for validation, i.e. to validate and store consensus decisions. If a leader election algorithm is not specified, or is explicitly null, as was described above, then it may be up to each receiving participant to validate the entry. In the most basic scenario, entries are immediately committed upon submission if they pass the validation script.

Anchoring, generally, is the act of recording or otherwise memorializing a state of a substrate, e.g. the current validated entries stored therein at the time of anchoring, typically in an independent or separate, immutable and/or publicly accessible, at least to one or more of the participants, location. This may provide for tamper protection and detection of the substrate or the entries contained therein and may be referred to as "sealing" the substrate, or entries stored therein, that are "anchored." The accessible location may be another durable substrate, within the disclosed substrate, assuming it is durable, or a foreign substrate, i.e. an external data store such as the Bitcoin blockchain. In one embodiment, the process of anchoring and sealing includes generating a hash of the substrate or entries being anchored and storing this hash in the accessible location. Where the data structure comprises a blockchain, this may involve creating a hash of a block, e.g. the last block. The hash then provides for detection of tampering with the anchored substrate/entries. Once participants agree on an entry, e.g. the entry is validated, it may be anchored so as to finalize the entry. A substrate may include a delegation rule which specifies another substrate, either by defining a new substrate to be created for the purpose or by reference to an existing substrate, such as a foreign substrate, to be used for the purpose of anchoring validated entries of that substrate.

An anchoring substrate may be specifically defined for the purpose of storing anchored entries/substrates and/or the hashes thereof. In one embodiment, a current substrate to which a transaction/entry is broadcast by a participant may be used to anchor that transaction/entry, e.g. implicitly as the broadcast makes the transaction/entry known to other participants and therefore cannot be concealed or denied by the participant who broadcast it. Each receiving participant may record the broadcasted entry/transaction and rely upon it as proof of commitment of the participant who broadcast it. In one embodiment, a parent substrate may include a delegation rule to create a substrate for the purpose of storing entries and then anchoring those entries in the parent substrate.

A foreign substrate may be used for anchoring purposes. Such a substrate definition may include a list of participants (or a single participant), which can act as gateway to an existing system of record and may send back confirmation of commitment.

In one embodiment, a validation substrate may be used which stores the consensus validation rules and the entry pending validation as well as the consensus decisions/votes, rendered, based on validation rules, of each validation substrate participant. Once consensus is reaches, e.g. all of the affirming decisions of the participants have been received, delegation rules are applied to determine what result is to be stored in an anchoring substrate.

The following consensus types may be defined for use by the disclosed embodiments:

Unilateral assertion (Leader) wherein transactions only require a single signature from the leader and can only be submitted by the leader. Other participants can only observe.

Co-signed assertion (Leader+n co-signers) wherein transactions require signatures from both the leader and one or more other parties, but can only be submitted by the leader.

Federated agreement (n of m) wherein transactions require n out of m signatures, where m in the set of all signatories assigned to data. New transactions can be submitted by anyone. A bilateral agreement is a specific case of this consensus type.

In one embodiment, the following process may be used to create a substrate:
  Step 1: System administrator comes up with substrate definition.
  Step 2: System administrator generates a substrate seed (optionally chained to parent anchor).
  Step 3: System administrator initiates the Invitation flow for the participants.

Invitations are based on the specific requirement of the consensus substrate. For example, a public ledger would use a common shared invitation, but private ledgers need to issue private specific invitations directly to the participants.

Figure 11:
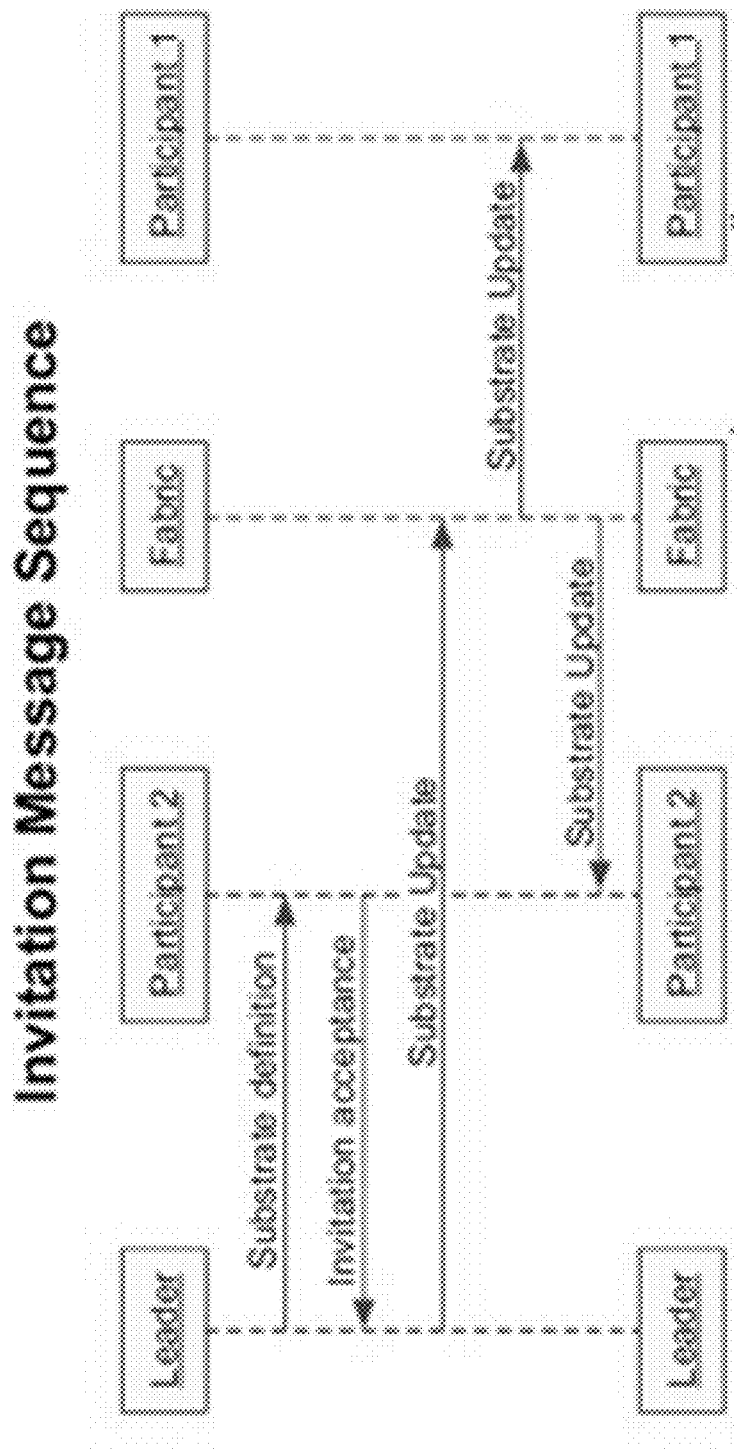
FIG. 11 shows a sequence diagram depicting one embodiment of an invitation protocol for a consensus frame work implementation.

A sequence diagram of the message flow is depicted in FIG. 11. In particular, as shown in FIG. 11:

Step 1: Substrate Leader sends substrate invitation to the participant, either to the mailbox or out-of-band.

Step 2: Participant verifies ledger by hashing the definition and confirming the authenticity of the signature on it.

Step 3: Participant subscribes to the messages from this substrate based on the invitation.

Step 4: Participant replies back to the leader with agreement to join. This message is sent with a timeout. If leader doesn't reply, participant should send it to the next candidate in succession order, which is included in the substrate definition, with the proof that they received the invitation from the previous leader.

Step 5: Leader broadcasts substrate update for the new participant as an entry referencing a previous entry by this leader or substrate seed, if there isn't one, and containing the current succession order.

Step 6: Participants listen to the broadcast for confirmation of their acceptance into the substrate as done in the previous step.

Figure 12:
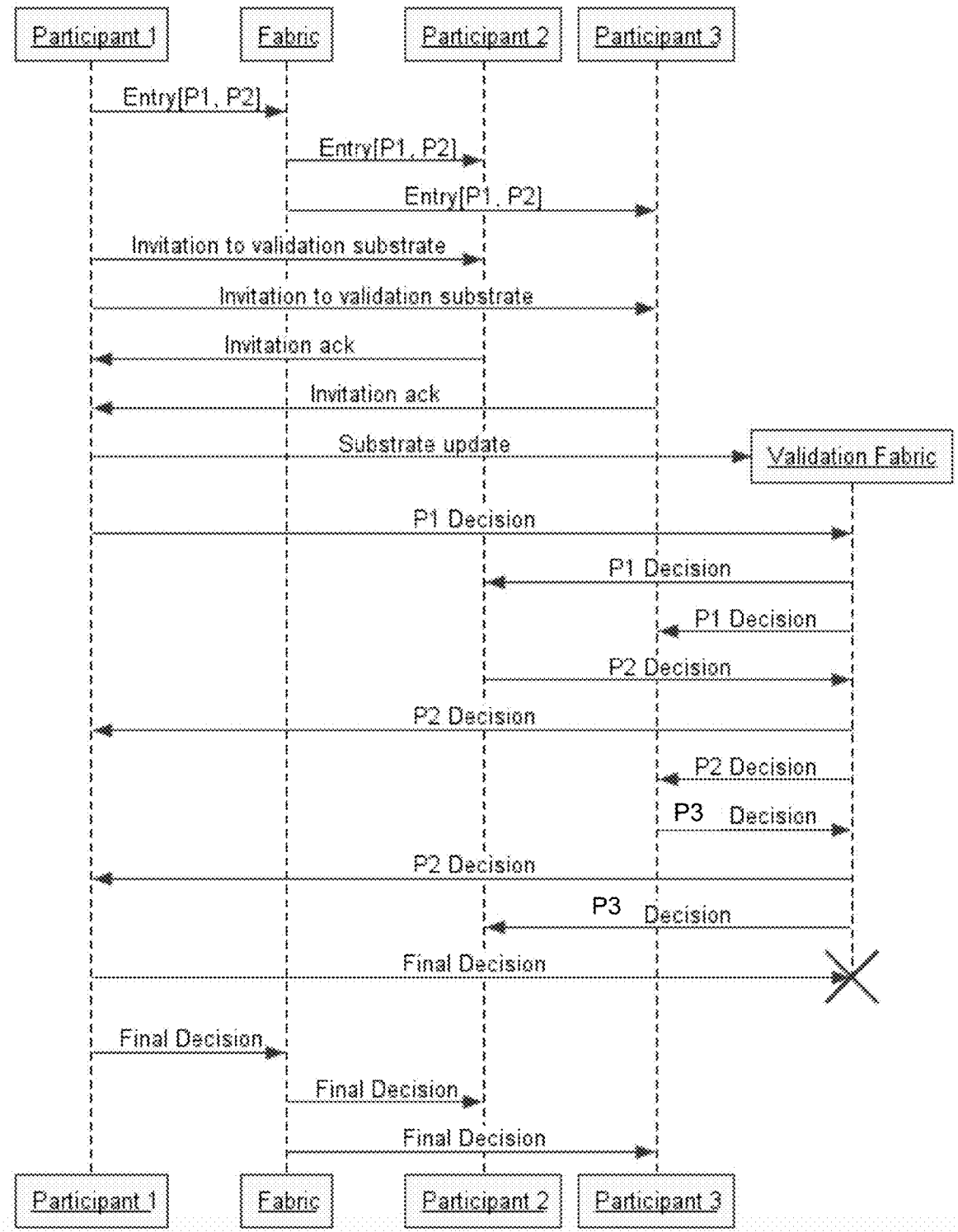
FIG. 12 shows a sequence diagram depicting one embodiment of a consensus protocol for a consensus frame work implementation.

The disclosed embodiments provide for an entry submission process. One embodiment thereof is depicted in FIG. 12 which shows a sequence diagram of the message flow for a Multilateral Agreement consensus type wherein P2 is parent leader, P1 is validation leader. In particular, the sequence shown in FIG. 12 includes:

Step 1: A participant broadcasts an entry which creates an anchoring point on the substrate.

Step 2: Each substrate participant receives the broadcasted entry and determines their interest. If interested, they apply consensus protocol of the current substrate in order to derive the validation substrate definition.

Step 3: When a participant determines that they are the leader, they initiate the substrate creation process described above, in the situation when validation substrate is ephemeral, and invitation process described above.

Step 4: If a non-leader participant doesn't see a leader assuming responsibility for the entry within a timeout period, next in succession order takes over the process.

Step 5: Once all participants have confirmed their joining, they are expected to broadcast their decision on the entry validity onto validation substrate.

Step 6: Upon collecting all required decisions and successful execution of validation logic, validation leader broadcasts the completed entry onto the substrate.

Step 7: Completed entry is broadcast to the parent substrate referencing the anchoring point of the transaction proposal.

Step 8: Parent substrate leader broadcasts commitment confirmation.

Any change to the substrate participants may trigger renegotiation of the secret, to allow locking out the evicted party. Also, a new succession order may need to be established with each update to participant list. In one embodiment, this flow can only be started by the leader, but may follow a leader eviction process. In one embodiment, the participant change process includes:

Step 1: The leader comes up with, or negotiates using Diffie-Hellman key exchange or similar algorithm, a new substrate secret and suspends processing entries until all members have rejoined.

Step 2: A new substrate is created anchored to the last committed transaction before the member change.

Step 3: An invitation flow is initiated for all new participants.

The process for late joining may be different, since an invitation has already been sent and received, and the client included in the list of parties allowed to participate in the substrate. In one embodiment, the process for late joining includes:

Step 1: The late participant sends his join acknowledgement to the perceived leader.

Step 2: The leader determines that acknowledgement is referring to an outdated substrate definition.

Step 3: If participant is still welcome, they are issued a new invitation.

The disclosed embodiments may provide for fault recovery. In one embodiment, it may be possible to recover the data from a durable substrate. This process may include:

Step 1: Send request for data to the substrate leader with the starting point for the replay request.

Step 2: Validated transactions are delivered into the participant's mailbox, potentially out of order, since leader may delegate responses to other substrate participants.

Other implementations may utilize a distributed hash table ("DHT") such as the mechanism used by the BitTorrent protocol used by BitTorrent clients to locate peers, or may use a distributed file system like Interplanetary File System ("IPFS").

The disclosed embodiments may provide for a forced change in the designated leader, i.e. leader eviction or "mutiny".

In one embodiment, mutiny may not be allowed in a setting where parent substrate members will verify the validation script anyway before accepting the entry. Whether mutiny is allowed, may be a configurable parameter of the substrate and included in substrate definition. In one embodiment, mutiny may be allowed in an invitation-only setting. A protocol may be provided to handle the situation where a majority of participants disagree with the leader. A protocol may be provided to disseminate knowledge of a disagreement as between the leader and one or more followers. Further, a protocol may be provided to identify who the leader is when participants disagree. A protocol may be provided to propagate a mutiny to higher level substrate. When the leader is one of the required signatories for the data entry and consensus cannot be reached, protocol may be provided to communicate this result to the parent substrate.

The disclosed embodiments may provide for security, including anonymity, permissioning and/or confidentiality.

Anonymity is generally unacceptable in a system with know-your-customer/anti-money laundering ("KYC/AML") regulatory requirements. Even if every entity was vetted out before being able to join, each participant needs to have irrefutable guarantees of the identity of the parties they are interacting with. The commonly appreciated alternative is "pseudonimity," whereas the identity of the participant is not known to peers not authorized, but there exists a well-known entity, which will be able to deanonymize the pseudonym in case of a dispute.

Bitcoin is fundamentally different with its support and widespread use of one time identities based on Bitcoin's own Hierarchical Deterministic addresses (referred to as wallets), where one can cheaply derive a unique unlinkable address from the master identity for a single use.

The disclosed embodiments may provide for two types of anonymity. The first type is achieved through obscurity by application of cryptographically derived identities, while the second is achieved via a byproduct of an arbitrarily strict permissioning scheme. Generally, the disclosed embodiments make anonymity irrelevant by making data available selectively only to the parties authorized to see it, as described above, using the BAM/BDL. One may still obscure the identity, but it may be an unnecessary complication.

A permissioning property of the ledger refers to the ability to restrict visibility of participants of the ledger to a subset of data. The disclosed embodiments achieve this through use of different validation substrates with their own fabrics for each of the data entries. This feature is possible to achieve on a logical level with use of encryption, however it may be also subject to a variety of attacks that such systems are vulnerable to. In one embodiment, true permissioning is achieved by delivering data only to pre-determined authorized parties, e.g. as described above for the BAM/BDL implementation.

Confidentiality of transactions is generally a desired feature when participants do not wish for other parties to know what is being transacted. This is usually done via encryption of the data. However, obscuring the data payload has a side effect of only allowing parties with the decryption key to be able to validate the data, which is not always a desirable behavior. In one embodiment, Zero Knowledge Proofs ("ZKP"), a method by which one party (the prover) can prove to another party (the verifier) that a given statement is true, without conveying any information apart from the fact that the statement is indeed true, may be utilized to offer a solution by allowing parties to validate the data without knowing the full contents.

In the absence of practical general purpose ZKP implementations, confidentiality may be efficiently managed through permissioning. As an alternative, cryptographic signatures may be leveraged to confirm the authenticity of data by signing the encrypted payload.

In one embodiment, a multilateral assertion model for a ledger may be implemented which includes a Ledger application program interface ("API") that defines a hierarchy of data structures to be recorded. At the top level there are Entries, which are containers for a collection of Records. Each Record contains a single a list of participants, Assertion, and a validation script where:

The list of participants indicates which parties will get notified that this record is being created on the ledger. Participants may choose to broadcast their signatures, as an indicator of them validating the transaction.

The assertion is the fundamental data element being recorded. It is an arbitrary set of bytes, which should be readable only to the participants interested in this entry.

The validation script is used to verify that an Entry is complete and valid according to the rules of the ledger and can be committed.

In this implementation, the following are assumed:
All participants listed on a record have access to its contents (can read the Assertion).
Assertions make no claims on double spending. As long as all parties have signed the records, their contents are considered acceptable for commitment.
Invitations are issued by CCP, where participants are invited into the specific substrate only. The master substrate is only visible to CCP and can be used to reference counterparty transactions or obligations.
Mailboxes, or identifying credentials, are assigned by the ledger administrator.

In another embodiment, a bilateral assertion model, as described herein, is implemented wherein the ledger API may be initially implemented as a "hub and spokes" model, where central counter-party (CCP) is in the middle and has a bi-party ledger with each of the participants.

In the disclosed embodiments, this bi-party ledger will be a master durable substrate implemented/operated by the CCP with a child durable substrate per counter-party. Each participant will join their own dedicated substrate and will have no knowledge of the master substrate, which will be aggregating committed records.

All records may have two and only two participants listed, one of which will always be CCP, which is the only party allowed to submit new transactions. All entries, however, will need to have signatures from the other signatory. Alternatively, a single participant can be listed on each record with CCP being an implied participant on all assertions.

Validation substrates are durable, so that customers can join them explicitly without having visibility into transactions made by other CCP clients, thus eliminating the need for payload encryption and providing ability to recover the historical data.

An example simplified master substrate definition for use with a bilateral assertion model implementation of the disclosed embodiments is shown below using JSON notation:

```
{
    "substrate-type": "DURABLE",
    "consensus": {
        "type": "UNILATERAL_ASSERTION",
        "validation-substrate-supplier": {
            "supplier-algo":
"com.cme.labs.bam.PerCustomerSubstrateSupplier",
            "substrate-type": "DURABLE",
            "consensus": {
                "type": "COSIGNED_ASSERTION"
                "validation-substrate": null
            },
            "anchoring": {
                "policy": "EACH",
                "anchoring- sub strate": "PARENT"
            }
            "fabric": "UNICAST"
        }
    },
    "anchoring": null,
    "fabric": "MULTICAST" }
```

Commitment Fabric definition for a full implementation will include detailed specifications for the specific transmission mechanism as well specification of the message format. An example of such specification could be a fully qualified URL for use of HTTPS protocol, IP address and port for TCP protocol, server information and topic if message queue system (such as AMQP protocol, or Apache Kafka, etc.) is used.

In another embodiment, a Bitcoin-like blockchain may be implemented using the disclosed consensus framework. Such system would be defined using two substrates linked using an aggregation transformation rule. In the terms of the disclosed embodiments, participants should be submitting transactions only to the "mempool" substrate, which will be responsible for disseminating verified transactions to all participants.

Miners then assemble those transactions into blocks and mine for nonce. A mined block is submitted to the substrate, where leader election is implicit based on the analysis of the block in flight—submitter of the block assumes their leadership based on the fact of being the first to propose the block with a solved proof or work puzzle. An aggregating transformation rule is then used to specify, which transactions from mempool substrate are included in the "block transaction" on Bitcoin substrate. A bitcoin protocol variant using a next generation blockchain, referred to as "Bitcoin-NG", is considerably easier to model using the disclosed embodiments, due to its explicit definition of leaders.

A Bitcoin-like blockchain may be described in the following way using YAML syntax. This configuration shows a greatly simplified configuration, which demonstrates how to model Bitcoin blockchain using the disclosed embodiments:

```
mempool:
  network: BITCOIN_TX
  participants: null
  consensus:
    leader_election: null
    type: UNILATERAL_ASSERTION
  validation: DOUBLE_SPEND
  rules:
    selection: MOST_FEES
    mutation: BUILD_BLOCK
    destination: blockchain
blockchain:
  network: BITCOIN_BLOCK
  participants: null
  consensus:
    leader_election: PROOF_OF_WORK
    type: UNILATERAL_ASSERTION
    validation: BLOCK VALIDATION
```

Consensus protocols may be implemented in the disclosed embodiments via various mechanisms, such as:

Practical Byzantine Fault Tolerance ("PBFT");
Raft consensus algorithm;
Federated Byzantine Agreement; and/or
Proof of Work/"Nakamoto" consensus.

It will be appreciated that other consensus protocols may be implemented as well.

PBFT is a solution for the Byzantine Generals problem, which arises in distributed consensus between parties, which cannot be fully trusted. PBFT is used by a large number of solutions in distributed ledger space. It can be implemented using the disclosed embodiments by specifying null leader election and minimal multilateral agreement consensus for entry validation.

Each participant will broadcast their vote on the data and will be listening for other votes. Once the number of positive votes reaches the threshold, the entry is considered valid. The formula for the necessary number of participants is 3f+1, where f is the number of permitted faults.

The disclosed embodiments further permit users to model atomic commits across heterogeneous substrates, which may act as gateways to external systems, such as FedWire, FIX Gateway, SWIFT Gateway, etc.

In one embodiment, the disclosed system may operate as follows:
1. Participant A wishes to submit a simple transaction with the following properties:
    The transaction is proposed for acceptance on a consortium ledger.
    2 of 3 parties need to endorse it. Parties B, C, and D are requested.
    Confirmed transactions are anchored on Bitcoin blockchain.
2. Consortium ledger, defined by a durable substrate X is presumed to have been already created using substrate definition XD.
3. Party A sends the transaction to X in the format specified in the substrate definition's commitment fabric descriptor, via transport identified in the same. (This creates an initial anchoring point)
4. Party A creates an ephemeral validation substrate definition YD for parties A, B, C, D, referred to as Y.
5. Party A transmits YD directly point-to-point to parties B, C, and D's mailboxes, based on pre-agreed information.
6. Parties B, C, and D transmit their acceptance of YD to Y.
7. After all acceptances have been received by Party A, it sends transaction to the substrate.
8. Party A (as a leader) awaits to receive at least 2 confirmations before sending out its own confirmation, which is considered final.
9. Following YD's delegation rules, final confirmation is transmitted to X and to Bitcoin, applying appropriate transformation rules to form the transaction.
10. After this point ephemeral substrate Y is considered to be terminated and defunct.

Figure 10:
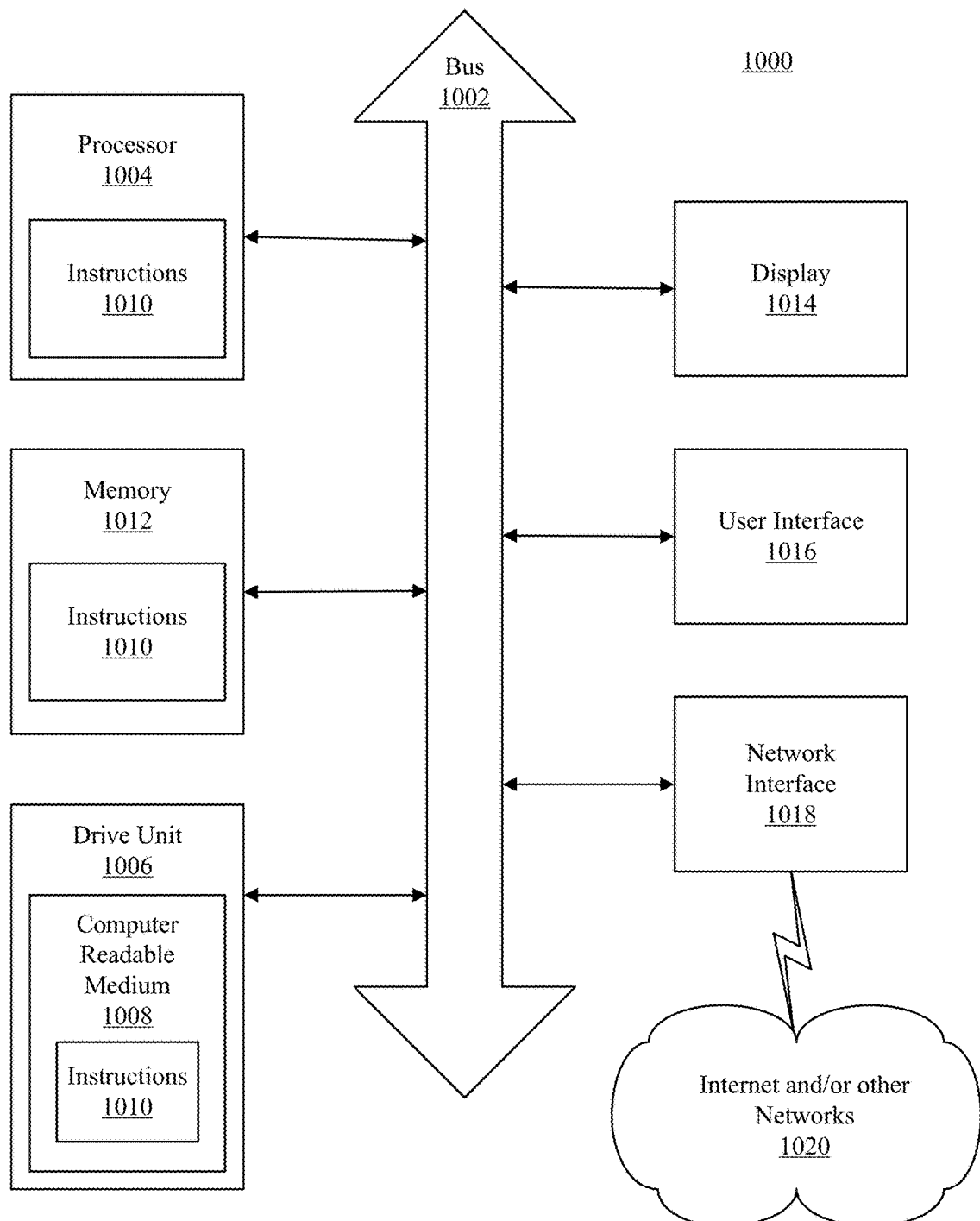
FIG. 10 shows an illustrative embodiment of a general computer system for use with the system of FIG. 4.
Figure 13:
FIG. 13 shows a block diagram of a system for defining, implementing and operating an electronic transaction processing system according to the disclosed embodiments.

FIG. 13 depicts a more detailed block diagram of a system 1300 which implements the disclosed consensus framework/protocol according to one embodiment for creating an electronic transaction processing system for processing one or more electronic data transaction messages among a plurality of participants/users via an electronic communications network coupled there between. The system 1300 may be one instance of a component of an overall system (not shown) including multiple of such components, each operated by a participant and which interact via the electronic communications network 1316 as describe herein to implement the disclosed consensus framework/protocol as described. The system 1300 includes a network interface 1302, a memory 1304, a user interface 1312 and a validation processor 1314 which is coupled with the memory 1304, network interface 1302 and user interface 1312. Multiple instances of the system 1300, each operated by a participant of the system, may interact via an electronic communications network 13016 to implement the disclosed embodiments as will be described. The network interface 1302, which may comprise the network interface 1018 described below with respect to FIG. 10, is operative to couple the system 1300 with the electronic communications network 1316, such as a public and/or private communications wired and/or wireless network, such as the network 1020 shown in FIG. 10 and described in more detail below, and facilitates communications among the system 1300 and the participants (not shown) as described herein, i.e., facilitate communication of electronic data transaction messages via the electronic communications network 1316.

The memory 1304, which may be implemented as a separate component or as one or more logic components, may comprises a centralized or distribute data storage and may be local to the system 1300 or remote therefrom and may comprise the memory 1012 shown in FIG. 10 and described in more detail below. In one embodiment, each instance of the system 1300 may include a memory 1304 which implements a portion of a collective data storage architectures as described elsewhere herein. Each portion may store a portion of data for the system 1300 or a copy of another portion. In one embodiment, the memory 1304 comprises a shared data structure 1306, such as a distributed ledger for use with a BDL, described below, or blockchain, and has a set of core rules, described in more detail below, stored therein, the memory 1304 being further operative to store one or more transaction records 1310, also referred to herein as "entries", wherein each of the one or more transaction records 1310 comprises data indicative of one of a validated rule or a validated assertion of one of the plurality of participants.

The set of core rules 1308 stored in the memory 1304 comprise the base consensus and/or data validation rules used to bootstrap or otherwise initially operate the system 1300 as described above. In one embodiment, at least one of the set of core rules 1308 includes a rule for communicating an invitation to participate to another participant via the electronic communications network 1316 and determining whether the other participant has accepted or rejected the invitation, a rule for receiving an invitation to participate from another participant and determining whether to accept or reject the invitation, or a combination thereof, as was described above. In one embodiment, at least one of the set of core rules 1308 includes a rule for communicating a proposed transaction record 1310 comprising data indicative of a consensus and/or data validation rule to another participant via the electronic communications network 1316 and determining whether the other participant has accepted or rejected the rule, a rule for receiving a proposed transaction record comprising data indicative of a consensus and/or data validation rule from another participant and determining whether to accept or reject the rule, or a combination thereof. In one embodiment, at least one of the set of core rules 1308 includes a rule for determining which of a subset of the plurality of participants is a leader participant (referred to as a leader election rule or algorithm), leader succession and/or eviction as described above. In one embodiment, at least one of the set of core rules 1308 includes a rule for validating a proposed transaction record 1310 for storage in the memory 1304, i.e. a consensus validation rule for determining agreement to the storage of the proposed transaction record 1310 and/or a data validation rule for determining validity of the transaction/data contained in the proposed transaction record 1310.

A transaction record 1310, or entry, comprises data to be stored in the memory 1304 wherein the data may include a rule, e.g. a consensus validation rule or a data validation rule, and/or an assertion. Prior to being stored, the transaction record 1310 is considered to be "proposed", i.e. proposed for storage in the memory 1304. In order to be stored in the memory 1304, as described herein, a proposed transaction record 1310 must be validated, e.g. agreed upon according to the consensus validation rules as described. Validated transaction records 1310 are then stored in the memory 1304 as described herein. It will be appreciated that proposed transaction records 1310 may also be stored in the memory 1304 temporarily as they undergo validation. To be validated, the proposed transaction record 1310 and/or the data contained therein, are assessed against the core set of rules 1308 and/or at least a subset of rules of previously validated and stored transaction records 1310. In this manner, the set of rules by which transaction records 1310 are validated may evolve to, as described herein, form complex transactional processes which implement a given transaction processing system as described. Transaction records 1310 may include a wrapper or envelope in which the data is contained. Further, the transaction record 1310 and/or the data contained therein may be encrypted and/or digitally signed. In one embodiment, encryption of the transaction record 1310 and/or data contained therein, may permit transactional anonymity among specific participants to a transaction while enabling validation of the transaction record 1310 by other participants as described elsewhere herein.

Rules which may be specified by a transaction record 1310 include rules defining participation, e.g. invitation rules, and permissions such as to control access to the portions of the memory 1304 by different subsets of the participants. Rules also include consensus and/or data validation rules, described above, which determine the conditions under which a transaction record 1310, or the data contained therein, may be validated such as specifying which and/or how many participants must approve of the proposed transaction record 1310 in order for it be validated, e.g. consensus.

Assertions include assertions of fact by one or more participants, such as an assertion of fact or truth, a proposed agreement, an authorization, license, certification, accreditation, etc., or other statement of an intention to create, modify, or remove data, e.g. from the shared data structure 1306.

The user interface 1312, which may be implemented as a separate component or as one or more logic components, such as on an FPGA which may include a memory or reconfigurable component to store logic and a processing component to execute the stored logic, or as first logic, e.g. computer program logic, stored in a memory, such as the memory 1012 shown in FIG. 10 and described in more detail below with respect thereto, or other non-transitory computer readable medium, and executable by a processor, such as the processor 1004 shown in FIG. 10 and described in more detail below with respect thereto, to cause the processor to, or otherwise be operative to operative to receive a proposed transaction record 1310 from a user/participant operating the particular instance of the system 1300. The user interface 1312, which may be implemented as the user interface 1016 described below with respect to FIG. 10, may comprise any input and/or output interface for allowing a user to interact with the system 1300, such as to make requests to modify data, and/or validate or witness/attest to such requests as described herein, such as a graphical or text based interface presented via a computer display, audio output, touch screen, mouse, keyboard, voice recognition, etc. In one embodiment, the user interface 1312 may comprise a programmatic interface such as an application program interface ("API") to which other software programs and/or devices are connected, such as via a network, those other software programs and/or devices providing the requisite interactivity to a user of the system 1300. In one embodiment, the user interface 1312 is coupled with the system 1300 via a network. Alternatively, the user interface 1312 may be directly coupled with the system 1300.

The validation processor 1314 which may be implemented as a separate component or as one or more logic components, such as on an FPGA which may include a memory 1304 or reconfigurable component to store logic and a processing component to execute the stored logic, or as first logic, e.g. computer program logic, stored in a memory 1304, such as the memory 1012 shown in FIG. 10 and described in more detail below with respect thereto, or other non-transitory computer readable medium, and executable by a processor, such as the processor 1004 shown in FIG. 10 and described in more detail below with respect thereto, to cause the processor to, or otherwise be operative to receive a proposed transaction record from the user via the user interface 1312 for storage in the memory 1304 or a request electronic data transaction message via the network interface 1302 comprising a proposed transaction record 1310 for storage in the memory 1304 and validate the proposed transaction record in accordance with each of the set of core rules and at least a subset of the validated rules of the one or more stored transaction records 1310, the validation processor 1314 being further operative to store the proposed transaction record 1310 in the memory 1304 when validated for validation of a subsequently received proposed transaction record 1310.

In one embodiment, the proposed transaction record 1310 may further include data indicative of one or more additional rules, e.g. consensus and/or data validation rules, by which the validation processor 1314 must validate the proposed transaction record 1310 in addition to each of the set of core rules and the subset of the validated rules.

In one embodiment, a transaction record 1310 may comprise data indicative of a data transformation function, and further wherein the validation processor 1314 is further operative to receive a proposed transaction record 1310 from the user via the user interface 1312 for storage in the memory 1304 or a request electronic data transaction message via the network interface 1302 comprising a proposed transaction record 1310 for storage in the memory 1304 and transform at least a portion of the proposed transaction record 1310 in accordance with each of at least a subset of the validated data transformation functions of the one or more stored transaction records 1310, the validation processor 1314 being further operative to store the transformed transaction record 1310 in the memory 1304 when validated.

In one embodiment, the shared data structure 1306 in the memory 1304 is partitioned into one or more substrates, as was described above, each of which is operative to store one or more transaction records 1310 and wherein a proposed transaction record 1310 may include data indicative of a specification of which existing substrate into which it is to be validated and stored or a specification of a new substrate to be created in the shared data structure 1306 into which it is to be validated and stored. In one embodiment, the proposed transaction record 1310 may further include data indicative of a delegation rule which defines an action to be taken with respect to another substrate different from the substrate in which the proposed transaction record is to be stored. In one embodiment, the delegation rule specifies a modification to one or more other substrates based upon validation of one or more proposed transaction records 1310 into the substrate comprising the delegation rule and/or another substrate. In one embodiment, a substrate of the one or more substrates may accessible only to a subset of the plurality of participants, the remainder of the plurality of participants not having access thereto. In one embodiment, each of the one or more substrates may store different sets of associated transaction records, i.e. the one or more substrates may form a sharded database wherein certain substrates are accessible only to certain participants in order to segregate data access. In one embodiment, a substrate may store only transaction records comprising data indicative of assertions. In one embodiment, a substrate may store only transaction records comprising data indicative of assertions of one participant. In one embodiment, a substrate may store only transaction records comprising data indicative of rules.

A substrate may be durable, e.g. replicated among multiple instances of the system 1300 so as to be recoverable if any copy thereof is lost or corrupted. Alternatively, or in addition thereto, a substrate may be ephemeral, i.e. created for a specific purposes, e.g. validating a proposed transaction record 1310, and deleted or otherwise removed when the purpose is satisfied, e.g. the proposed transaction record 1310 is validated.

In one embodiment, the one or more substrates may form a hierarchical arrangement, such as via the implementation of delegation rules which define specific interactions between specific substrates to define parent/child relationships. In one embodiment, the hierarchical arrangement comprises a Merkle tree.

In one embodiment, the rule for validating a proposed transaction record 1310 comprises a proof of work, a federated agreement, a Practical Byzantine Fault Tolerance protocol, a Raft protocol or a combination thereof. In one embodiment, the rule for validating a proposed transaction record 1310 comprises solicitation of approval from at least a subset of the plurality of participants.

Figure 14:
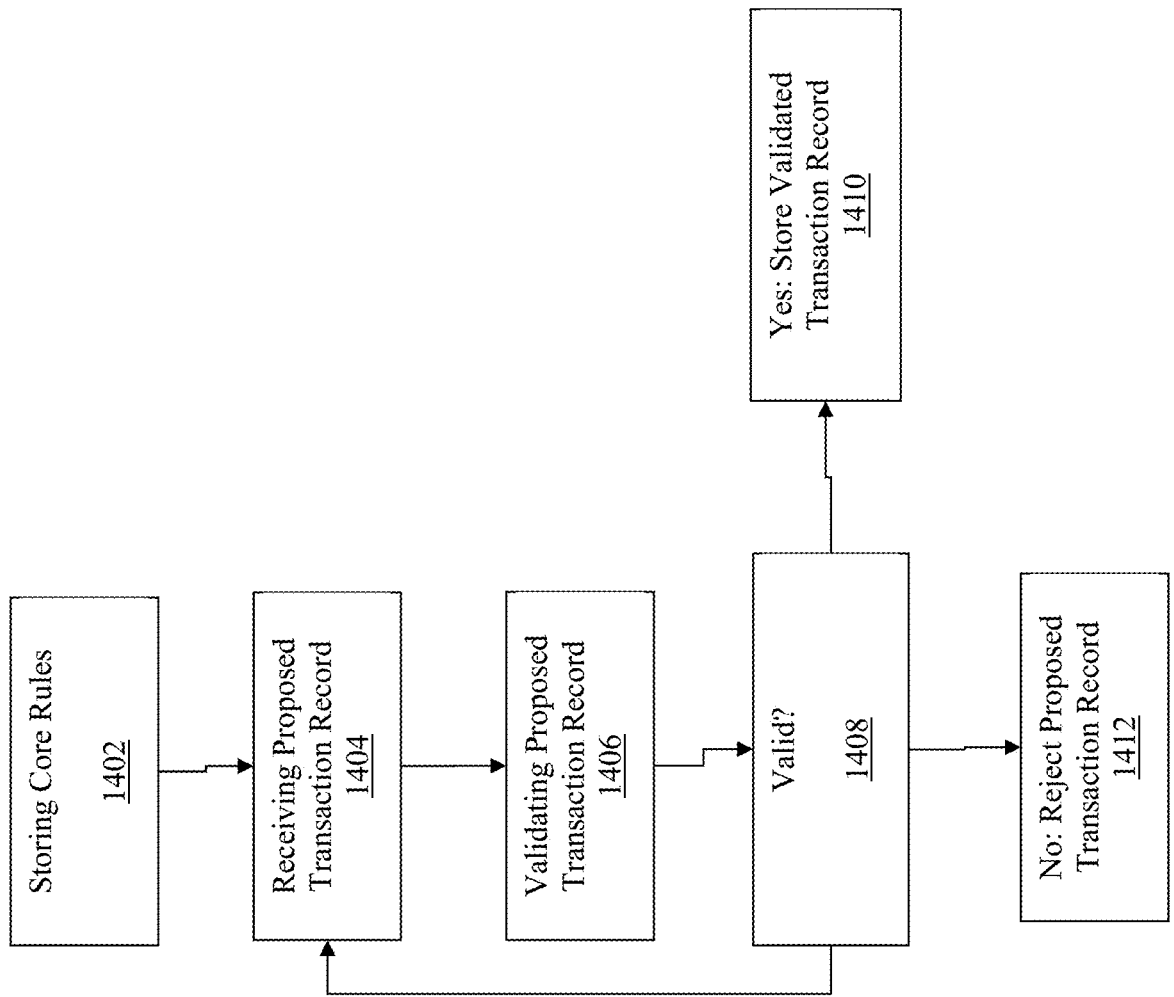
FIG. 14 shows a flow chart depicting operation of the system of FIG. 13 according to one embodiment.

FIG. 14 depicts a flow chart 1400 showing example operation of the system 1300 of FIG. 13. In particular FIG. 14 shows an example computer implemented method for creating an electronic transaction processing system for processing one or more electronic data transaction messages among a plurality of participants via an electronic communications network coupled there between. The operation of the system 1300 includes: storing, in a memory 1304 comprising a shared data structure 1306, a set of core rules 1308 stored therein, the memory 1304 being further operative to store one or more transaction records 1310 wherein each of the one or more transaction records 1310 comprises data indicative of one of a validated rule or a validated assertion of one of the plurality of participants (Block 1402); and receiving, from a user via a user interface 1312 or from another participant via the electronic communications network 1302/1316, a proposed transaction record 1310 for storage in the memory 1304 (Block 1404) and validating the proposed transaction record 1310 in accordance with each of the set of core rules 1308 and at least a subset of the validated rules of the one or more stored transaction records 1310 (Block 1406), and when validated (Block 1408), storing the proposed transaction record 1310 in the memory 1304 for validation of a subsequently received proposed transaction record 1310 (Block 1410).

In one embodiment, the shared data structure 1306 comprises a blockchain structure. In one embodiment, the shared data structure 1306 comprises a distributed ledger as described in detail herein.

In one embodiment, the proposed transaction record 1310 may further include data indicative of one or more additional rules by which the validating must validate the proposed transaction record 1310 in addition to each of the set of core rules and the subset of the validated rules.

In one embodiment, a proposed transaction record 1310 is digitally signed by the participant from which the proposed transaction record originated.

In one embodiment, a contents of a proposed transaction record 1310 is encrypted.

In one embodiment, the proposed transaction record 1310 may comprise data indicative of a data transformation function, and further wherein subsequent to receiving a proposed transaction record 1310 from the user via the user interface 1312 for storage in the memory 1304 or a request electronic data transaction message via the network interface 1302 comprising a proposed transaction record 1310 for storage in the memory 1304, the validating further comprises transforming at least a portion of the proposed transaction record 1310 in accordance with each of at least a subset of the validated data transformation functions of the one or more stored transaction records 1310, the validating further comprising storing the transformed transaction record 1310 in the memory 1304 when validated.

In one embodiment, the shared data structure 1306 of the memory 1304 is partitioned into one or more substrates, each of which is operative to store one or more transaction records 1310 and wherein a proposed transaction record 1310 may include data indicative of a specification of which existing substrate into which it is to be validated and stored or a specification of a new substrate to be created in the shared data structure 1306 into which it is to be validated and stored.

In one embodiment, wherein the proposed transaction record 1310 may further include data indicative of a delegation rule which defines an action to be taken with respect to another substrate different from the substrate in which the proposed transaction record 1310 is to be stored.

In one embodiment, wherein the delegation rule specifies a modification to one or more other substrates based upon validation of one or more proposed transaction records 1310 into the substrate comprising the delegation rule and/or another substrate.

In one embodiment, wherein a substrate of the one or more substrates may accessible only to a subset of the plurality of participants, the remainder of the plurality of participants not having access thereto.

In one embodiment, wherein each of the one or more substrates may store different sets of associated transaction records.

In one embodiment, wherein a substrate may store only transaction records comprising data indicative of assertions.

In one embodiment, a substrate may store only transaction records comprising data indicative of assertions of one participant.

In one embodiment, a substrate may store only transaction records comprising data indicative of rules.

In one embodiment, a substrate may be either durable or ephemeral.

In one embodiment, the one or more substrates comprises a hierarchical arrangement. In one embodiment, the hierarchical arrangement comprises a Merkle tree.

In one embodiment, at least one of the set of core rules 1308 comprises a rule for communicating an invitation to participate to another participant via the electronic communications network and determining whether the other participant has accepted or rejected the invitation, a rule for receiving an invitation to participate from another participant and determining whether to accept or reject the invitation, or a combination thereof.

In one embodiment, at least one of the set of core rules 1308 comprises a rule for communicating a proposed transaction record 1310 comprising data indicative of a rule to another participant via the electronic communications network 1316 and determining whether the other participant has accepted or rejected the rule, a rule for receiving a proposed transaction record 1310 comprising data indicative of a rule from another participant and determining whether to accept or reject the rule, or a combination thereof.

In one embodiment, at least one of the set of core rules comprises a rule for determining which of a subset of the plurality of participants is a leader participant. In one embodiment, the set of core rules comprises a rule for further determining leader succession and/or eviction.

In one embodiment, at least one of the set of core rules comprises a rule for validating a proposed transaction record 1310. In one embodiment, the rule for validating a proposed transaction record 1310 comprises a proof of work, a federated agreement, a Practical Byzantine Fault Tolerance protocol, a Raft protocol or a combination thereof. In one embodiment, the rule for validating a proposed transaction record 1310 comprises solicitation of approval from at least a subset of the plurality of participants.

As was described above, the disclosed embodiments relate to a framework for achieving and recording consensus among parties and may be used to implement a BAM/BDL as will be described, such as by specifying the local anchoring substrate with sharding transformation rules filtering and directing data based on specified participants, as will be described. Validating bilateral substrates need to be durable to enable recovery.

Generally, with respect to implementation of a BAM/BDL, all transactions in the disclosed embodiments may be bilateral, or otherwise decomposed into component bilateral transactions, e.g. assertions, between two participants, referred to as a party and a counter-party. That is, for each data stored in the data structure, there are two interested participants having an interest in, or otherwise related to, that data, referred to as the party-participant and the counter-party participant.

In the disclosed embodiments, a party-participant's attempt, request or other indication of an intent to change data, such as the data stored in a shared data structure, e.g. to add new data or modify existing data, may be implicitly communicated to the other counter-party participants identified as being interested in that data, e.g. via a request, or other communication reflecting an opportunity, to validate the change, to obtain the counter-party participant's validation, or otherwise cause them to validate, that the requested change is acceptable, e.g. according to that participant's own rules, such as may be dictated by business logic or business rules. Where the shared data structure is characterized as being immutable, any previously stored data may not be altered and, therefore, any changes would consist of adding new data which may reflect a completely new entry or reflect intended changes/modifications to previously stored data, e.g. a contra-transaction to a previously stored transaction, etc. The data being modified or added to the data structure may be indicative of an assertion, such as an assertion of fact or truth, a proposed agreement, an authorization, license, certification, accreditation, etc., or other statement of an intention to create, modify, or remove data from the shared data structure. In the disclosed BAM/BDL, this process represents one implementation of a consensus protocol but which data modifications as bilaterally validated.

For example, communication of a participant's request or intention to change data in the data structure may cause, e.g. automatically, the counter party-participant to evaluate the change according to business logic or business rules which, as described above, may be previously agreed upon rules stored in a substrate, such as via an external program or external review process, to determine whether the change is acceptable/valid. The business logic/business rules may comprise automated and/or manually performed evaluation, calculation, and/or verification rules and/or processes which determine the acceptability of the requested change to the counter-party participant. In one embodiment, the business logic/business rules may be a simple approval of any change without any further analysis wherein the validation indicates merely that the counter-party has received and is aware of the modification. Alternatively, where the requested change relates to a calculated value, either mathematical or logical, the business rules/business logic may recalculate the value, using the same or a different calculation methodology, and compare the proposed value with the recalculated value to determine whether they are equivalent or not. The business logic/business rules may further define, where the proposed value differs from the recalculated value, an acceptable range by which those values may differ. Other business rules/business logic may validate an assertion of fact against an independent source for that fact to confirm the veracity of the assertion. Still other business rules/business logic may define subjective or objective thresholds, value ranges, or sets of values, such as for measures of risk, as a specification for when an assertion is valid or not. Business rules/business logic could also simply implement a process to confirm that the recipient received the request and/or that a user, such as an auditor, logged, reviewed or was otherwise made aware of the request.

In the disclosed BAM/BDL implementation of the consensus framework, the agreed upon and stored rules may define that if the counter-party participant validates the intention of the party to change the data, e.g. responds to the validation request approving the requested change, e.g. acceding to the assertion of fact or agreeing to the proposed agreement, the data structure is updated in accordance therewith as both parties, who are the only parties interested in that data, have approved the change. If the counter-party participant responds to the validation request disapproving of the requested change, the data structure is not modified. The requesting party-participant is notified of the result, i.e. that the requested change was made or not, via a confirmation message. This validation acts to confirm the veracity of the assertion relative to the counter-party, i.e. it is the counter-party's assertion as to whether it considers the party's assertion to be true or not, or otherwise acceptable. Accordingly, the validation, where approving the modification, may serve as a confirmation, agreement, authorization, license, certification, accreditations, etc., or in the case where the validation disapproves of the modification, it may serve to indicate that the party is wrong/mistaken, is lying, there is a disagreement, that the party is not authorized, not certified, not licensed or not accredited. It will be appreciated that the semantics of the validation depend upon the semantics of the assertion.

It will be appreciated that the counter-party participant need not receive any confirmation message as it is already aware that if it approved the change, the change will be made, and if it did not approve the change, the change will not be made. In implementations using a shared data structure maintaining a single copy of the data to which all participants have access, each data record in the data structure may include specific and unique permissions defining which participants may access data stored therein, e.g. defining which participants may be permitted to attempt or otherwise request a modification the data in that particular data record and which other participants have an "interest" therein and should be notified as described above, where the permissions may vary for each data record in the data structure. It will be appreciated that such a shared data structure may be maintained by either party, or maintained separate therefrom, in such a manner as to provide the requisite access to parties to attempt to make modifications and receive implicit communications related thereto, as described. Exemplary implementations are described herein. If, in one implementation, the party and the counter-party participant were each maintaining their own copy of the data, the counter-party may reliably update this copy based on its response, i.e. be assured that its copy reflects the same state as the copy of the data structure maintained by the party, and avoid any need to later reconcile this copy.

In one embodiment, assertions which are rejected or otherwise disapproved of by the counter-party participant are not stored or otherwise reflected in the data structure. Alternatively, the proposed assertion, along with data indicative of the rejection or disapproval by the counter-party participant, are stored in the shared data structure to, for example, provide a record thereof. As used herein, an approved request to change data in the data structure may be referred to as making the requested change "visible" whereas a disapproved/rejected change is not made visible, wherein visibility refers the logical interpretation of the data stored or not stored in the data structure along with any additional data indicative of the approval or disapproval thereof.

As was explained above, in an electronic trading system, a central counter party ("CCP"), subsequent to the matching of an offer to trade with a suitable counter offer thereto, e.g. during the clearing process, novates itself into each trade, e.g. becomes the counter party to each side of the trade, specifically, the CCP becomes the buyer to the selling trader, and the seller to the buying trader. Accordingly, for example, in an implementation of the BAM, using the BDL as described below, or otherwise, for use by a CCP of an electronic trading system, each novated transaction may be considered a bilateral assertion, reflecting the obligation, to buy or sell, undertaken by the trader to the CCP, made by the CCP to the trader, or clearing member, for that side of the trade.

For example, a CCP may electronically implement three logical ledgers, each ledger represented by a durable substrate, using the disclosed BAM functionality, as agreed upon using the disclosed consensus framework/protocol, for each of primary clearing functions: an electronic obligation ledger, e.g. for front end clearing, accessible by the CCP as well as the clearing members and their front end clearing systems to implement trade capture for new trades, amended trades and canceled trades, i.e. to essentially maintain a running tally of obligations; an electronic position ledger which records the netted tally of novated obligations, i.e. as between the CCP and each trade participant, e.g. takes information from the obligation ledger and maintains a netted tally, i.e. an overall net obligation for each of the parties and the central counter party; and an electronic cash ledger integrated with banks and/or clearing members and their back-end clearing systems that holds the netted cash obligations obtained by calculating risk and margin requirements as well as crediting and/or debiting margin accounts against the participants' financial accounts, e.g. maintains a running tally of all money that is to be transacted among the counter parties, e.g. to meet obligation, margin/risk and settlement requirements, and may take information from the position ledger.

It will be appreciated that two or more these logical ledgers, e.g. the electronic obligations ledger and electronic positions ledger, may be implemented in a single instance of the BAM shared data structure to which all parties are participants as described herein, with each logical ledger being implemented via specific assertion types among specific participants. Alternatively, separate implementations of the BAM may be implemented for each logical ledger. Each of these logical ledgers, for example, permits a clearing member to make an assertion regarding their perception of a result of trade-related function/operation, or a modification to a trade-related result, subject to validation by the CCP, as described herein, whereby such validation implicitly updates the records stored by both parties, avoiding, for example, a request/response message exchange and/or periodic reconciliation. In the case of the electronic cash ledger, additional parties such as banks and/or other financial institutions may be participants so as to validate or be notified of financial obligations undertaken by parties with respect to funds maintained on account for those parties by the banks/financial institutions and may facilitate fund transfers between those accounts the accounts maintained by the central counterpart in satisfaction of those obligations.

In particular, regarding the electronic cash ledger, the integration with, i.e. participation in the disclosed BAM/BDL by, financial institutions, such as banks and other funding sources, may enable direct movement of money in response to a cash obligation posted by the CCP on the electronic cash ledger. Financial institutions, as participants on the BAM/BDL as described herein, may respond to obligations, i.e. assertions thereof, posted to the cash ledger by moving the monies and posting back, e.g. via validation or a counter-assertion, on the cash ledger reflective of the movement. Thus the cash ledger will be a running tally of obligations and money movements that can be netted down to a final tally on the ledger periodically or continuously by the CCP, e.g. twice a day—midday and end of day.

In another example, when an average price is necessary for a set of trades, a trader/clearing firm typically makes a request to the CCP for the average price value, which, responsive to the request, is then computed by the CCP, stored in the CCP's local database and finally communicated back to the requesting trader/clearing member. In contrast, using the BAM as described herein, a trader or clearing firm may themselves compute this average price and make an assertion thereof to the CCP which then validates the assertion, i.e. approves of the value calculated by the trader/clearing firm such as by using business rules/logic which recalculate and compare the proposed value, which, once approved, is then updated.

In another example, the BAM may be used to implement a trade register to record cleared trades and which is shared with market participants eliminating end-of-day reconciliation processes while provided a mechanism to allow market participants make post-trade modifications such as "give up", trade split and reassignment.

In another example, the BAM may be used to implement post trade management. In particular, a financial exchange, such as the Chicago Mercantile Exchange ("CME") may implement four primary functions: order matching; execution; risk management; and trade settlement—commonly referred to as trading (matching and execution) and clearing (risk management and settlement). As was discussed elsewhere herein, the clearing function is typically performed is by novating the trade i.e. CME inserting itself in the middle of a BUY/SELL agreement and becoming the buyer for the seller and seller for the buyer for matched trades.

Once a novation is performed with regards to a particular matched trade, there may only be certain types of changes allowed to that trade. For example:
1. Change to specific attributes like account/origin (Give Up), price (Average Pricing), customer type indicator etc.;
2. Combining of several trades into one (Compression); or
3. Taking a single trade and splitting it into many and assigning it to various other parties (Allocate and Claim).

For unmatched trades, i.e. offers or orders to trade, in comparison, more aspects, e.g. trade attributes, of the trade may typically be modified subsequent to submission of the trade, so that it eventually results in a matched trade, such as the trade order may be canceled, or parameters of the trade order, e.g. price or quantity, may be modified.

Changes to a matched/novated trade directly change the trade in the data store in which the trade record for that trade is stored in the clearing systems, i.e. they are anchored in a substrate defined therefore, as described above. Whereas in prior systems, such changes would be made via a request by the clearing member/market participant and a response thereto from the exchange, using the BAM as described herein, the above post trade modification functions no longer rely on a request/response interaction, e.g. a clearing member submits a request for Average Pricing, CME performs the requisite computations and sends a response back or a clearing member request a modification to a trade, CME performs the modification and sends back a confirmation indicative thereof. Instead, using a BAM implementation of the disclosed consensus framework, as described herein, the clearing member directly changes the trade record to, for example, reflect their computation of the average price or the trade modification they wish to make, and the BAM, via the described consensus protocol, takes care of obtaining the counter-party validation, e.g. CME in the case of average pricing, or the other party to the trade in the case of and Allocate and Claim operation, and synchronizes the data stores of both the exchange and the interested parties maintaining copies of those trade records.

With regards to position management, trades are usually netted down into buckets in a manner similar to a bank computing and end of day balance for a bank account. Such netting may help with periodic reconciliation between the exchanges data store and a copy thereof maintained by a clearing member, i.e. a clearing member may simply compare the trade count and netted dollar value to determine if their data is in sync with CME for the account. This netting function is referred to as "Positions Management." Clearing firms typically have multiple position accounts with each position account typically being subject to the margin requirements. Further clearing members typically maintain, e.g. as required by regulations, a "house" account, i.e. an account used by the firm to manage its own money, separate from their customers' accounts, i.e. the accounts that are used to manage the clearing firm's customer's money.

Clearing firms may apply functions to these position accounts which result in changes thereto. For example, a common activity performed by a clearing firm on a position account is PCS (Positions Change Submission) which may be used to offset opposing positions held by the same entity as known to the clearing firm. For example, consider a position account that holds 100 Long×60 short for a particular product where the clearing firm determines that 20 of the Longs can be offset against 20 Short because they actually belong to the same entity (which the exchange may never know where it does not have visibility into the customers of clearing members), the clearing member may submit a PCS request to make 100 L×80 S into 80 L×60 S.

Effectively this too is an attribute change on a positions record in the positions database and may be implemented using the BAM/consensus protocol as described herein. For example, applying the BAM, the clearing member simply updates their data store and waits for the BAM process to sync up to the exchange, e.g. via the BDL as described herein. The exchange may simply validate that 100−80=80−60.

It will be appreciated that the BAM implementation of the consensus framework may be used to implement any bilateral transactional environment featuring a maker of assertions, e.g. in any issuer/issuee environment, including, but not limited to, assertions as to agreements between parties and assertions of authorization, license, certification or accreditation by one party to another, or between two parties for the benefit of a third party beneficiary. This may be referred to as an "Internet of Assertions" or "IoA." That is, one party may make an assertion to be validated by a counter party for the purpose of evidencing such a validation to a third party.

For example, an authorizing, certifying, licensing or accrediting authority, such as an industry, regulatory, governmental or educational authority, may use the BAM to issue an authorization, license, certification or accreditation, such as a driver's license, professional or business license, visa, passport, diploma, etc., on behalf of one party to another party. Effectively, as described elsewhere herein, the authority may use the BAM to update a shared database to indicate the assertion of the fact that they have issued the authorization, license, certification or accreditation to a particular party or entity. The other interested parties to that data may be parties which are seeking to know or validate that the particular party or entity is in fact authorized, licensed, certified or accredited by the authority.

Alternatively, a party purporting to be authorized, licensed, certified, or accredited by an authority makes an assertion as such by modifying data in the shared data structure to which the authority is an interested party whereby the authority validates, or not, the modification effectively confirming whether or not the party purporting to be authorized, licensed, certified or accredited by the authority is in fact so certified/accredited.

In another example implementation, BAM may be used to implement financial transactions where, for example, a party makes an assertion that they have available funds or credit in an account maintained by a financial institution. The financial institution's validation of that assertion then acts to confirm the availability of funds or credit. Subsequent assertions can then be made that the party has transferred funds to a receiving party or otherwise withdrawn funds resulting in a reduced balance. In another example, a mortgage applicant, e.g. a buyer of real property, may make an assertion to a financial institution comprising statements as to the applicant's qualifications, e.g. their responses to a mortgage application/questionnaire, wherein the financial institution, subsequent to reviewing the assertions against their business logic/rules for lending, validates the assertions, the validation being indicative of the availability of funds. During the closing process, the validation may then further trigger disbursement of the funds, such as via a subsequent assertion by the buyer to the seller establishing the payment.

The BAM may be implemented within devices and the transaction processing systems those devices interact with. For example, a user may have a "driver's license" app on their mobile device. To apply for driver's license, the user may use the app to fill out an application and the application is sent as an assertion, or set of assertions, to the licensing authority. Upon receipt—the licensing authority signs off on the application acknowledging acceptance. They then issue a related assertion offering a date for testing which when accepted and countersigned by the requestor, finalizes the testing date. Upon passing the test on the date—a related assertion is issued, the actual license and its acceptance (after checking DOB, Name etc.) is communicated back via a signature. At this point the app will have a signed assertion that indicates that it is the license. The license can be presented as an image, QR code, or other presentation, when requested from the app. The signature from the licensing authority is sufficient at this point to validate the license and its attributes. Alternatively, when the user is asked to show their license, they activate the app which makes an assertion that the user is validly licensed to the licensing authority's transaction processing system in which the licensing data is stored. The licensing' authority's validation of the assertion that the user is licensed is communicated to the mobile device to cause the device to display that the user is in fact validly licensed.

In another implementation, a user may utilize an automated teller machine ("ATM") to obtain currency. The ATM may make an assertion the transaction processing system of the user's financial institution that the user has sufficient funds to cover the withdrawal. Upon the financial institution's validation of the assertion, the funds are dispensed. The ATM may then make an assertion to the financial institution of the withdrawal, the validation of which confirms that the user's account has been debited.

In another implementation, a user may use a computer to access a web site whereby the computer makes an assertion to a certifying authority, e.g. a Certificate Authority, that it is accessing the true web site and not a fraudulent web site. The assertion may include a copy of the web site's digital certificate. The validation of the assertion by the certifying authority then signals to the computer that it is safe to allow the user the access the web site. The validated assertion is maintained by the computer to authorize future accesses. Should the Certificate Authority later determine that the web site is fraudulent, it may assert a revocation which the computer then validates as an acknowledgement of the revocation.

Other exemplary implementations include validating a credit rating of an entity, validating a business or professional license, confirming the state of legal judgments, warrants, etc., criminal records, health records, insurance coverage and/or claims, property ownership or transfers thereof, etc. Implementations may also be used to establish or confirm legal rights such as intellectual property rights, e.g. patent, trademark or copyrights.

In a BDL implementation of a substrate for the implementation of the BAM, as will be described, the data structure may be subdivided into portions, each of which is maintained by one of the participants to store copies of data in which they have an interest, i.e. selectively replicated. As can be seen, in the BDL implementation of the BAM, where the counter-party participant may maintain their own copy of the data in which they have an interest, the counter-party participant, upon approving of the request can immediately update any copy of the data that they have in accordance with the requested change, as it is assured that the requested change, which was submitted by the requesting party participant, has already been approved by the requesting party participant. As such, the counter-party participant's copy of the data is immediately reconciled. Herein such reconciliation may be referred to as real time or self-reconciliation or that the data structure is real time or self-reconciling, immediately reconciled, reconciled in real time or inherently reconciled. Furthermore, as data is only replicated selectively, i.e., only among the sub-divided portions of the data structure belonging to the participants which have an interest in that data, unnecessary data transmissions and replication are avoided and, as will be seen, the security of the data is thereby improved.

For example, in one embodiment, a computer implemented method for implementing a real time reconciling shared data structure is disclosed. The shared data structure may be stored in a memory, and a portion of the shared data structure may be coupled with a processor. The computer implemented method may comprise receiving a data transaction message from a participant of the plurality of participants, and determining whether the received data transaction message comprises a request data transaction message comprising data indicative of a request by the participant to modify data, e.g. modify existing data or add new data, stored in the portion of the shared data structure or a notification data transaction message comprising data indicative that a request has been made to modify data stored in another portion of the shared data structure.

If the data transaction message comprises a request data transaction message, the method may comprise identifying, based on the request data transaction message, at least one other participant of the plurality of participants to validate modifications to the data, and, for example, based thereon modify the portion of the shared data structure to indicate validation is pending. The method may comprise generating a notification data transaction message for each identified participant, the notification data transaction message comprising data indicative of the request to modify the data in the portion of the shared data structure. The method may comprise transmitting each of the generated notification data transaction messages to the associated one of the identified at least one other participants. The method further comprises receiving a validation data transaction message from each of the identified at least one other participants, each of the received validation data transaction messages comprising data indicative of a response to the request to modify data stored in the portion of the shared data structure, e.g. as indicated in the notification data transaction message. The method may comprise determining, based on the received validation data transaction messages, whether all, or at least a requisite subset, of the identified other participants have validated the request to modify the data in the portion of the shared data structure.

If all, or at least the requisite subset, of the identified other participants have validated the request to modify the data in the portion of the shared data structure, the method may comprise generating a response data transaction message to the requesting participant, or, alternatively or in addition thereto, for each of the identified at least one other participants, comprising data indicative of a confirmation of the modification to the data in the portion of the shared data structure, transmit the response data transaction message to the requesting participant and/or each of the identified at least one other participants, and modify the data stored in the portion of the shared data structure according to the request to modify the data. Conversely, if less than all of the identified other participants have validated the request, the method may comprise generating a response data transaction message to the requesting participant, or alternatively or in addition thereto, for each of the identified at least one other participants comprising data indicative that the data in the portion of the shared data structure has not been modified, transmit the response data transaction message to the requesting participant and/or each of the identified at least one other participants, and not modify the data stored in the portion of the shared data structure according to the request to modify the data.

If, however, the data transaction message comprises a notification data transaction message the method may comprise validating the request to modify data stored in the other portion of the shared data structure, and based thereon modify the portion of the shared data structure to indicate the request to modify the data in the other portion of the shared data structure and the validation thereof. Such validation may be performed, e.g. automatically upon receipt of the notification data transaction message, using external or separate business logic, business rules, external review processes, etc. The method may comprise generating a validation data transaction message comprising data indicative of a response, based on the validation, to the request to modify data stored in the other portion of the shared data structure, and transmit the validation data transaction message to the participant. In response to the validation data transaction message, the method may further comprise receiving a response data transaction message from the participant, the response data transaction message comprising data indicative of a confirmation of receipt by the participant of the validation transaction message, and determining, by the processor, whether the received response data transaction message comprises data indicative of a confirmation that the data in the other portion of the shared data structure has been modified or not.

If the response data transaction message comprises data indicative of a confirmation that the data in the other portion of the shared data structure has been modified, the method comprises modifying, by the processor, based on the confirmation data transaction message, the portion of the shared data structure, i.e. making the requested modification visible. If the response data transaction message comprises data indicative that the data in the portion of the shared data structure has not been modified, the method comprises removing, from the memory via the processor, the data stored in the shared data structure according to the request to modify the data, or otherwise storing data indicative thereof, i.e. not making the requested modification visible.

Using the disclosed consensus framework to implement the BAM results in an interactive shared data structure which utilizes implicit communications to allow any participant to make any assertion to any other participant which are validated by other interested parties via further implicit communications. A system specifically implemented in accordance with BAM and its specific consensus rules allows for recording transactions as a series of bilateral assertions. Such transactions may be recorded atomically, making sure all transactions are valid before commitment. Assertions or transactions may represent any data that is mutually acceptable. One use case for BAM could be to eliminate business level messaging, such as the request/response messages used in traditional clearing models for financial exchanges, e.g. messaging used to perform transaction confirmation and data reconciliation.

In one embodiment, the BAM implementation of the disclosed consensus framework is further implemented using a BDL in a manner which provides immutability, irrefutability, confidentiality, recoverability, atomicity, and durability.

As was described above, immutability generally means that data stored/recorded in the data structure is unable to be changed/modified, i.e. that once the data is agreed upon there can be no subsequent undetectable changes to that data. Generally, immutability is implemented by providing mechanisms which allow detection of any unapproved changes made to the stored data and further recovery of the correct state of the data.

Immutability by its nature does not ensure that a particular change to data was legitimate. Irrefutability generally means that something is impossible to deny and is therefore legitimate. When data is both immutable and irrefutable, it may be considered tamper proof, i.e. any alteration is detectable and the parties are unable to deny the legitimacy of the unaltered data. Generally, irrefutability is implemented by providing mechanisms which link data to a particular participant in an unalterable, i.e. wherein alterations a readily detectable, manner. In the disclosed embodiments, irrefutability is implemented using a public key encryption methodology where a participant signs transactions using a private cryptographic key known only to them, the signature being verifiable using the corresponding public cryptographic key. It will be appreciated that the irrefutability of a transaction may, therefore, be limited to confirming the association between a particular private cryptographic key and a transaction signed thereby but may not be dispositive of the identity of the participant who used that key, e.g. a participant's private cryptographic key may have been stolen.

By restricting the replication of data only among distributed portions of the data structure belonging the participants having an interest in that data, referred to as "selective replication," transactional confidentiality is implemented as uninterested participants will not receive copies of the data, e.g. participants would not be aware of transactions to which they are not party. As was described above, this may also be implemented via a permissioned hierarchical set of substrates. To further ensure confidentiality, cryptographic keys may be used to encrypt and/or sign transactions, i.e. cryptographically encode/sign the data stored in the data structure indicative of the transaction, between participants. In this way, to have access to a given participant's data, one would need both the data and the participant's cryptographic key. As compared to blockchain where everyone already has a copy of the data, this adds an additional level of security and may ensure greater confidentiality and confidence in the system.

Recoverability refers to fault tolerance, such as the ability to recover lost data, and preserves the integrity of the data structure. In the disclosed system, as will be described, transactions are replicated among the participants thereto. Accordingly, should a participant lose their copy of a transaction, they may recover the lost data by requesting a copy from the counter-party to that transaction. A participant's entire transactional record could be recovered by making such requests from all of participants which have been counter-parties to those transactions. As each copy of a transaction is both irrefutable and immutable, as described above, the requesting participant can be assured that is receiving an accurate reproduction of what was lost. In a multilateral implementation as will be described, using witness and/or watcher parties, i.e. non-interested third party participants which also store copies of transactions, fault tolerance may be improved via the additional redundancy provided.

The BDL, according to the disclosed embodiments, may also have the properties of atomicity and durability. Atomicity means "all or nothing," i.e. that transactions, or assertions, are only final and recorded when all parties to a transaction have agreed to proceed with the transaction. Durability means that once data is signed and confirmed by the interested participants, it is stored in each of those interested participant's portions of the data structure and may be fully recoverable locally. Since each participant that is interested in particular data stored in the data structure retains a copy of that data, that data may be thought of as durable.

Given the abovementioned properties, the disclosed embodiments may be used in various transaction processing system in place of centralized databases/DBMS's and, in particular for example, such databases which implement a system of record, such as the clearing mechanisms implemented by a Central Counter Party ("CCP") of an electronic trading system. This may, for example, be used as a source of truth for records and eliminate the need for reconciliation in a CCP model, thereby giving all parties to a transaction relatively immediate visibility into the finalized records. A distributed consensus, as will be described, may then be applied to make sure that each record has confirmations from all participants to a transaction regarding authenticity of data, and serving as a legally binding agreement to its contents. For example, a requested change to data, which does not have all authorizing cryptographic signatures may not be allowed, or otherwise considered, to be stored in the system, that is the record may exist in the data structure but it may be regarded as incomplete, unenforceable, or otherwise invalid.

While the disclosed embodiments may be used to replace a centralized database/DBMS or system of record, it will be appreciated that the disclosed embodiments could, instead be used to supplement such existing systems without necessarily replacing them. As such, the traditional operation of the centralized database/DBMS is not interrupted or affected and may still be used to service those users, e.g. legacy users, who have not adopted, or completed the adoption of, the BAM implementation. In such implementation, the assertions being made and validated may be assertions as to a net result of a change, or all prior changed, made to the database, akin to a commit operation. For example, consider Imagine a data manipulation language ("DML") operation, such as a SQL operation, on Party A's local store (INSERT/UPDATE/DELETE) via a thread in Java. The thread does not return until the change is confirmed by party B. This would be similar to having a trigger on Party A's databases that remotely modifies Party B's database accordingly but Party B's database also has a trigger that triggers a Java program that validates the changes. Upon validation, Party B's database is changed and the implicit response back to Party A's database commits the changes that Party A made in the first place hence releasing the thread.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
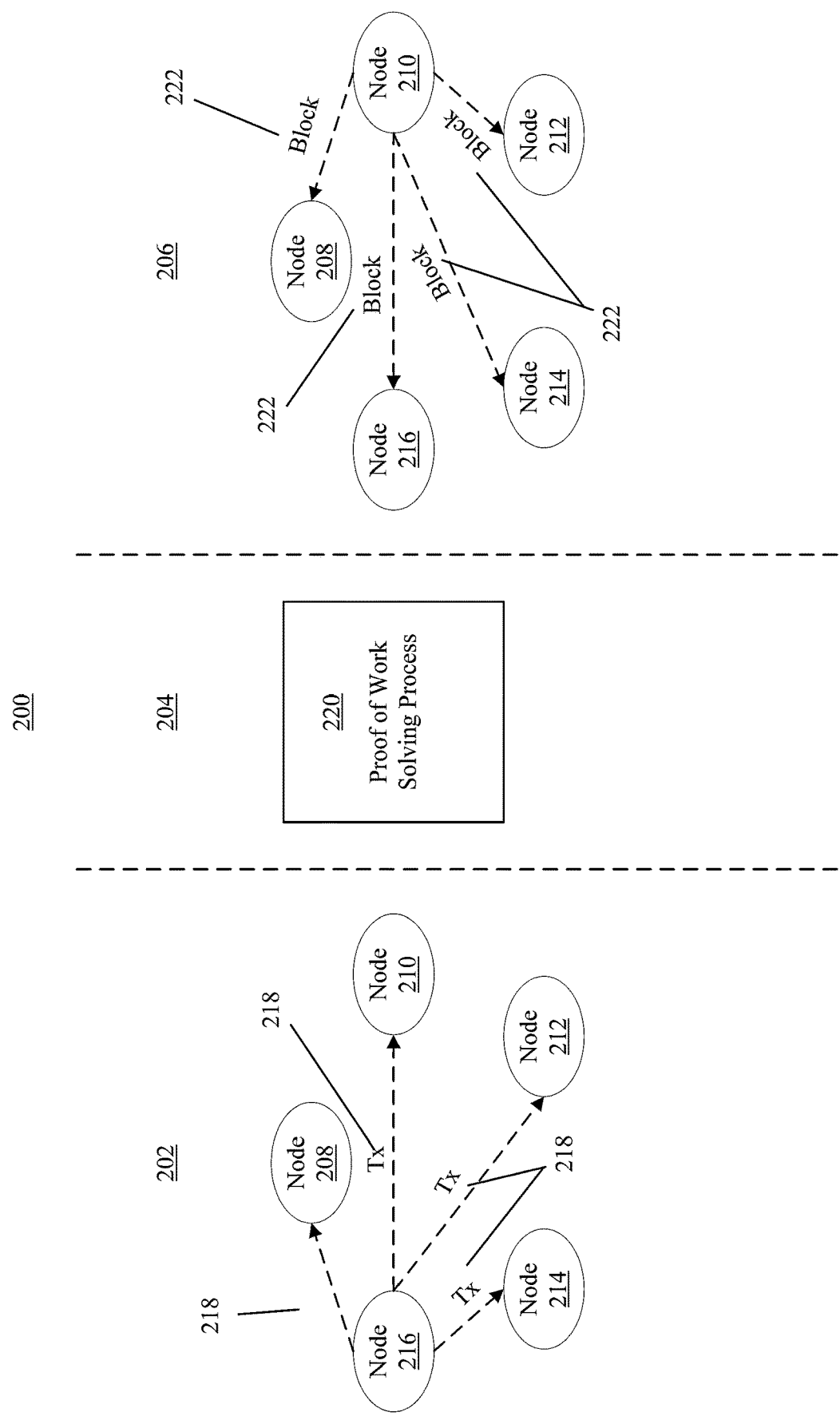
FIG. 2 depicts example operation of an illustrative implementation of the bitcoin blockchain.

FIGS. 1 and 2 depicts known methodologies for interacting with a shared data structure. In particular, FIG. 1 depicts example operation of an illustrative electronic database/DBMS 106 with respect to the interactions of participants 104, 122, 130 which utilize that database 106, such as may be used as a "system of record" ("SOR"), and may be one of a plurality of independent databases which store copies of the same data under a "trust and reconciliation" model. The example operations include receiving an initial request 114 from a first participant 104 to modify data stored in a database 106 at a first time 102. As depicted in FIG. 1, time 138 flows from time period 102 to time period 118. The request 114 may be handled by a database handler 108. The database handler 108 locks the record where the data 110 is stored to prevent other participants from accessing or modifying the data. The database handler 108 then formulates a response 116, to the request to modify the data which the first participant 104 requested to modify, to send to the first participant 104. Once the response 116 is communicated to the first participant any changes made to the data 110 are then committed 120 to the database 106, that is the data is permanently, from the perspective of the participants, modified in accordance with the request. The database handler 108 then unlocks the record where the data 110 is stored to allow other participants to access or modify data. Any other participants, such as participants 122 and 130 may not access the same data as participant 104 during the time period 102 while the record is locked. Participants 122 and 130 may only access the data after commit 120 occurs during time period 118.

With respect to databases, a commit operation makes any transactional changes to data stored in the database permanent, i.e. from the perspective of the participants which now see the data as having been changed. Participant 122 may go through the same request 124 response 126 process as the first participant. Participant 122 may have its own database to which Participant 136 communicates and this database may operate in the same manner as the database 106. Similar to how Participant 122 has to wait until the first participant's 104 request is handled, participant 130 must also wait until another commit 120 period occurs before participant 130 may go through the same request 132 response 134 cycle to access data. For example, the XA protocol may be implemented.

The XA standard is a specification by The Open Group for distributed transaction processing (DTP). It describes the interface between the global transaction manager and the local resource manager. The goal of XA is to allow multiple resources (such as databases, application servers, message queues, transactional caches, etc.) to be accessed within the same transaction, thereby preserving the ACID properties across applications. XA uses a two-phase commit to ensure that all resources either commit or rollback any particular transaction consistently (all do the same). XA stands for "eXtended Architecture" and is an X/Open group standard for executing a "global transaction" that accesses more than one back-end data-store. XA specifies how a transaction manager will roll up the transactions against the different data-stores into an "atomic" transaction and execute this with the two-phase commit (2 PC) protocol for the transaction. Thus, XA is a type of transaction coordination, used among databases. ACID Transactions are a key feature of databases, but typically databases only provide the ACID guarantees for activities that happen inside a single database. XA coordination allows many resources (again, often databases) to participate in a single, coordinated, atomic update operation. One downside to the database/DBMS 106 described above is that multiple participants are not able to modify and read the data 110 in the database at the same time, because the database system 100 adheres to ACID properties. Furthermore, if participants are maintaining copies of the database, such as where one copy is an SOR, they must undertake a serialized reconciliation process to update their copies.

FIG. 2 depicts an example operation of an illustrative implementation 200 of the bitcoin Blockchain which may be used to track the logical movement of digital assets among the participants, e.g. bitcoins, and which may include three stages of operation as shown, a transaction stage 202, a proof of work stage 204, and a block confirmation stage 206. FIG. 2 also shows nodes 208, 210, 212, 214, and 216, representative of participants in the bitcoin Blockchain. In the transaction stage 202, node 216 communicates a transaction 218 to every other node. A transaction may consist of one participant to the transaction at a node sending a bitcoin to another participant to the transaction at a different node. As the other nodes 208, 210, 212, 214 receive transaction 218, the transaction is grouped together with other prior transactions into a block. A block may include a number of transactions. The number of transactions which may be grouped together into a block may be limited to a maximum number of transactions before the block is "closed" and a new block is opened. Once the maximum number of transactions in the block is reached, a node that has received the block begins the proof of work solving process 220 during the proof of work stage 204.

During the proof of work stage 204, every node 208, 210, 212, 214, and 216 that has begun the proof of work solving process 220 will attempt to solve a mathematical equation which allows the nodes 208, 210, 212, 214, and 216 to confirm the veracity of the block via validation of a solution to the mathematical equation. The mathematical equation to be solved is asymmetric, i.e. it is an equation which is difficult to solve, e.g. resource/time intensive, but where the solution is easy to validate, such as the computation of a particular hash value. Once one of the nodes 208, 210, 212, 214, and 216 confirms the veracity of a block, the solving node 208, 210, 212, 214, and 216 broadcasts the confirmed block to every other node 208, 210, 212, 214, and 216 at the block confirmation stage 206. As shown in the exemplary operation depicted in FIG. 2, node 210 completed the proof of work involving the transaction 218, and broadcasts the block 222 to each other node.

Figure 3:
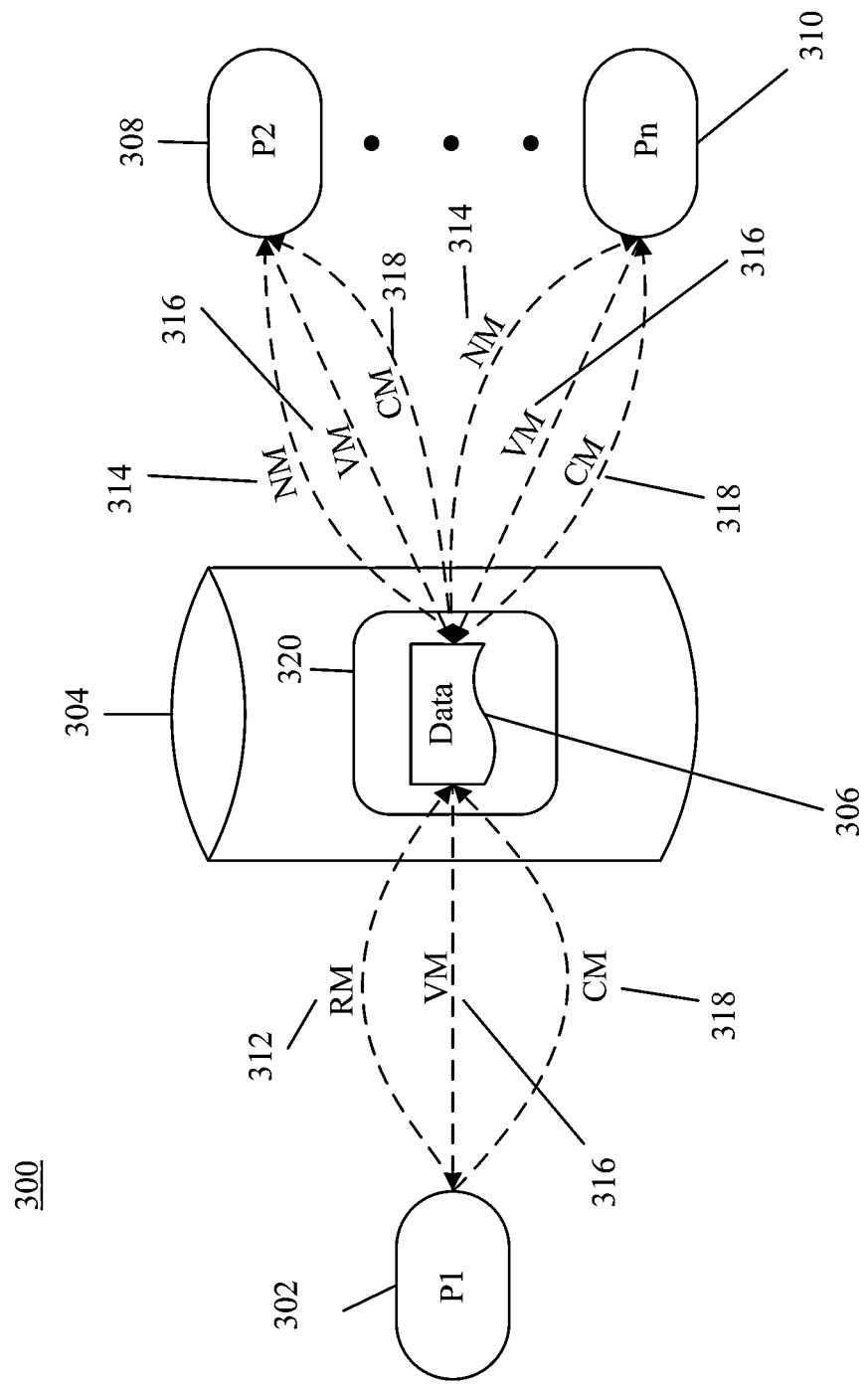
FIG. 3 depicts example operation of an illustrative system which implements a bilateral assertion model according to one embodiment.

FIG. 3 depicts example operation of an illustrative system 300 which implements the disclosed bilateral assertion model ("BAM") for interacting with a shared data structure according to one embodiment. FIG. 3 includes example participants 302, 308, and 310. The system 300 may utilize any number of participants 302, 308, 310 from P1 . . . Pn. A participant 302, 308, 310 may interact with the system 300 in one or more of a variety of roles, including, but not limited to: as a party to a transaction (a proposer of the transaction, an asserter of fact or agreement, an issuer of a credential, authorization, license, certification/certificate, or accreditation etc.); as a counterparty to a transaction; as a witness to a transaction; and/or as a watcher to a transaction. It will be appreciated that not all of these roles may be implemented and/or additional and/or alternative roles may be implemented.

A party to a transaction may be a participant who proposes a transaction or otherwise makes an assertion to another participant, which would be referred to as a counter party. A witness is one who receives a copy of a transaction, i.e. "listens," and attests, e.g. cryptographically signs and validates, that they saw, i.e. received and comprehended, a transaction between the party and the counter party participants. Witness participants may serve a notarial or regulatory role. While a witness may not know the nature of the transaction or assertion, e.g. due to encryption thereof, as will be described, they are aware that that the transaction or assertion exists, via the receipt of a copy thereof, and they are aware of the party and counter party participants and can attest to, e.g. confirm/validate, the existence of the transaction and parties thereto. For example, with respect to a transaction between two participants in which the first party undertakes an obligation to the second party, the witness participant may be able to attest to the existence of the transaction and that the parties thereto, but, due to encryption, the witness may not know of the details of the obligation. A watcher is a participant that listens to, i.e. receives a copy of, and, and may record, i.e. store a copy of, a transaction, but does not attest to it, i.e. does not provide confirmation or validation. A watcher participant may serve a notarial or regulatory role or merely provide transactional integrity against improper behavior, such as where a catastrophic failure comprises the data structures of multiple participants or otherwise results in only one participant having the ability to reconstruct lost transactions and that participant knowingly or unintentionally fails to provide complete or accurate data. Parties, counterparties, and/or witnesses to transactions may all be required to validate transactions for the transactions to be complete as will be described. Watchers to transactions may be made aware of transactions, i.e. receive copies, but may not validate the transactions like parties, counterparties, and witness. Conversely, participants 302, 308, 310 in the system 300 that are not involved in a transaction would not be made aware of that transaction.

The system 300 shown in FIG. 3 includes a data structure management system 304 in which data 306 is stored in a data structure 320. As shown in FIG. 3, the participants 302, 308, 310 and the data structure management system 304 interact via the communication of data transaction messages, which may be referred to as implicit messages, such as via a communications network, not shown in FIG. 3, which may be the network 1020 shown in FIG. 10 and described below with respect thereto.

Exemplary data transaction messages include request data transaction messages 312, notification data transaction messages 314, validation data transaction messages 316 and response data transaction messages 318. Request data transaction messages 312 may include data indicative of one or more proposals, such as a proposal of an agreement or other proposition or assertion of an opinion, or an assertion, such as an assertion of fact, e.g. an assertion of the existence of an agreement, an authorization, a license, a certification, an accreditation, a statement of intention, e.g. an intention to create, modify or remove data, an assertion of a revocation of an agreement, authorization, license, certification or accreditation, etc.

Once an assertion is made and validated, as described, it may form a logically/effectively permanent unalterable record, i.e. as viewed by the parties, users of the system. Accordingly, to effect a change to that assertion, a subsequent assertion, once validated, may act to supersede or modify a previous validated assertion, such as by acting as a revocation to revoke the prior assertion, an addendum to add additional parameter, an amendment to alter terms and/or, a novation to alter the parties to a prior assertion, etc. As can be seen then, and as discussed in more detail below, as the original assertion remains unaltered, to understand the present state/understanding of that assertion, it may need to be viewed in the context of, e.g. netted with, any subsequent assertions.

Generally a request data transaction message 312 may comprise data indicative of a request to store new data in the data structure management system 304. A notification data transaction message 314 includes data indicative that a request data transaction message has been received by the system 300 and includes data indicative of that received request and may further include a request to the recipient to validate the received request or other indication that the recipient is to validate the requested change to the data structure 320. Notification data transaction messages 314 may be automatically generated and transmitted upon receipt of a request data transaction message 312. A validation data transaction message 316 comprises data indicative of a participant's validation of a requested change to the data structure 320, e.g. a response to a request to validate a received request data transaction message, which may include data indicative of a confirmation or a rejection of the received request data transaction message. A response data transaction message 318 includes data indicative of the system's 300 response to a request data transaction message, e.g. based on the received validation data transaction messages, e.g. that the requested transaction was performed or not. Response data transaction messages 318 may be communicated, as will be described, to all participants participating in the transaction so as to convey the result thereof.

All of the data transaction messages discussed above may be received asynchronously and trigger the actions listed below. In other words, while one request is processing, another request may come in, and notifications and validations may be received, etc. In one embodiment, data is stored in the data structure organized by "entries" where each entry contains the data indicative of one or more proposals/assertions along with data indicative of any requisite counter-party and/or witness attestations, e.g. cryptographic signatures, as will be explained in more detail below.

The collective contents of an entry may reflect the state of the transaction represented by those contents. For example, if an entry contains the proposed assertion only, and no validations, the state of that assertion is "proposed" or "incomplete." As the requisite validations, witness attestations, etc. are received and data indicative thereof stored into the entry, the state of the entry changes, e.g. to "in process," until all requisite validations, witness attestations, confirmations, etc., are stored in the entry, upon which the state of the entry may be considered to be "validated" or "complete." Data indicative of a "validated", "attested to" or "confirmed" state may be stored in the entry and updated as new data is stored into the entry or, alternatively, the state may be determined by reviewing which of the requisite data is stored in the entry and which of the requisite data is still outstanding, i.e., not yet received. The described data transaction request messages may then operate with respect to particular entries, i.e. creating new entries or augmenting existing entries as described. As will be further described below in more detail, entries may further be organized based on the party/counter-party having an interest therein, e.g. the parties to the agreements or assertions indicated by the data contained within the entry. In particular, entries relating to a particular permutation of party/counter-party may all be stored together in a "partition" or other sub-division of the data structure. It will be appreciated that other organizations may be used, either more or less granular.

The BAM, as described herein, allows for participants 302, 308, and 310 to submit requests to create new data, or modify existing data, and operate directly on the data itself. Put another way, the participants in the system 300 are able to directly operate on data in the shared data structure, and any participants interested in that data are automatically made aware of requests to create new data or modify existing data.

Figure 8:
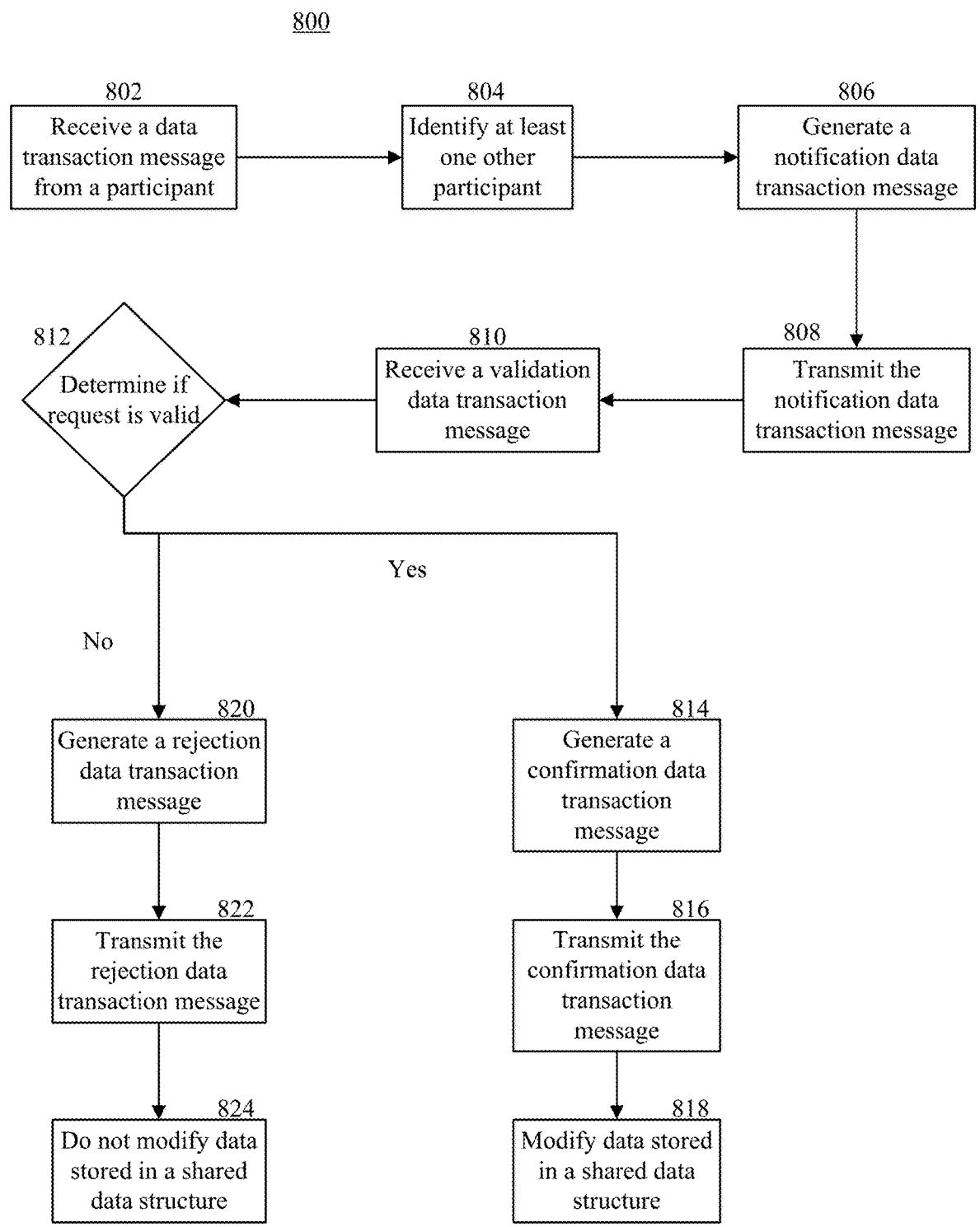
FIG. 8 depicts a flow chart showing operation of the system of FIGS. 3-6B according to one embodiment.
Figure 9A:
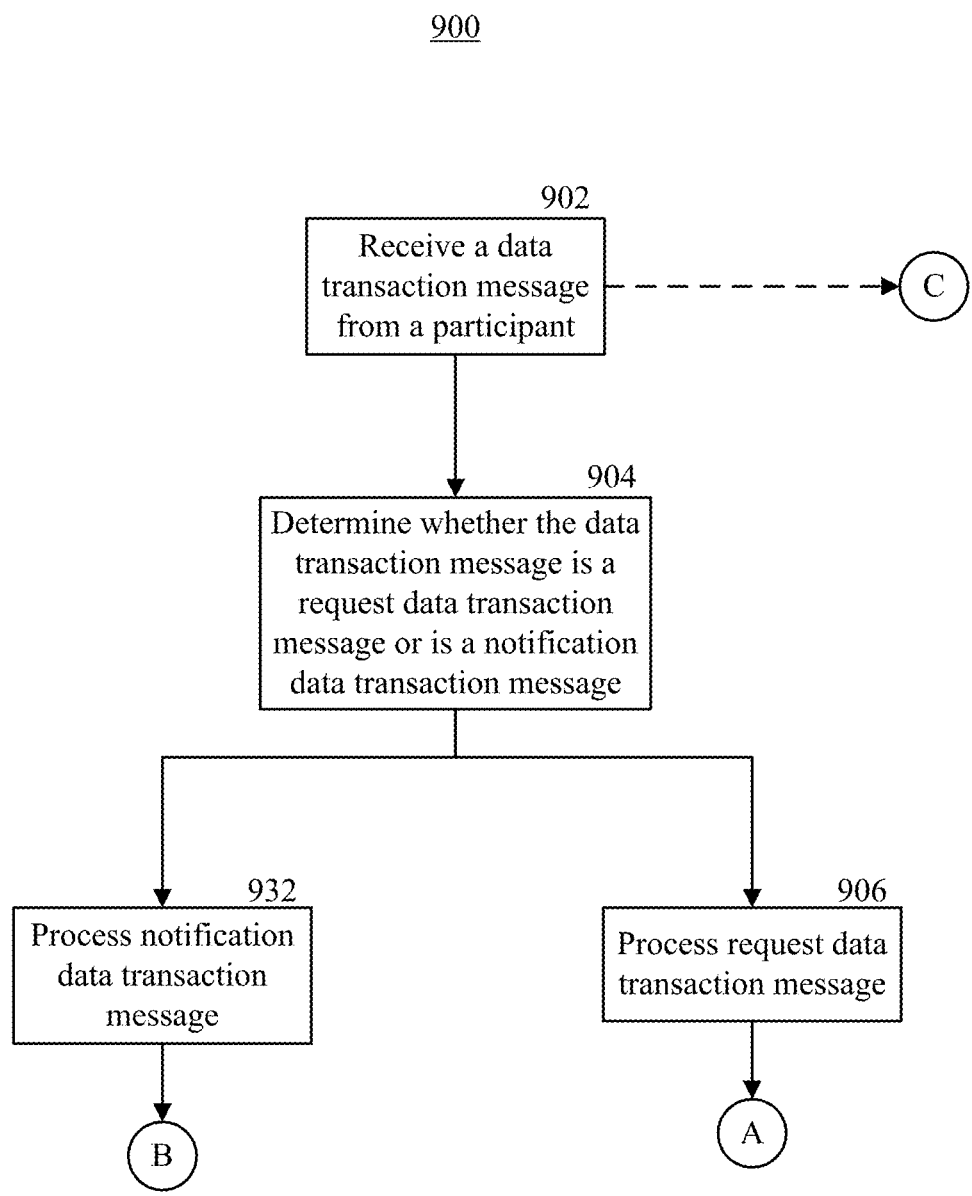
FIGS. 9A-9D depict a flow chart showing operation of the system of FIGS. 6, 7A, and 7B according to one embodiment.
Figure 9B:
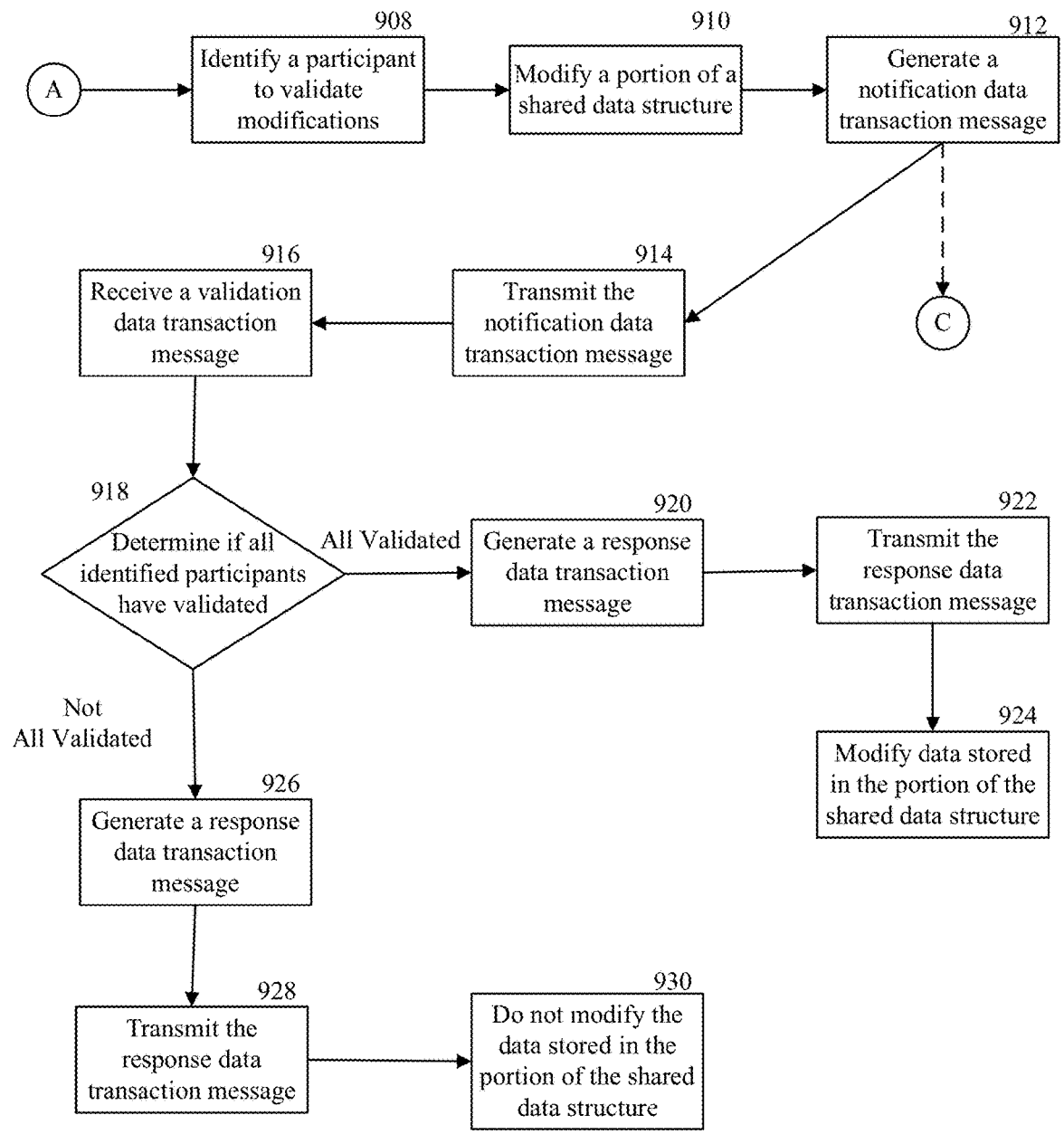
Figure 9C:
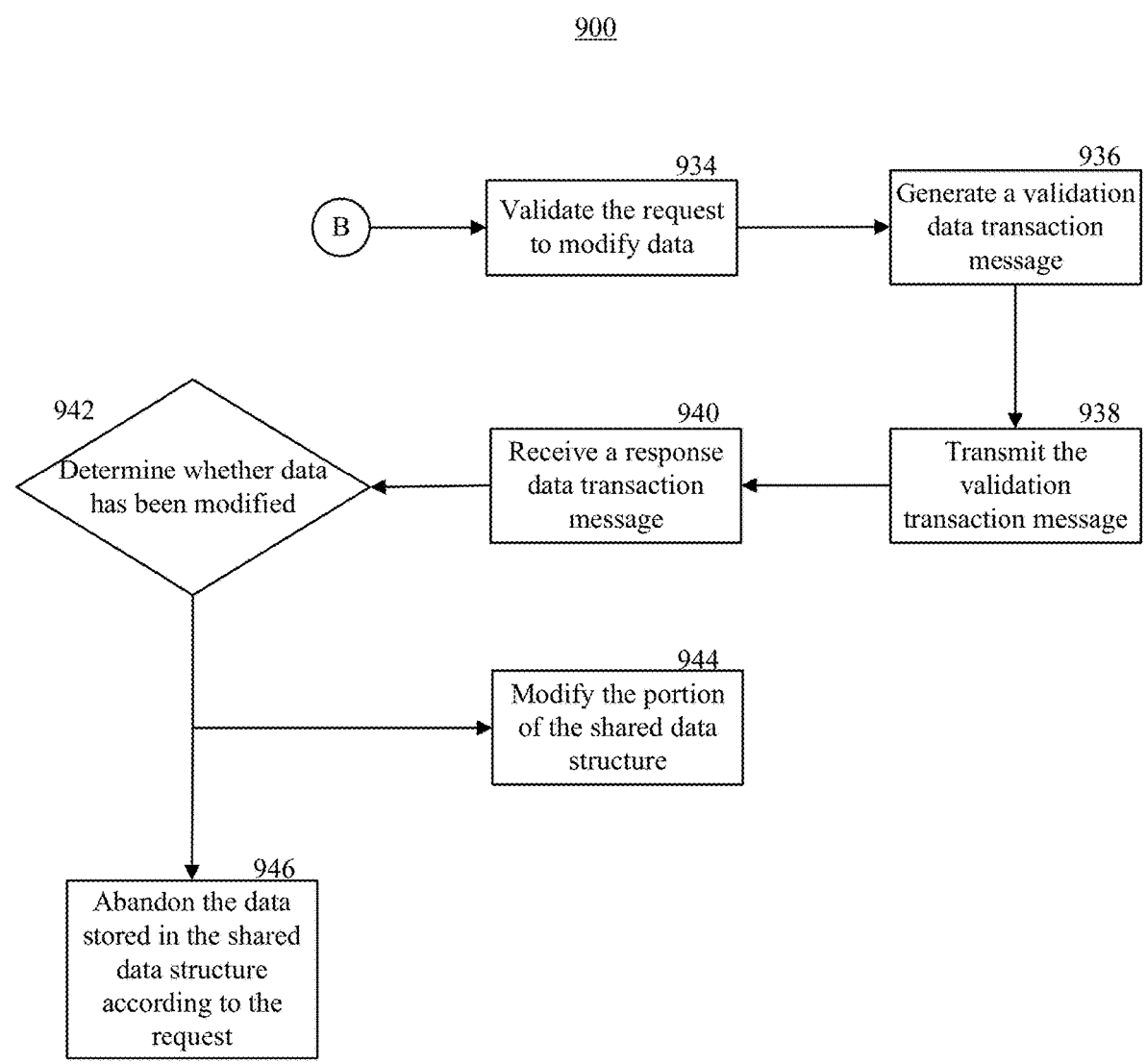
Figure 9D:
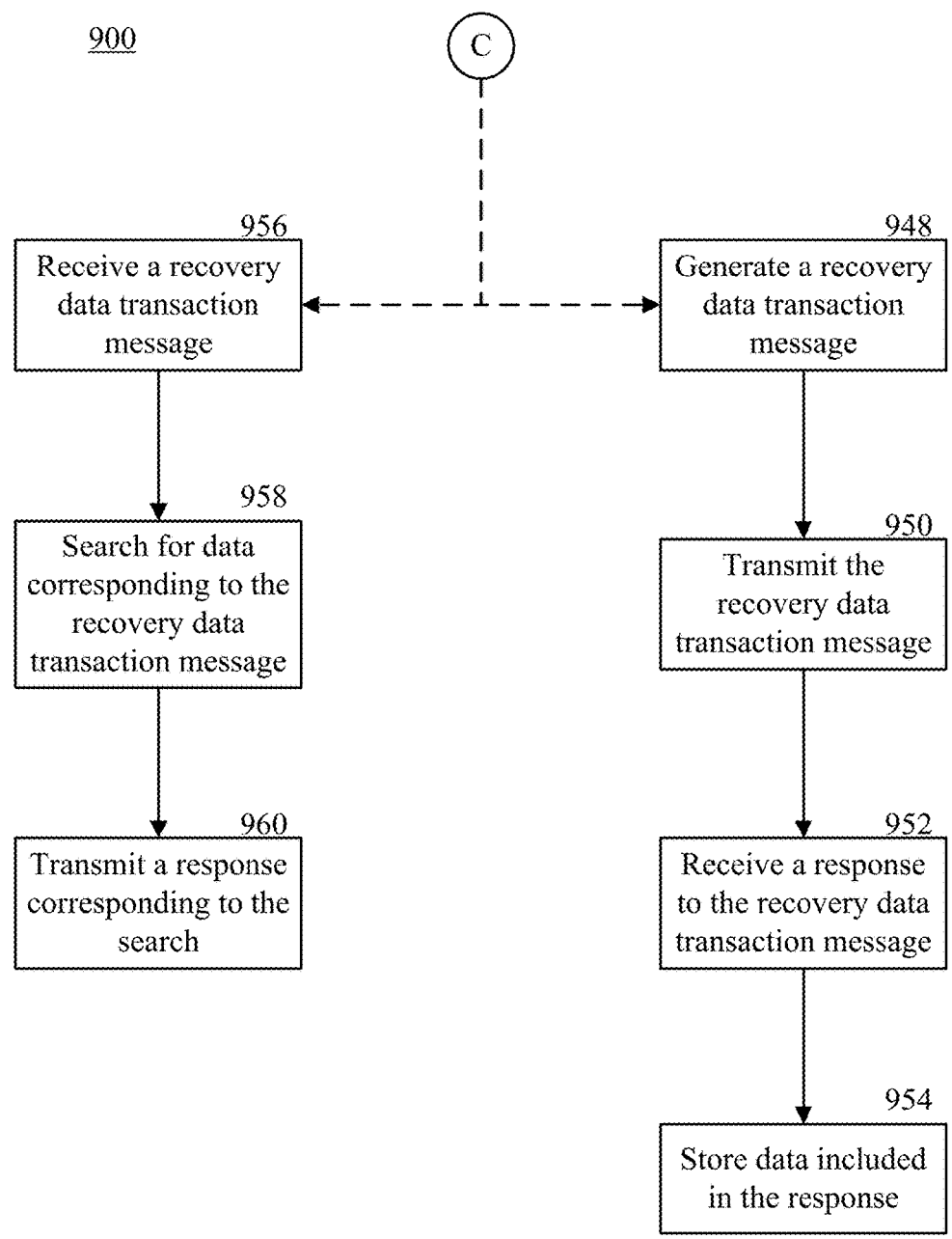

FIG. 8 depicts a flow chart 800 showing example operation of the system 400 of FIG. 3. In particular FIG. 8 shows an example computer implemented method for facilitating interaction with a shared data structure, stored in a memory, by a plurality of participants. The operation of the system 300 includes receiving a request data transaction message from a first participant 302, e.g. a "party" participant, of the plurality of participants, the request data transaction message 312 comprising data indicative of a request to modify data 306 stored in the shared data structure 304 (block 802), e.g. a proposal, and identifying, based on the request data transaction message, at least one other participant 308, e.g. a "counter party" participant and one or more "witness" participants, of the plurality of participants to validate modifications to the data (block 804). It will be appreciated that other participants, such as one or more "watcher" participants, may also be identified, for example, for the purpose of recording the transaction. The identifying of the at least one other participant may be done automatically. For example, the data 306 stored in the shared data structure 304 may further include, or be stored in association with, data, such as permission data, indicative of the at least one other participant. Alternatively, the request data transaction message 312 may further include data indicative of the at least one other participant.

The operation of the system further includes generating, a notification data transaction message for each identified participant 308 and 310, the notification data transaction message comprising data indicative of the request to modify the data (block 806), and transmitting each of the generated notification data transaction messages 314 to the associated one of the identified at least one other participants 308 and 310 (block 808). The operation of the system further includes receiving a validation data transaction message 316, responsive to the notification data transaction message 314, from each of the identified at least one other participants, each of the received validation data transaction messages 316 comprising data indicative of a response to the notification data transaction message 314 (block 810). As described herein, upon receipt of a notification data transaction message 314, the recipient determines whether the request to modify the data is valid, e.g. according to the business rules or logic of the recipient, and generates and transmits a validation data transaction message 316 comprising data indicative thereof back to the sender of the notification data transaction message.

The operation of the system further includes determining based on the received validation data transaction messages 316, whether all of the identified other participants 308 and 310 have validated the request to modify the data (block 812), and, based thereon, if all of the identified other participants have validated the request to modify the data, generating a confirmation data transaction message 318 (block 814), and transmitting the confirmation data transaction message to the first participant 302 (block 816). In some embodiments the confirmation data transaction message 318 is also communicated to the other participants 308 and 310. The operation of the system then further includes modifying the data stored in the memory in the shared data structure according to the request to modify the data (block 818).

However, in one embodiment, if less than all of the identified other participants have validated the request the operation of the system further includes generating a rejection data transaction message 316 (block 820), and transmitting the rejection data transaction message 316 to the first participant 302 (block 822). In some embodiments, operation of the system includes communicating the rejection data transaction message 316 to the other participants 308 and 310. The operation of the system then further includes not modifying the data 306 stored in the memory in the shared data structure according to the request to modify the data (block 824). Because the data is operated on directly in the shared data structure 304, there is no need for an exchange of messages concerning the state of the data after the method completes. As such, the data structure 304 may be considered real-time, self- or inherently reconciling. That is, each participant is assured that the data 306 that they consider to be stored in the data structure 304 is the same data 306 that all other participants consider to be stored in the data structure 304.

Figure 4:
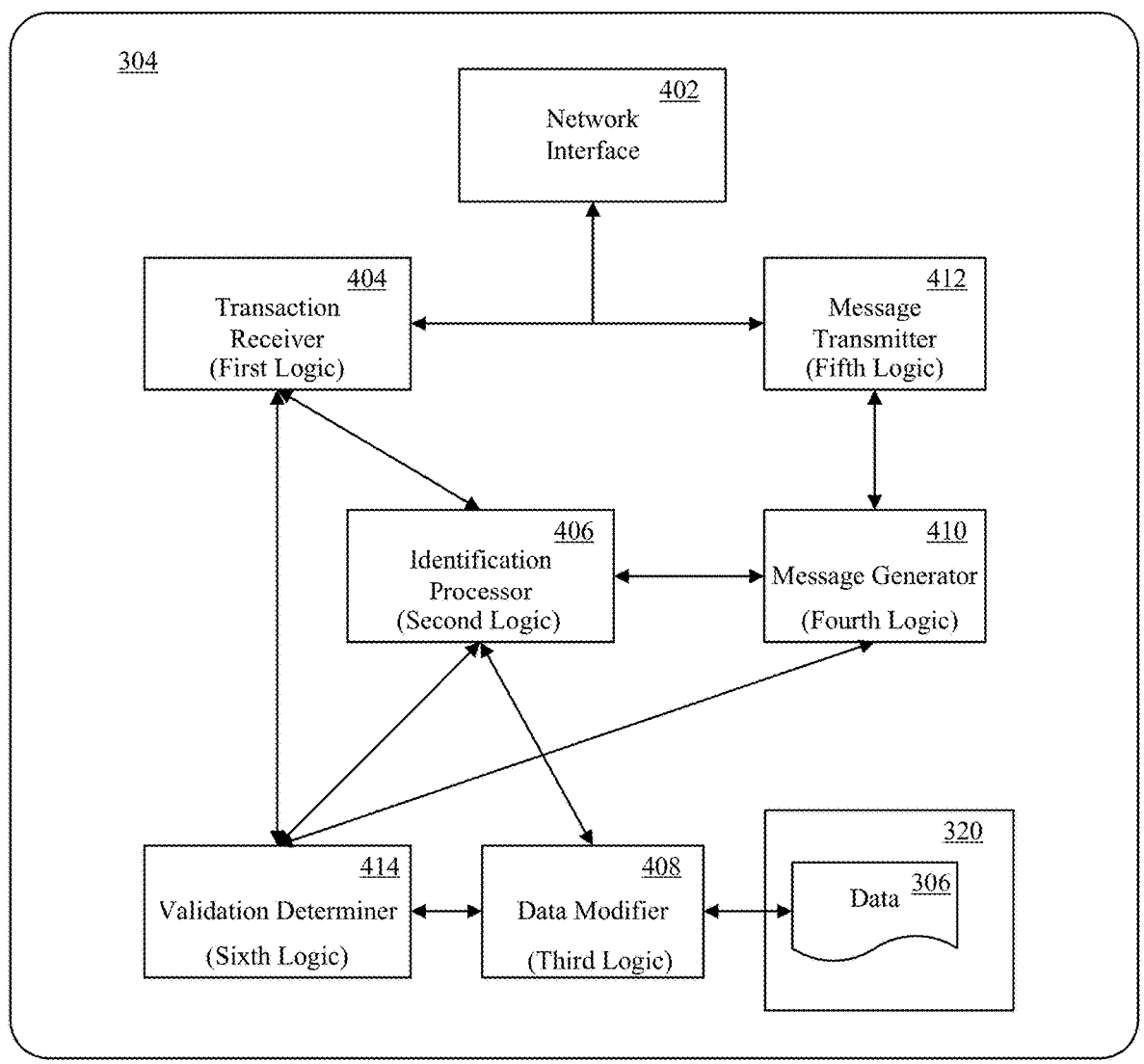
FIG. 4 depicts a block diagram of a system which implements the bilateral assertion model of FIG. 3 according to one embodiment.

FIG. 4 depicts a more detailed block diagram of the system 304 which implements the bilateral assertion model of FIG. 3 according to one embodiment. The system 304 includes a network interface 402, a transaction receiver 404, an identification processor 406, a data modifier 408, a message generator 410, a message transmitter 412, and a validation determiner 414. The network interface 402, which may comprise the network interface 1018 described below with respect to FIG. 10, is operative to couple the system 304 with a network, such as a public and/or private communications wired and/or wireless network, such as the network 1020 shown in FIG. 10 and described in more detail below, and facilitates communications among the system 304 and the participants 302, 308, 310 as described herein.

The transaction receiver 404, which may be implemented as a separate component or as one or more logic components, such as on an FPGA which may include a memory or reconfigurable component to store logic and a processing component to execute the stored logic, or as first logic, e.g. computer program logic, stored in a memory, such as the memory 1012 shown in FIG. 10 and described in more detail below with respect thereto, or other non-transitory computer readable medium, and executable by a processor, such as the processor 1004 shown in FIG. 10 and described in more detail below with respect thereto, to cause the processor to, or otherwise be operative to receive a request data transaction message, described above, from a first participant of the plurality of participants, the request data transaction message comprising data indicative of a request to modify data stored in the shared data structure. The transaction receiver 404 may be further operative to receive, responsive to a notification data transaction message, described above, a validation data transaction message, described above, from each of the identified at least one other participants, each of the received validation data transaction messages comprising data indicative of a response to the notification data transaction message.

The identification processor 406, which may be implemented as a separate component or as one or more logic components, such as on an FPGA which may include a memory or reconfigurable component to store logic and processing component to execute the stored logic, or as second logic, e.g. computer program logic, stored in a memory, such as the memory 1012 shown in FIG. 10 and described in more detail below with respect thereto, or other non-transitory computer readable medium, and executable by a processor, such as the processor 1004 shown in FIG. 10 and described in more detail below with respect thereto, to cause the processor to, or otherwise be operative to, identify based on the request data transaction message, at least one other participant of the plurality of participants to validate modifications to the data.

The data modifier 408, which may be implemented as a separate component or as one or more logic components, such as on an FPGA which may include a memory or reconfigurable component to store logic and processing component to execute the stored logic, or as third logic, e.g. computer program logic, stored in a memory, such as the memory 1012 shown in FIG. 10 and described in more detail below with respect thereto, or other non-transitory computer readable medium, and executable by a processor, such as the processor 1004 shown in FIG. 10 and described in more detail below with respect thereto, to cause the processor to, or otherwise be operative to, modify the data stored in the memory in the shared data structure according to a request to modify the data. Similarly, the data modifier 408 may be operative to not modify data stored in the shared data structure or remove data stored in the shared data structure. The data modifier 408 may be further operative to, store, prior to the receiving of any validation data transaction messages, data indicative of a request to modify data stored in the shared data structure in a portion of the shared data structure accessible only to the first participant and the identified at least one other participant, and further storing, upon receipt of each validation data transaction message, data indicative thereof in the portion of the shared data structure, the modifying of the data stored in the memory in the shared data structure comprising storing data indicative of the confirmation in the portion of the shared data structure, and the modifying of the data stored in the memory in the shared data structure comprising storing data indicative of a rejection of the request to modify in the portion of the shared data structure.

The message generator 410, which may be implemented as a separate component or as one or more logic components, such as on an FPGA which may include a memory or reconfigurable component to store logic and processing component to execute the stored logic, or as fourth logic, e.g. computer program logic, stored in a memory, such as the memory 1012 shown in FIG. 10 and described in more detail below with respect thereto, or other non-transitory computer readable medium, and executable by a processor, such as the processor 1004 shown in FIG. 10 and described in more detail below with respect thereto, to cause the processor to, or otherwise be operative to, generate a notification data transaction message, described above, for each identified participant, the notification data transaction message comprising data indicative of the request to modify the data. The message generator generates a confirmation data transaction message, described above, if all of the identified other participants have validated the request to modify the data. Similarly, the message generator 410 may be further operative to generate a rejection data transaction message, described above, if less than all of the identified other participants have validated the request.

The message transmitter 412, which may be implemented as a separate component or as one or more logic components, such as on an FPGA which may include a memory or reconfigurable component to store logic and processing component to execute the stored logic, or as fifth logic, e.g. computer program logic, stored in a memory, such as the memory 1012 shown in FIG. 10 and described in more detail below with respect thereto, or other non-transitory computer readable medium, and executable by a processor, such as the processor 1004 shown in FIG. 10 and described in more detail below with respect thereto, to cause the processor to, or otherwise be operative to, transmit each of the generated notification data transaction messages, confirmation data transaction messages, and rejection data transaction messages to the associated one of the identified at least one other participants, the first participant, or some combination thereof.

The validation determiner 414, which may be implemented as a separate component or as one or more logic components, such as on an FPGA which may include a memory or reconfigurable component to store logic and processing component to execute the stored logic, or as sixth logic, e.g. computer program logic, stored in a memory, such as the memory 1012 shown in FIG. 10 and described in more detail below with respect thereto, or other non-transitory computer readable medium, and executable by a processor, such as the processor 1004 shown in FIG. 10 and described in more detail below with respect thereto, to cause the processor to, or otherwise be operative to, determine based on the received validation data transaction messages, whether all of the identified other participants have validated the request to modify the data.

Figure 5:
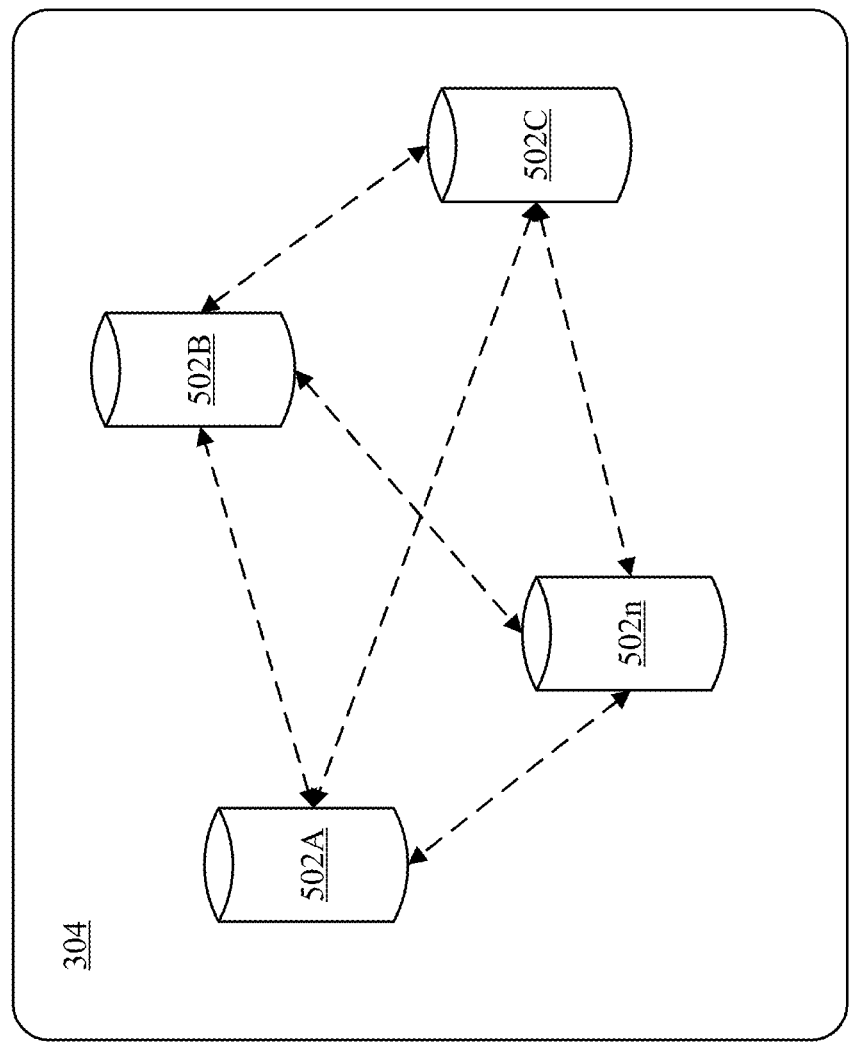
FIG. 5 depicts a block diagram of a distributed data structure for use with the bilateral assertion model of FIG. 3 according to one embodiment.

FIG. 5 depicts a block diagram of a distributed data structure for use with the bilateral assertion model of FIG. 3 according to one embodiment. In particular, in this embodiment, the data structure management system 304 may comprise a plurality of component data structure management systems 502A, 502B, 502C, and 502*n*, each of which may also be referred to as a "node", the collective operation of which implement the data structure management system 304. While FIG. 5 depicts four such component data structure management systems, it will be appreciated that there may be fewer or more and the number of such components may be implementation dependent. Further, in one embodiment, the number of component data structure management systems may be dynamic with nodes being added or removed, e.g. joining or withdrawing from the overall system as the system operates. These component data structure management systems 502A, 502B, 502C, 502*n* may be able to logically communicate directly with each other through the methods described in this disclosure, such as over a communications network, not shown, which may be the network 1020 shown in FIG. 10 and described in detail below with respect thereto, e.g. by using the systems and/or methods depicted in FIGS. 3, 4, and 6-10. Each component data structure management system 502A, 502B, 502C, 502*n* may comprise a portion of the overall data structure as will be described, this portion may be referred to as an "electronic ledger" and the component data structure management system 502A, 502B, 502C, 502*n* may be referred to as a "ledger device" 502A, 502B, 502C, 502*n*. The plurality of component data structure management systems 502A, 502B, 502C, 502*n* may be connected physically, or logically, to form a network of electronic ledgers/ledger devices 502A, 502B, 502C, 502*n*.

The plurality of component data structure management systems 502A, 502B, 502C, 502*n* may logically communicate bilaterally, for example, 502A directly to 502B or vice versa, or in a multiparty fashion. There may be any number of component data structure management systems 502A, 502B, 502C, 502*n* linked together into the plurality of component data structure management systems 502A, 502B, 502C, 502*n* to make up the data structure management system 304. The component data structure management systems 502A, 502B, 502C, 502*n* may be self-, or otherwise inherently, reconciling, in that the data does not need to be reconciled across parties interested in the data because the changes are applied directly to the data for all parties as will be described. In particular, as was described above, when data is replicated among standard databases/DBMS's, the data must be periodically reconciled to ensure each copy is accurate. The reconciliation process, as described above, typically involves two parties comparing their stored data, via the exchange of messages, to ensure that the data they hold in their respective storage matches as it should. This reconciliation process typically takes place at the end of the day, and involves messaging back and forth between the two parties. The BDL system eliminates the need for such reconciliation by validating changes to data as they occur, thereby eliminating the need for the later reconciliation messages.

Figure 6:
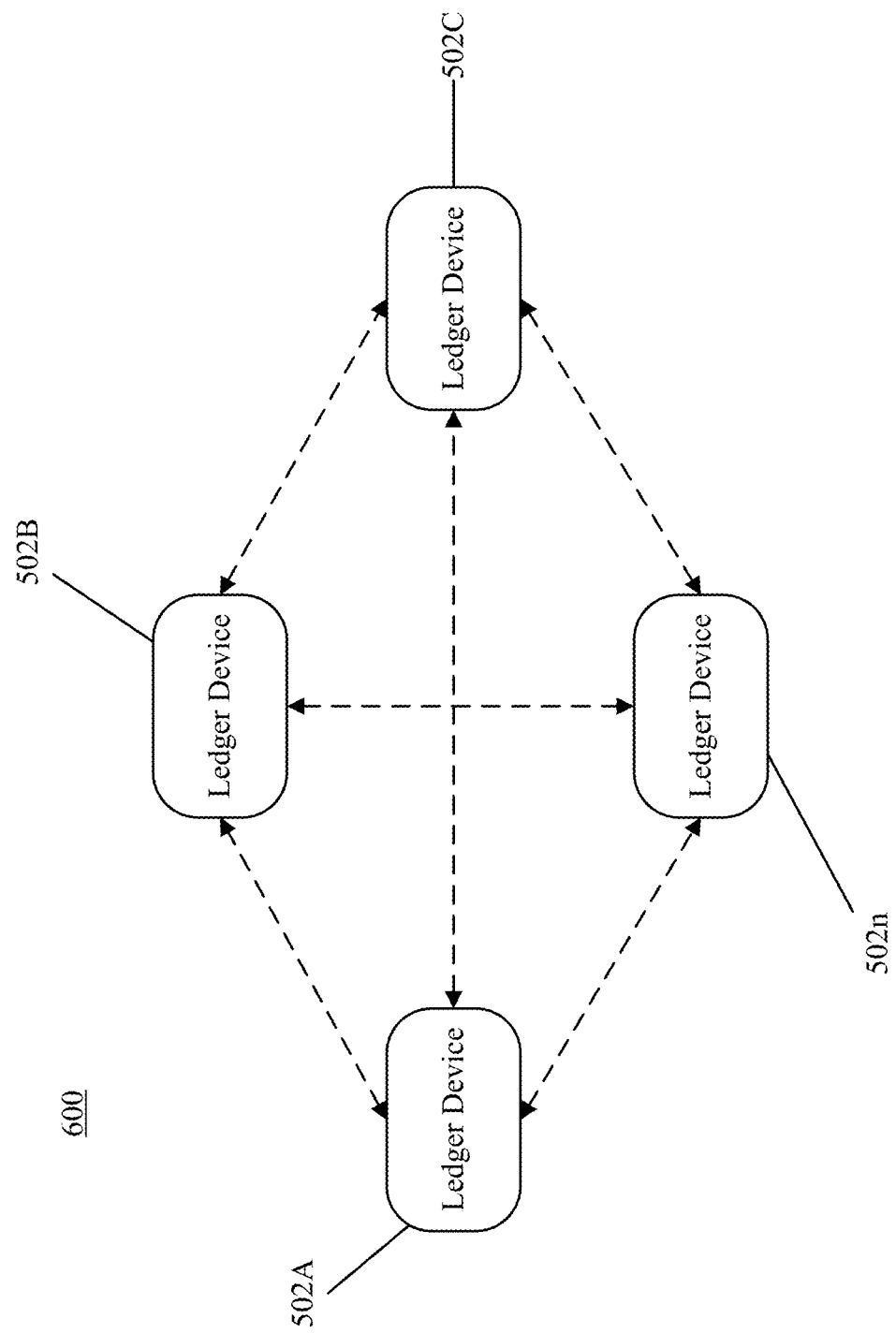
FIG. 6 depicts an exemplary network of bilateral distributed ledger devices which implement the bilateral assertion model of FIGS. 3-5 according to one embodiment.

FIG. 6 depicts a more detailed block diagram of one of the component data structure management systems ("ledger device") 502A, 502B, 502C, 502*n* of FIG. 5. Each of the ledger devices 502A, 502B, 502C, 502*n* includes, as was described above, a portion of the data structure 320, referred to as an electronic ledger 732, discussed in more detail below with respect to FIGS. 7A-7B. The ledger devices 502A, 502B, 502C, 502*n* may be connected together, physically, or logically, to form a network of ledger devices 502A, 502B, 502C, 502*n*. This connected network of ledger devices 502A, 502B, 502C, 502*n* may constitute the shared data structure 320 of FIG. 3, or FIG. 5. Each of the ledger devices 502A, 502B, 502C, 502*n* may include all the necessary hardware and software components to implement the BDL system.

Figure 7A:
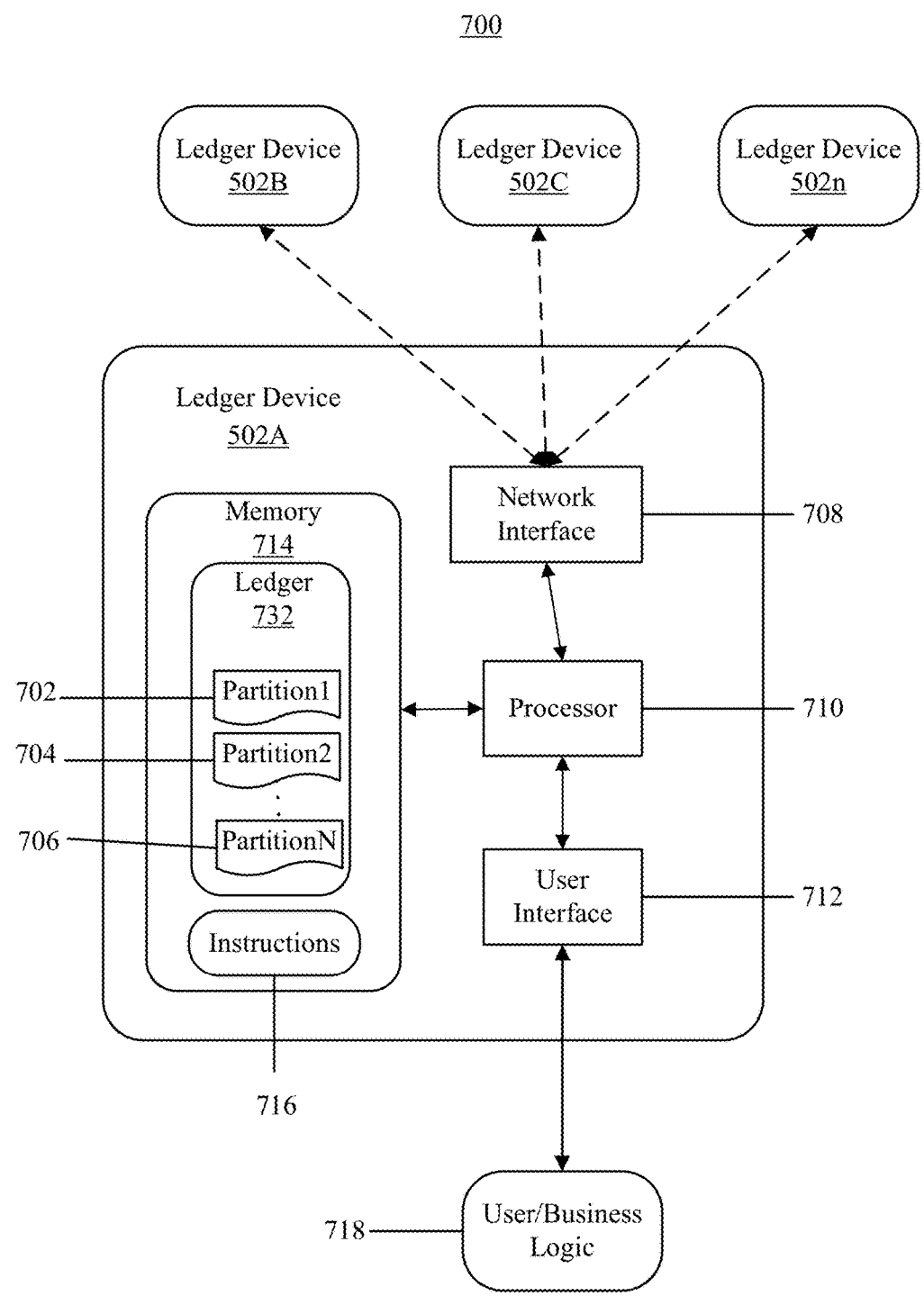
FIG. 7A depicts a block diagram of a bilateral distributed ledger device of FIG. 6 according to one embodiment.

FIG. 7A depicts a more detailed block diagram of a bilateral distributed ledger ("BDL") device 502A, 502B, 502C, or 502*n* of FIG. 6 according to one embodiment. The ledger device 502A includes a portion of the data structure 320, i.e. an electronic ledger 732, which may be further subdivided into partitions 702, 704, and 706, a network interface 708, a processor 710, a user interface 712, a memory 714, instructions 716, and a user/business logic 718. The instructions 716 may include computer code to execute the functionality of the system 700 as described. The network interface 708, which may comprise the network interface 1018 described below with respect to FIG. 10, is operative to couple the system 304 with a network, such as a public and/or private communications wired and/or wireless network, such as the network 1020 shown in FIG. 10 and described in more detail below, and facilitates communications among the system 304 and the participants 302, 308, 310 as described herein. The user interface 712, which may be implemented as the user interface 1016 described below with respect to FIG. 10, may comprise any input and/or output interface for allowing a user to interact with the system 700, such as to make requests to modify data, and/or validate or witness/attest to such requests as described herein, such as a graphical or text based interface presented via a computer display, audio output, touch screen, mouse, keyboard, voice recognition, etc. In one embodiment, the user interface 712 may comprise a programmatic interface such as an application program interface ("API") to which other software programs and/or devices are connected, such as via a network, those other software programs and/or devices providing the requisite interactivity to a user of the system 700. In one embodiment, the user interface 712 is coupled with the system 700 via a network. Alternatively, the user interface 712 may be directly coupled with the system 700.

The electronic ledger 732 stored in the memory 714 may further be subdivided or otherwise organized as a plurality of partitions where each partition includes data, e.g. entries, indicative of a pair of participants, e.g. bilateral participants. For example, if a transaction occurs between ledger device 502A and 502B, data indicative of that transaction would be stored in a partition 702 in electronic ledger 732. A transaction, i.e. entries containing data indicative thereof, may be assigned a unique identifier with respect to other transactions (overall or within a given partition), such as a sequence number, for identification purposes when they are stored in a partition 702. Subsequent transactions, i.e. entries containing data indicative thereof, between 502A and 502B would be stored in the same partition 702. Similarly, a transaction between 502A and 502C would be stored in a different partition 704 from the partition 702 for transactions between 502A and 502B. In one embodiment, transactions initiated by one party to another party are stored in a separate partition from transactions initiated by the other party, i.e. partitions are assigned to each permutation of participants. For example, in one embodiment, two partitions may be assigned to each pair of participants, e.g., one partition for transactions initiated by one participant, and the other partition for transactions initiated by the other participant.

The transactions/entries stored in a single partition may be linked together, such as sequentially, wherein in each subsequent transaction has a higher number, and/or cryptographically, where each transaction contains cryptographic data indicative of a previous transaction, or some combination thereof. The cryptographic data indicative of a previous transaction may be a hash of the data representative of one or more of the previous transactions.

Figure 7B:
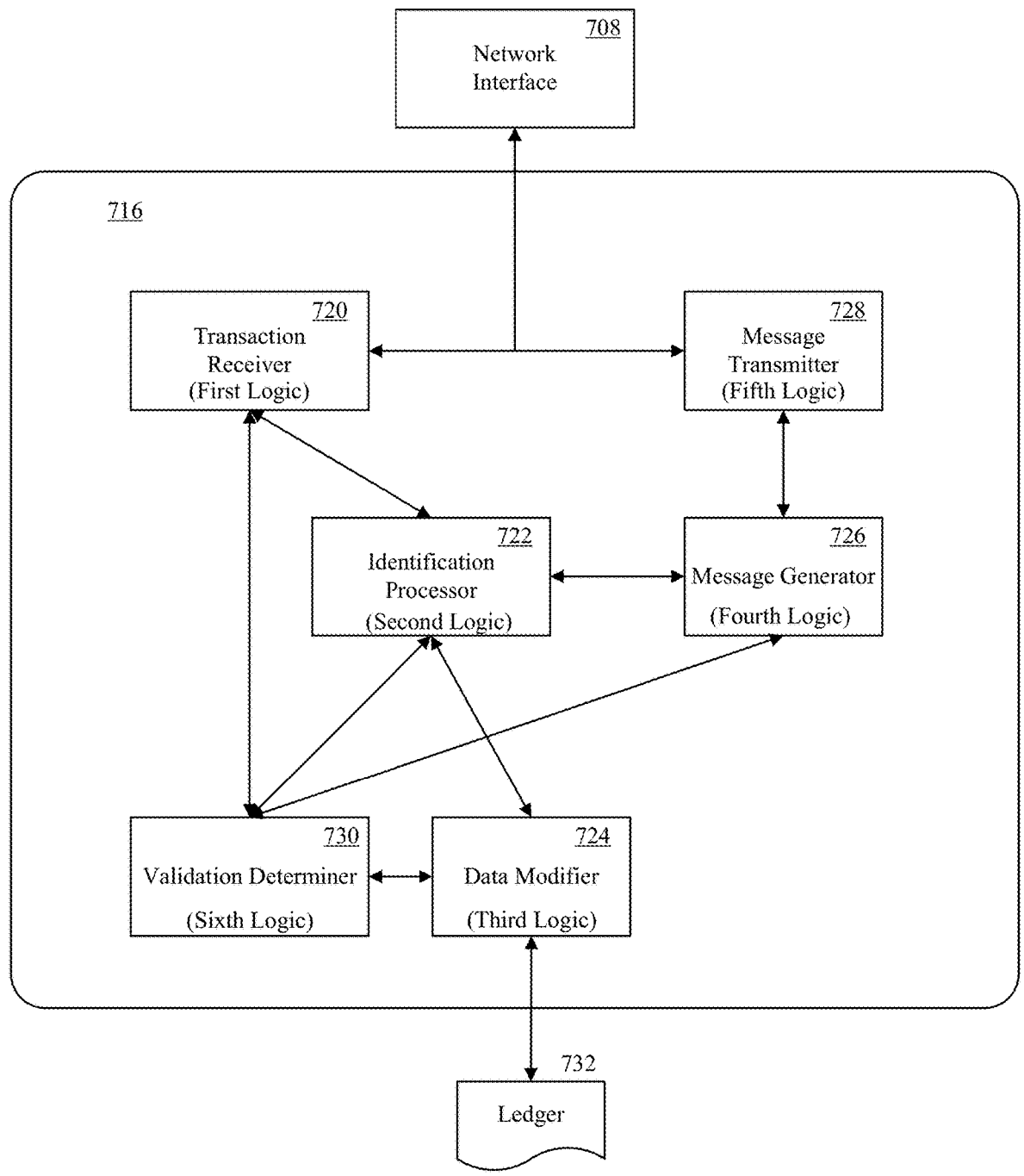
FIG. 7B depicts a more detailed block diagram of the bilateral distributed ledger device of FIG. 7A according to one embodiment.

FIGS. 9A-9D depicts a flow chart 900 showing operation of the system 700 of FIGS. 7A-7B. In particular FIG. 9 shows a computer implemented method for implementing a real time reconciling shared data structure among a plurality of participants, the shared data structure being stored in a memory, a portion of the shared data structure being coupled with a processor, i.e. stored in a portion of the memory coupled therewith. The operation of the system 700 includes receiving a data transaction message from a participant (block 902). The operation of the system 700 further includes determining whether the data transaction message is a request data transaction message or is a notification data transaction message (block 904). In the case of a request data transaction message, the operation of the system includes processing of a request data transaction message (block 906). The operation of the system further includes identifying a participant to validate modifications to data (block 908); and modifying a portion of a shared data structure 320 according to the identified participant (block 910). The operation of the system 700 further includes generating a notification data transaction message (block 912) and transmitting the notification data transaction message (block 914). The operation of the system 700 further includes receiving, in response to the notification data transaction message, a validation data transaction message (block 916). The operation of the system 700 also includes determining if all, or a requisite subset of, e.g. as specified by a consensus protocol of a substrate definition (described in more detail below), identified participants have validated the request to modify data (918) and, if all, or alternatively, a requisite subset, of, the identified participants have validated the request to modify data, the operation of the system 700 includes generating a response data transaction message (block 920), transmitting the response data transaction message (block 922), and modifying the data stored in the portion of the shared data structure 320, or electronic ledger 732, (block 924). Alternatively, if all, or alternatively, the requisite subset, of the identified participants did not validate the request to modify data, the operation of the system 700 includes generating a response data transaction message (block 926), transmitting the response data transaction message (block 928), and not modifying the data stored in the portion of the shared data structure 320, or electronic ledger 732, (block 930). Alternatively, or in addition thereto, the data stored in the portion of the shared data structure 320 may be modified or otherwise augmented to reflect that not all, or the requisite subset, of the identified participants validated the request. It will appreciated that to ensure the integrity of the transactional record reflected in the shared data structure 320, once notification of a requested change is transmitted, the request will be permanently stored in the portion of the data structure 320. However, until such time as the requisite validation responses are received, the stored request will be "incomplete" and not valid. In this manner, lost or interrupted request/validation exchanges can be recognized.

Where the data transaction request message comprises a notification data transaction message, the operation of the system 700 includes processing a request to modify data (block 932), and validating the request to modify data (block 934). In particular, the request may be validated by communicating it, e.g. automatically upon receipt, via the user interface 712 or otherwise, to an external reviewer and/or to external business logic/business rules 718 which evaluate the request to determine whether it is valid or not, and indication of which is then communicated back to the system 700. The external business logic/business rules 718 may comprise one or more external devices, computer programs or combinations thereof, coupled with the system 700 via a network, such as the network 1018 described below with respect to FIG. 10, and which may be operated by the same entity which operates the system 700 or a different entity such as a regulatory or oversight entity. The business logic/business rules 718 may implement processes for evaluating requests, such as for: calculating values, comparing those values with the request and determining whether they are equivalent or within a defined tolerance; for identifying and verifying requests with independent sources; or for apply subjective and/or objective standards or measures. The operation of the system 700 further includes generating a validation data transaction message (block 936), such as based on the result communicated from the business logic/business rules 718, and transmitting the validation transaction message (block 938). The operation of the system 700 further includes receiving a response data transaction message (block 940), and determining whether the request to modify has been approved from the response data transaction message (block 942) and based thereon, modifying the portion of the shared data structure 320, or electronic ledger 732, (block 944). If the data request has not been approved, the operation of the system 700 further includes removing the data stored in the shared data structure 320 according to the request (block 946). In particular, the data stored in the shared data structure 320 may be left in an incomplete state, e.g. missing data indicating the validation thereof, or otherwise modified to indicate that the request was not approved. Alternatively, the data may be removed from the shared data structure 320. In some embodiments of the system 700, the data indicative of the request to modify data stored in the portion of the shared data structure, or electronic ledger 732, further includes data which identifies the at least one other participant to validate the request. Similarly, the data stored in the portion of the shared data structure 320 or electronic ledger 732, may further include data which identifies the at least one other participant to validate the request, or the data which identifies the at least one other participant may be stored in the memory 714 as part of a list of participants. The list of participants may be preapproved with particular roles, such as for example, a list of witnesses, or the like.

In one embodiment, each ledger device 502A, 502B, 502C, 502n may maintain data indicative of all of the other devices 502A, 502B, 502C, 502n, e.g. a list or other data structure, wherein the list may comprise, for example, an address book or directory, which may be stored, for example, in the memory 714, and which identifies the other ledger devices 502A, 502B, 502C, 502n for the purpose of sending/addressing data transaction messages to the other devices 502A, 502B, 502C, 502n and validating/identifying the sender of received data transaction messages. This directory may further include the public keys associated with all of the other devices 502A, 502B, 502C, 502n for use in validating signatures, etc. In addition, this directory may include data indicative of the present status of the other device 502A, 502B, 502C, 502n, e.g. whether they are active or currently connected to the network, or otherwise available to transact.

Further the ledger devices 502A, 502B, 502C, 502n may implement a protocol whereby upon joining the system, new or returning devices 502A, 502B, 502C, 502n may broadcast a message, such as an address book update, or otherwise indicate their presence to the other devices 502A, 502B, 502C, 502n so that they may update their directories. In one embodiment, a joining or returning device 502A, 502B, 502C, 502n may broadcast a request message requesting all other devices 502A, 502B, 502C, 502n respond with a message identifying themselves, e.g. their present status, public key, etc., to the joining/returning device 502A, 502B, 502C, 502n so that it may update its address book data. Similarly, upon disconnection or otherwise unavailability of a device 502A, 502B, 502C, 502n, that device 502A, 502B, 502C, 502n may broadcast a message indicative thereof so that the other devices 502A, 502B, 502C, 502n may update their directories. Further, the devices 502A, 502B, 502C, 502n may each periodically transmit a message to all of the other devices 502A, 502B, 502C, 502n to indicate their status, e.g. a heartbeat, to, for example, periodically confirm its availability to all other ledger devices 502A, 502B, 502C, 502n which then update their directories based thereon.

In some embodiments the operation of the system 700 the generating of the notification data transaction message may further include encoding or otherwise encrypting and/or augmenting the generated notification data transaction message with data indicative of the cryptographic signature of the participant. This ensures the confidentiality of the transactions. One such way to achieve this would be wherein the participant uses a public key signing protocol to encrypted and/or sign the notification data transaction message.

Similarly, in some embodiments the operation of the system 700, the validation data transaction messages received by the participant may be cryptographically signed. For example, the cryptographic signatures accompanying the validation data transaction messages may be augmented with data indicative of a public key signing protocol.

In some embodiments of the operation of the system 700, the request to modify data stored in the portion of the shared data structure 320, or electronic ledger 732, may further include a request to add new data to the portion of the shared data structure or a request to modify data previously stored in the portion of the shared data structure. The data to be added may comprise one or more assertions of a factual belief held by the participant, e.g. which relate to the participant and one other participant (bilateral), such as an agreement or a revocation of a prior agreement. Or the data to be added could be any assertion(s) of fact, e.g. assertion of license, authorization, accreditation, or revocation thereof, etc. A given proposal could comprise multiple assertions, e.g. multiple revocations of previous assertions or agreements.

In some embodiments of the operation of the system 700, the portion of the shared data structure 320, or electronic ledger 732, may comprise a sub-data structure for storing data indicative of permutations of the participant and others of the plurality of participants. These sub-data structures may be the partitions 702, 704, or 706 stored in the electronic ledger 732. Accordingly, the sub-data structure for each combination may further include data indicative of transactions there between, and the transactions are linked together.

In some embodiments of the operation of the system 700, the request to modify data in the portion of the shared data structure, or electronic ledger 732, may include data indicative of a request to indicate that a completed prior request to modify data in the portion of the shared data structure has been confirmed or rejected.

In some embodiments of the operation of the system 700, the request data transaction message may be received from the participant via a user interface 712 coupled with the processor 710.

In some embodiments of the operation of the system 700, there may be an expiration time associated with one or more of the data transaction messages. For example, a notification data transaction message may comprise an expiration time (e.g. a so called "Time-to-Live" window of time) by which a response thereto must be received (measured from, for example, when the notification data transaction message is generated or transmitted), and wherein a failure to receive a response by the expiration time is indicative of a rejection or alternatively an acceptance. Validation data transaction messages may similarly include an expiration time. For example, where the validation data transaction message further comprises an expiration time by which a response thereto must be received, and wherein a failure to receive a response by the expiration time is indicative of a rejection or alternatively an acceptance.

FIG. 7B depicts a more detailed block diagram of the BDL device of FIG. 7A according to one embodiment. The system includes a network interface 708, a set of instructions 716, a transaction receiver 720, an identification processor 722, a data modifier 724, a message generator 726, a message transmitter 728, and a validation determiner 730.

The transaction receiver 720, which may be implemented as a separate component or as one or more logic components, such as on an FPGA which may include a memory or reconfigurable component to store logic and processing component to execute the stored logic, or as first logic 720, e.g. computer program logic, stored in a memory 1012 shown in FIG. 10 and described in more detail below with respect thereto, or other non-transitory computer readable medium, and executable by a processor, 1004 shown in FIG. 10 and described in more detail below with respect thereto, to cause the processor to, or otherwise be operative to, receive data transaction messages and, upon receipt, and determine whether the received data transaction message comprises a request data transaction message comprising data indicative of a request by the participant to modify data stored in the portion of the shared data structure 320, or electronic ledger 732, or a notification data transaction message comprising data indicative that a request has been made to modify data stored in another portion of the shared data structure 320, or electronic ledger 732. The transaction receiver 720 may be further operative to receive, responsive to previously transmitted notification data transaction messages, validation data transaction messages from each of a set of identified at least one other participants, i.e. the ledger device 502B, 502C, 502*n* associated therewith, each of the received validation data transaction messages comprising data indicative of a response to the request to modify data stored in the portion of the shared data structure. Similarly, the transaction receiver 720 may be further operative to receive a response data transaction message from the participant, i.e. the ledger device 502B, 502C, 502*n* associated therewith, the response data transaction message comprising data indicative of a confirmation of receipt by the participant, i.e. the ledger device 502B, 502C, 502*n* associated therewith, of the validation transaction message, and determining, whether the received response data transaction message comprises data indicative of a confirmation that the data in the other portion of the shared data structure 320, or electronic ledger 732, has been modified or not.

The identification processor 722, which may be implemented as a separate component or as one or more logic components, such as on an FPGA which may include a memory or reconfigurable component to store logic and processing component to execute the stored logic, or as second logic 722, e.g. computer program logic, stored in a memory 1012 shown in FIG. 10 and described in more detail below with respect thereto, or other non-transitory computer readable medium, and executable by a processor 1004 shown in FIG. 10 and described in more detail below with respect thereto, to cause the processor to, or otherwise be operative to, based on a request data transaction message, identify at least one other participant of the plurality of participants, i.e. the ledger device 502B, 502C, 502*n* associated therewith, to validate modifications, such as via the business logic/business rules 718, to the data. As discussed above, each ledger device 502A, 502B, 502C, 502*n* may maintain a directory of all, or at least a subset of, other ledger devices 502A, 502B, 502C, 502*n*.

The data modifier 724, which may be implemented as a separate component or as one or more logic components, such as on an FPGA which may include a memory or reconfigurable component to store logic and processing component to execute the stored logic, or as third logic 724, e.g. computer program logic, stored in a memory 1012 shown in FIG. 10 and described in more detail below with respect thereto, or other non-transitory computer readable medium, and executable by a processor 1004 shown in FIG. 10 and described in more detail below with respect thereto, to cause the processor to, or otherwise be operative to, modify a portion of the shared data structure 320, or electronic ledger 732, to indicate validation is pending based on a request data transaction message. Similarly, the data modifier 724 may be further operative to modify data based a response data transaction message comprises data indicative of a confirmation that data in another portion of the shared data structure 320, or electronic ledger 732, has or has not been modified. In particular, the data stored in the shared data structure 320 may be left in an incomplete state, e.g. missing data indicating the validation thereof, or otherwise modified or augmented to indicate that the request was not approved. Alternatively, the data may be removed from the portion of the shared data structure 320, or electronic ledger 732.

The message generator 726, which may be implemented as a separate component or as one or more logic components, such as on an FPGA which may include a memory or reconfigurable component to store logic and processing component to execute the stored logic, or as fourth logic 726, e.g. computer program logic, stored in a memory 1012 shown in FIG. 10 and described in more detail below with respect thereto, or other non-transitory computer readable medium, and executable by a processor 1004 shown in FIG. 10 and described in more detail below with respect thereto, to cause the processor to, or otherwise be operative to, generate a notification data transaction message for each identified participant, i.e. the ledger device 502B, 502C, 502*n* associated therewith, the notification data transaction message comprising data indicative of the request to modify the data in the portion of the shared data structure 320, or electronic ledger 732. Similarly, the message generator 726 may be further operative to generate a response data transaction message for each of the identified at least one other participants, i.e. the ledger device 502B, 502C, 502n associated therewith, comprising data indicative that the data in the portion of the shared data structure 320, or electronic ledger 732, has not been modified if less than all of the identified other participants have validated the request. The message generator 726 may also be operative to generate a validation data transaction message comprising data indicative of a response, based on the validation, to the request to modify data stored in the other portion of the shared data structure 320, or electronic ledger 732.

The message transmitter 728, which may be implemented as a separate component or as one or more logic components, such as on an FPGA which may include a memory or reconfigurable component to store logic and processing component to execute the stored logic, or as fifth logic 728 e.g. computer program logic, stored in a memory 1012 shown in FIG. 10 and described in more detail below with respect thereto, or other non-transitory computer readable medium, and executable by a processor 1004 shown in FIG. 10 and described in more detail below with respect thereto, to cause the processor to, or otherwise be operative to, transmit generated notification data transaction messages, response data transaction, and validation data transaction messages to the associated one of the identified at least one other participants, i.e. the ledger device 502B, 502C, 502n associated therewith.

The validation determiner 730, which may be implemented as a separate component or as one or more logic components, such as on an FPGA which may include a memory or reconfigurable component to store logic and processing component to execute the stored logic, or as sixth logic 732, e.g. computer program logic, stored in a memory 1012 shown in FIG. 10 and described in more detail below with respect thereto, or other non-transitory computer readable medium, and executable by a processor 1004 shown in FIG. 10 and described in more detail below with respect thereto, to cause the processor to, or otherwise be operative to, validate whether all of the identified other participants, i.e. the ledger device 502B, 502C, 502n associated therewith, have validated the request to modify the data in the portion of the shared data structure 320, or electronic ledger 732, based on received validation data transaction messages. Similarly, the validation determiner 730 may be further operative to validate, based on notification data transaction messages, requests to modify data stored in the other portion of the shared data structure stored in a different ledger device 502B, 502C, or 502n.

FIGS. 9A-9D depict a flow chart 900 showing operation of the system 700 of FIGS. 7A-7B. In particular FIGS. 9A-9D shows a computer implemented method for implementing a real time reconciling shared data structure among a plurality of participants, i.e. the ledger devices 502B, 502C, 502n associated therewith, the shared data structure 320 being stored in a memory 1012 shown in FIG. 10 and described in more detail below with respect thereto, a portion of the shared data structure 320, or electronic ledger 732, being coupled with a processor 1004 shown in FIG. 10 and described in more detail below with respect thereto. The operation of the system 700 includes receiving a data transaction message from a participant, i.e. the ledger device 502B, 502C, 502n associated therewith, (block 902). The operation of the system 700 further includes determining whether the data transaction message is a request data transaction message or is a notification data transaction message (block 904). In the case of a request data transaction message, the operation of the system 700 includes processing of a request data transaction message (block 906). The operation of the system includes identifying a participant, i.e. the ledger device 502B, 502C, 502n associated therewith, to validate modifications to data (block 908). Modifying a portion of a shared data structure 320, or electronic ledger 732, according to the identified participant, i.e. the ledger device 502B, 502C, 502n associated therewith, (block 910). The operation of the system further includes generating a notification data transaction message (block 912). Transmitting the notification data transaction message (block 914). Further, receiving, in response to the notification data transaction message, a validation data transaction message (916). The operation of the system 700 includes determining if all, or a requisite subset of, identified participants, i.e. the ledger device 502B, 502C, 502n associated therewith, have validated the request to modify data (918). If all, or the requisite subset of, the identified participants, i.e. validation responses have been received from the ledger devices 502B, 502C, 502n associated therewith, have validated the request to modify data, generating a response data transaction message (block 920), transmitting the response data transaction message (block 922), and modifying the data stored in the portion of the shared data structure 320, or electronic ledger 732 (block 924). Alternatively, if all of the identified participants did not validate the request to modify data, generating a response data transaction message (block 926), transmitting the response data transaction message (block 928), and not modifying the data stored in the portion of the shared data structure 320, or electronic ledger 732 (block 930).

In the case of a notification data transaction message, the operation of the system further includes processing a request to modify data (block 932), validating the request to modify data (block 934), generating a validation data transaction message (block 936), and transmitting the validation transaction message (block 938). As describe above, validation of the request may be implemented via the business logic/business rules 718 to which the request is provided, e.g. automatically upon receipt thereof. The operation of the system further includes receiving a response data transaction message (block 940), and determining whether data has been modified from the response data transaction message (block 942). If the data has been modified, modifying the portion of the shared data structure 320, or electronic ledger 732 (block 944). If the data has not been modified, removing the data stored in shared data structure according to the request (block 946). Alternatively, the data stored in the shared data structure 320 may be left in an incomplete state, e.g. missing data indicating the validation thereof, or otherwise modified to indicate that the request was not approved.

Some embodiments of the system 700 may further include generating a recovery data transaction message comprising data indicative of the participant's identity (block 948), and a request for data stored at each of the at least one other participants corresponding to the participant to be transmitted to the participant. The operation of the system 700 may include transmitting by the network interface 708, which may comprise the network interface 1018 shown in FIG. 10 and described in more detail below with respect thereto, the recovery data transaction message to each of the at least one other participants (block 950). The operation of the system 700 may receive a response to the recovery data transaction message (block 952), wherein the response includes data corresponding to the request for data, and store the data received in the response to the recovery data transaction message (block 954). Similarly, the operation of the system may include receiving a recovery data transaction message comprising data indicative of at least one other participant's identity, and a request for data stored in the participant's portion of the shared data structure, or electronic ledger 732, corresponding to the at least one other participant to be transmitted to the at least one other participant (block 956). The operation of the system may then include searching for data corresponding to the request, in the portion of the shared data structure 320, or electronic ledger 732, (block 958) and transmit a response to the recovery data transaction message to the requesting at least one other participant including data indicative of the results of the search (block 960). Alternatively, if no results are found, no response is sent, or if no results are found, a response indicating that no results are found is sent.

An example implementation of BDL, which may be implemented by the system 700 shown in FIGS. 7A and 7B, is described below. The example implementation includes an example protocol for which may be implemented by the ledger devices 502A, 502B, 502C, 502n for the generation and processing of data transaction messages as described above, which includes pseudo code examples showing an example implementation.

A ledger device, such as ledger device 502A described above, may be implemented using computer code, shown below in pseudo code, stored as instructions, such as the instructions 716 in FIG. 7A described above, or 1010 in FIG. 10, is described below. A ledger device 502A may store proposals between participants as described above in a portion of a shard data structure 320, e.g. an electronic ledger 732. Those proposals may be stored as entries in the electronic ledger 732. Electronic ledgers 732 may be further composed of partitions, such as partitions 702, 704, or 706, which correspond to permutations of participants pairs. For example, if participant P1 sends a proposal to P2, then Entry(P1 to P2) will be in Partition(P1 to P2). Note that Partition(P2 to P1) is not the same as Partition(P1 to P2). This partitioning by counterparty pair is done to prevent throughput bottlenecks Each partition 702, 704, 706 in the electronic ledger 732 would have a corresponding partition in their counterparty's electronic ledger. Partition(P1 to P2) will be present in Ledger(P1) and Ledger(P2). The order of entries themselves will be identical except that an entryID and a counterparty-EntryID would be reversed and the signatures will be the counterparty's signatures, .e.g. effectively/logically being countersigned.

Each Entry may have the following information:

```
class Entry {
    byte[ ]              transactionID;
    long                 entryID;
    long                 counterpartyEntryID;
    byte                 observerRole;
    String               proposerURL;
    Assertion[ ] assertions;
    Signature[ ] signatures;
    byte                 state;
    String               comments;
    byte[ ]              hash;}
```

The transactionID may be a globally unique ID that is generated when a proposal is made. It is generated by the proposer. A suggested method for generating this ID is based on using an IP address of the node (reverse lookup of the URL—4 bytes), the entryID and some other random bytes (e.g. a timestamp for the proposal) to make the transactionID around 20 bytes. This transactionID ties proposal entries across various participants. Effectively the transactionID may be thought of as a proposal ID.

The entryID may be an increasing sequence unique to the entire electronic ledger. It is used as a security measure so that the counterparty can never predict the next number and forge an entry with a stolen key.

The counterpartyEntryID is the counterparty's unique ID for their corresponding entry in their electronic ledger.

The observerRole when present, indicates that the entry exists because a witness or watcher was named on the proposal. If not for this attribute, it would be difficult to identify entries that exist for the sole purpose of recovery. The values for the observerRole can be WATCHER or WITNESS.

The proposerURL is the URL (or identity) of the proposer.

The assertions are the actual assertions. See the Assertion data structure described below.

The signatures are the signatures of the counterparty (whether it be a witness or a participant). Signatures are based on the hash of the Entry.

The state may be enumerated values such as PROPOSED, ACCEPTED, REJECTED, ABANDONED, CONFIRMED, REVOKED, REPLACED. Further explanation for the enumerated values is provided below.

The comments is a general string that contains information useful for understanding the current state.

The hash combines the hashes of all the assertions and the previous partition hash.

Each Assertion may have the following information:

```
class Assertion {
    long       assertionID;
    long       referenceID;
    byte       type;
    byte[ ]    statement;
    String     counterparty;
    int        transactionPart;}
```

The assertionID may be an increasing sequence. It is unique for the partition. assertionID is required to ensure that individual assertions can be referenced in future assertions for revocation or replacement.

The referenceID is optional and its presence indicates that this assertion references a previous one. It can be used to retrieve the previous assertion for business processing.

The type can be enumerated values. They may represent the following operations: New, Replace, Revoke. A NEW operation indicates that this assertion does not affect any previous assertion although it may have a referencing assertion. A REPLACE operation indicates that this assertion supersedes an existing assertion referenced by referenceID. A REVOKE operation simply indicates that the assertion referenced by referenceID is being revoked. Revoked/Replaced assertions are eligible for compaction and/or archival. Default for missing value is NEW.

The statement may be the actual assertion bytes that have business context and content. The statement may be thought of as a payload. statement is left to the higher-level business application that is using this protocol to interpret it. It may or may not be encrypted with the public key of the recipient depending on the wire protocol.

The counterparty is the counterparty on the assertion. It options and is assumed to be proposer when omitted. In the case that it is mentioned and is different from the proposer, it implies that the proposer is a third party that is brokering the deal.

The transactionPart indicates the entry fraction. In other words, if a proposal spans participants and results in N entry requests (one for each participant) then this entry is one of several. It can be represented as M/N. The first 2 bytes of the integer denote M, the numerator and the last 2 bytes denote N, the denominator.

Signatures may have the following information:

```
class Signature {
    String      algorithm;
    byte        involvement;
    byte[ ]     signature;
    String      url;}
```

The algorithm identifies the cryptographic algorithm used to sign the hash of the Assertion.

The role indicates the involvement of the signatory such as a PARTICIPANT, WITNESS or WATCHER.

The signature is the actual signature of the participant. Note that the signatures may be done using cryptographic symmetric keys for shorter key lengths. For this the implementation may support negotiation of a symmetric key via assertions. This will also help with sealing the partition from time to time. Signature has to include entry hash and participant role (PARTICIPANT, WITNESS, WATCHER).

The url represents the URL for witness or participant identity from where the certificate to verify the signature will be obtained. URL stands for Uniform Resource Locator, and is often used to identify locations in a computer network where users, resources, and other computing assets may be located. The certificate's authenticity must be verifiable via the issuer.

The protocol for implementing a BDL in this example may be understood in 3 phases: Bootstrapping, Session, Recovery. The phases can be understood by considering sample pseudo-code. The pseudo code also exemplifies potential features of the protocol.

Bootstrapping refers to the beginning of the protocol and the building of an electronic ledger. When a participant initializes a BDL in one implementation what may happen is the underlying shared data structure 320 needs to be configured and initialized. At the beginning of the bootstrapping phase of the protocol no network connections have been established. A sample Electronic Ledger creation may look like the pseudo code below:

Ledger ledger=new Ledger("ledger name", certificate, privateKey, datastore, url);

If an electronic ledger by that name exists in the shared data structure 320 then the shared data structure 320 is checked for consistency. If not a new electronic ledger is initialized in the shared data structure 320. The act of creation could also result in the electronic ledger becoming active on the url specified, ready to receive data. The url can be any protocol and implementers may support as many protocols as possible.

Participants, i.e. the ledger device 502B, 502C, 502n associated therewith, may rely primarily on the url of the counterparty to attempt a connection with a counter party, i.e. the ledger device 502B, 502C, 502n associated therewith. In one embodiment, to determine what wire format needs to be used, for example a plain http GET request may be issued over HTTPS to the host specified. If the client responds with 200 OK then a REST may be assumed over HTTPS. Any 301/302 to a different port may imply a different protocol. The certificate returned by the server is the one that will be used to check the signature. A trust authority that all participants trust may issue the certificate.

Participants may also be prepared to send their certificate if mutual authentication is mandated (private network). In such a case the server is free to accept or reject the connection based on the client certificate submitted.

The session may be divided into two sub phases: Proposal, and Confirmation. The proposal phase may be initiated when an electronic ledger owner desires to assert one or more statements with one or more participants of the network. The "proposer" then creates appropriate proposal with assertions and proposes it for consideration as a whole to all participants. One example of how to do this is listed below in pseudo code:

String transactionID=ledger.propose(timeout, proposal);

A proposal may be multiple entries consisting of assertions grouped by counterparty. The timeout parameter determines how long the proposer will wait for signatures. The act of proposing may be a durable synchronous operation. But, as described above, if any of the nodes are not reachable or if the proposer were to be interrupted before the call returns—then the proposal is abandoned, i.e. there may be no way to know if the entry was transmitted or otherwise received. It will be recorded as such, i.e. left in an incomplete state or otherwise augmented with data indicative that it has been abandoned. The entries will be persisted in the proposer's electronic ledger but the counterparties may be missing the proposer's signature.

At the point of the proposal each entry in entries is only partially filled. The entry will be missing the actual signature. The electronic ledger then takes each assertion and proceeds to connect to every participant to obtain signatures. The receiving participant can verify each assertion, such as by applying their business logic/business rules 718 to determine whether the assertion is correct, and choose to sign the entry as a whole and send it back within the timeout interval or choose to reject the entry. If the entry is rejected then the proposer may invalidate the entire submission by sending out cancellations to participants. If all participants and witnesses sign the proposal then the confirmation phase is executed after the business logic is executed, as shown in the pseudo code below:

```
// Business logic goes here
ledger.confirm(transactionID);
```

In the confirmation phase the proposing electronic ledger will automatically sign all the entries that it is a participant on and send out confirmations. Witnesses will get all the signatures; participants and third parties will get their respective counterparty signatures. The proposing electronic ledger will also record all the entries.

The above protocol behaves in a manner where there is a distinct "prepare" and "commit" phase. If the electronic ledger is in the same shared data structure 320 as the business data then distributed transaction processing is not required and the confirmation will commit to the store along with business data. If the business data resides on a different store then the stores have to participate in distributed transaction processing. The messaging layer does not have to participate since electronic ledgers automatically reconcile. For example, if the confirms fail to be sent out after commit, if for example a proposer were to lose network connection during a transaction, the confirms get sent out when proposer reestablishes network connection. Additionally, the electronic ledger may also support an asynchronous mode for proposal submission and confirmation. This is important for higher throughput. A proposal is shown in the pseudo code below:

String transactionID=ledger. submit(proposal);

This varies from propose( ) in the sense that this call returns immediately after putting the request in a persistent queue (implementation will have to support this). Since every electronic ledger will have a listener to process incoming requests the same listener can be used to receive new proposal, rejections and confirmations as well. The pseudo code below shows a listener:

```
ledger.setListener(new Listener( ) {
    void process(Ledger, Proposal proposal) {
        // Business code
        return;
    }
});
```

Proposals are broken down into entries and transmitted to counterparties and the counterparties reconstitute the various entries by transactionID and transactionPart into a proposal for processing. A proposal may ultimately be comprised of Entry(s). Each Entry may be in a different state. The proposal status is the lowest status across the entries.

The status can take the following values PROPOSED, ACCEPTED, REJECTED, ABANDONED and CONFIRMED.

The status PROPOSED is when one is the recipient of a proposal. Acceptance of each entry can be done via signing it or rejecting it As shown in the pseudo code below:

```
ledger, sign (entry);
// Or in case of rejection
ledger.reject(entry, "Entry makes no sense"); // Reason goes into
the entry comments
```

The recipient may alternatively choose to sign or reject the entire proposal as shown in the pseudo code below:

```
ledger, sign (proposal);
// Or in case of rejection
ledger.reject(proposal, "Proposal makes no sense"); // Reason
goes into the entry comments
```

The proposer may choose to pre-sign the proposal if there is only one counter party. This implies that the proposer does not intend to send a confirmation. In such a case signing the entry will automatically make it CONFIRMED. The state ACCEPTED on an entry will be present when the recipient signs and sends back the proposal. The state REJECTED on an entry will be present when the recipient does not sign and rejects the proposal. When a proposal is rejected other participants are immediately notified via sending an ABANDONED entry. If the entry is awaiting processing on the other side it will be taken out of the processing queue quietly. The proposer however will get all the entries back with for processing together. The state ABANDONED on an entry will be present when the one REJECT is received or if the entry proposal is timed out or interrupted. CONFIRMED is sent to the counterparties when the proposer explicitly confirms the proposal after receiving all the signatures. Upon receipt of this confirmation the recipient may make permanent state changes to the business data. Recovery is a data recovery protocol. Upon loss or corruption of an electronic ledger the electronic ledger may automatically recover over a period of time as and when new entries are received or sent. When entries are received with hashes that don't tally or with assertions whose sequence numbers don't match the current chain, the electronic ledger may automatically request all the transactions from the counterparty. The recipient with the longest chain automatically wins. A lost or corrupt electronic ledger may be explicitly recoverable by asking all counterparties for the history as shown in the pseudo code below:

ledger.reconcile(url);

In the case when the counterparties are not known the protocol may support a forced reconciliation every couple of hours. This will ensure faster recovery and continuous monitoring of electronic ledger state. An explicit reconcile can be invoked on specific entries. Although it may be rarely used it can be used to restore archived or compacted entries as shown in the pseudo code below:

ledger.reconcile(url, entryIDs);

Alternate forms of reconciliation may be supported by transactionID or by entryID. This is required to ensure that participants can choose to do sanity checks whenever data loss or tampering is suspected An example implementation of BDL may involve four participants P1, P2, P3, P4, and one witness (W1) and one watcher (W2). Assume P1 makes an assertion stating that P2 owes him $10 with W1 as the witness. The code to implement this example is listed below. To make this assertion P1 creates a proposal with the assertion naming P2 as the counterparty, W1 as the witness and proposes it, as shown in the pseudo code below:

```
// Create a proposal. Proposal simply extends Entry
Proposal = new Proposal( );
// Add observer
proposal.addObserver("witnessW1.com", ObserverRole.WITNESS)
// Assert that Pl is owed $5. Counterparty when not specified is
assumed to be the proposer
proposal.assert("P2 owes P1 $5", Assertion.Type.NEW,
"participantP2.com");
    ledger.propose(20, proposal);
```

What is transmitted shows the proposal is broken into entries with assertion and transmitted:

```
Proposal (P1 to P2): {
    transactionID: "68.61.66.164:113:1938458923485"
    entryID: 113
    proposerURL: "participantP1.com"
    state: PROPOSED
    hash:
aaad657f285a46c73e95c6143006cb6f89f26e6fbd4d3a75072c5d62
cf687b94
    assertions: {
        assertionID: 23
        statement: "P2 owes P1 $5"}
    signatures: {
        algorithm: "SHA256withRSA"
        url: "participantP2.com"
    }
}
Proposal (P1 to W1): {
    transactionID: "68.61.66.164:113:1938458923485"
    entryID: 113
    observerRole: WITNESS
    proposerURL: "participantP1.com"
```

```
        state: PROPOSED
        hash:
aaad657f285a46c73e95c6143006cb6f89f26e6fbd4d3a75072c5d62
cf687b94
        assertions: {
            assertionID: 47
            statement: "P2 to P1 $5"
        }
        signatures: {
            algorithm: "SHA256withRSA"
            role: WITNESS
            url: "witnessW1.com"
        }
    }
}
```

Only data that is required is sent. The rest is omitted or assumed. Since there are two parties, the proposer's signature is omitted. The proposer's signature will be sent in the confirm phase. Assuming that P1 agrees and W1 agrees too and countersigns the entries what is sent back is the following as shown in the pseudo code below:

```
Accept (P2 to P1): {
    entry ID: 634
    counterparty Entry ID: 113
    state: ACCEPTED
    signatures: {
        signature:
a324ecaad219e62c4dbe950fd47b04df686101c58b7ee1959c8289
62ed088dac...
        url: "participantP2.com"
    }
}
Accept (W1 to P1): {
    entryID: 739
    counterparty Entry ID: 113
    state: ACCEPTED
    signatures: {
        signature:
7cd0ac8a4ed5a5e838197d3b11c8fc1daf82de7533ee3ac6768c5063
842e72b4...
        url: "witnessW1.com"
    }
}
```

```
Confirm (P1 to P2): {
    transactionID: "68.61.66.164:113:1938458923485"
    entry ID: 113
    counterparty Entry ID: 634
    state: CONFIRMED
    signatures: {
        signature:
c54cca937034b9a196e4b03991647f09c423fcbf63bc3e9a7dfb0727f52
9946d...
        url: "participantP1.com"
    },
    {
        signature:
7cd0ac8a4ed5a5e838197d3b11c8fc1daf82de7533ee3ac6768c5063842
e72b4...
        url: "witnessW1.com"
    }
}
Confirm (P1 to W1): {
    transactionID: "68.61.66.164:113:1938458923485"
    entry ID: 113
    counterparty Entry ID: 739
    state: CONFIRMED
    signatures: {
        signature:
c54cca937034b9a196e4b03991647f09c423fcbf63bc3e9a7dfb0727f52
9946d...
        url: "participantP1.com"
    },
    {
        signature:
a324ecaad219e62c4dbe950fd47b04df686101c58b7ee1959c828962ed
088dac ...
        url: "participantP2.com"
    }
}
```

Confirm may be a data structure that has multiple entries. This completes the session. If we were to take a look at the electronic ledger of P1, we would have two entries appended to the ends of the counterparty chains. The entry E113 appended to end P1 to P2 would look like this as shown in the pseudo code below:

```
Entry (P1 to P2): {
    transactionID: "68.61.66.164:113:1938458923485"
    entryID: 113
    counterparty Entry ID: 634
    proposerURL: "participantP1.com"
    state: CONFIRMED
    hash:
aaad657f285a46c73e95c6143006cb6f89f26e6fbd4d3a75072c5d62cf
687b94
    assertions: {
        assertionID: 23
        statement: "P2 to P1 $5"
    }
    signatures: {
        algorithm: "SHA256withRSA"
        role: PARTICIPANT
        signature:
a324ecaad219e62c4dbe950fd47b04df686101c58b7ee1959c828962ed
088dac...
        url: "participantP2.com"
    }
}
```

Similarly the entry E113 appended to the P1 to W1 will look the same expect for the signature section as shown in the pseudo code below:

```
Entry (P1 to W1): {
    transactionID: "68.61.66.164:113:1938458923485"
    entryID: 113
    counterparty Entry ID: 739
    observerRole: WITNESS
    proposerURL: "participantP1.com"
    state: CONFIRMED
    hash:
aaad657f285a46c73e95c6143006cb6f89f26e6fbd4d3a75072c5d62
cf687b94
    assertions: {
        assertionID: 23
        statement: "P2 to P1 $5"
    }
    signatures: {
        algorithm: "SHA256withRSA"
        role: PARTICIPANT
        signature:
c54cca937034b9a196e4b03991647f09c423fcbf63bc3e9a7dfb0727
f529946d...
        url: "participantP1.com"
    },
```

W1 will have this persisted as shown in the pseudo code below:

```
Entry (W1 to P1): {
    transactionID: "68.61.66.164:113:1938458923485"
    entryID: 739
    counterparty Entry ID: 113
    observerRole: WITNESS
    proposerURL: "participantP1.com"
    state: CONFIRMED
    hash:
aaad657f285a46c73e95c6143006cb6f89f26e6fbd4d3a75072c5d62
cf687b94
    assertions: {
        assertionID: 23
        statement: "P2 to P1 $5"
    }
    signatures: {
        algorithm: "SHA256withRSA"
        role: PARTICIPANT
        signature:
c54cca937034b9a196e4b03991647f09c423fcbf63bc3e9a7dfb0727
f529946d...
        url: "participantP1.com"
    },
    {
        algorithm: "SHA256withRSA"
        role: PARTICIPANT
        signature:
a324ecaad219e62c4dbe950fd47b04df686101c58b7ee1959c828962
ed088dac ...
        url: "participantP2.com"
    }
}
```

The assertionID in W1 electronic ledger will be the original value in the transaction. It is not an assertion between P1 and W1. Now let's say that P1 ends up owing P3 and P4 $2.50 each at some point in the future. To do this P1 would have to make 5 assertions, Revoke existing assertions with P2, P3, and P4, and Assert 2 new assertions (third party), P2 to P3 and P2 to P4. Code wise this may look like the pseudo code below:

```
// Create a proposal
Proposal = new Proposal( );
// Add watcher
proposal.addObserver("watcherW2.com",
ObserverRole.WATCHER);
    // Assert that the revocations. Last arg is the referenceID.
Counterparty is implicitly this
    // ledger (P1) i.e. the proposer
    proposal.assert("P2 to P1 $0", Assertion.Type.REVOKE, 23,
"participantP2.com");
    proposal.assert("P1 to P3 $0", Assertion.Type.REVOKE, 45,
"participantP3.com");
    proposal.assert("P1 to P4 $0", Assertion.Type.REVOKE, 57,
"participantP4.com");
    // Assert that $2.50 is owed to P3 and P4. Last argument is the
counterparty. Specified
    // explicitly since P1 is the third party brokering the deal
    proposal.assert("P2 to P3 $2.50", Assertion.Type.NEW, 0,
"participantP3.com", "participantP2.com");
    proposal.assert("P2 to $2.50", Assertion.Type.NEW, 0,
"participantP4.com", "participantP2.com");
    // Propose with a timeout of 20 seconds
    ledger.propose(20, proposal);
```

One thing to note is that when the counterparty on an assertion in a proposal is not explicitly specified it is assumed to be the proposer. When it is explicitly specified (as in the $2.50 case), it implies that the proposer is proposing the assertion as a third party. The messages that are sent back and forth are similar to the first example but the third party proposals are handled differently. Here is the first message that will be sent out from P1 the proposer, to P2, as shown in the pseudo code below:

```
Proposal (P1 to P2): {
    transactionID: "68.61.66.164:113:1938487366027"
    entry ID: 125
    proposerURL: "participantP1.com"
    state: PROPOSED
    hash:
7fcc1e1be0190ae2a93fcb7ce357a2865aecf8bdae22b50d8d9a4569
26a6a671
    assertions: {
        assertionID: 25
        referenceID: 23
        type: REVOKE
        statement: "P2 to P1 $0"
    }
    assertions: {
        assertionID: 26
        statement: "P2 to P3 $2.50"
        counterparty: "participantP3.com'
        transactonPart: "1/2"
    }
    assertions: {
        assertionID: 27
        statement: "P2 to P4 $2.50"
        counterparty: "participantP4.com'
        transactonPart: "1/2"
    }
    signatures: {
        algorithm: "SHA256withRSA"
        url: "participantP2.com"
    }
}
```

The last two assertions in the previous message are third party assertions. They contain counterparty information that identifies the counterparty for that specific assertion. The transactionPart that specified in these assertions are intended to be forwarded to the counterparty so that the counterparty can "wait for" all assertions to arrive before processing. Here is the next message that will be sent out from P1 the proposer, to P3, as shown in the pseudo code below:

```
Proposal (P1 to P3): {
    transactionID: "68.61.66.164:113:1938487366027"
    entry ID: 125
    proposerURL: "participantP1.com"
    state: PROPOSED
    hash:
628d68a88fd6bbbf4930ecb5d279643f49b56df2dae8d817b04a306ae
34cba86
    assertions: {
        assertionID: 12
        referenceID: 10
        type: REVOKE
        statement: "P1 to P3 $0"
        transactonPart: "2/2"
    }
```

-continued

```
        signatures: {
            algorithm: "SHA256withRSA"
            url: "participantP3.com"
        }
    }
}
```

This message has the transactionPart (2/2) which indicates to P3 that this message completes the transaction. A very similar message is sent out to P4 as shown in the pseudo code below:

```
Proposal (P1 to P4): {
    transactionID: "68.61.66.164:113:1938487366027"
    entry ID: 125
    proposerURL: "participantP1.com"
    state: PROPOSED
    hash:
a7cf84d3d5eb9787d5fa7b31ce72076973dc896842223225cfc850
bec85f88fb
        assertions: {
            assertionID: 18
            referenceID: 12
            type: REVOKE
            statement: "P1 to P4 $0"
            transactonPart: "2/2"
        }
        signatures: {
            algorithm: "SHA256withRSA"
            url: "participantP4.com"
        }
    }
}
```

Note that no messages are sent out to the watcher (W2). Watchers do not need to sign on proposals; they only get the final confirmations. So at this juncture P1 has to turn around and propose the third party assertions prior to accepting the proposal as shown in the pseudo code below:

```
Proposal (P2 to P3): {
    transactionID: "68.61.66.164:113:1938487366027"
    entry ID: 703
    proposerURL: "participantP2.com"
    state: PROPOSED
    hash:
a1164be9e230d6861758d0c0bb3e400f9b9b99fa2139268c975fa6700
afe7dfe
        assertions: {
            assertionID: 45
            statement: "P2 to P3 $2.50"
            transactonPart: "1/2"
        }
        signatures: {
            algorithm: "SHA256withRSA"
            url: "participantP3.com"
        }
    }
Proposal (P2 to P4): {
    entry ID: 703
    proposerURL: "participantP2.com"
    state: PROPOSED
    hash:
6547c6cef348b9db71553952da613aa766f1ee67fb124b26d3366f9dd
b7f0d1a
        assertions: {
            assertionID: 54
            statement: "P2 to P4 $2.50"
            transactonPart: "1/2"
        }
}
```

```
        signatures: {
            algorithm: "SHA256withRSA"
            url: "participantP4.com"
        }
    }
}
```

So effectively in the third party brokering case, P1 proposes to P2, a third party transaction. To complete the transaction P2 forwards the proposal to P3 and P4 with the same transactionID and transactionPart as the initial proposal. This is key for reassembling the proposal at P3. What P3 then assembles back as a proposal for processing will have two entries, as shown in the pseudo code below:

```
Proposal (P2 to P3, P1 to P3): {
    transactionID: "68.61.66.164:113:1938487366027"
    entry ID: 703
    proposerURL: "participantP2.com"
    state: PROPOSED
    hash:
a1164be9e230d6861758d0c0bb3e400f9b9b99fa2139268c975fa6700
afe7dfe
        assertions: {
            assertionID: 45
            statement: "P2 to P3 $2.50"
            transactonPart: "1/2"
        }
        signatures: {
            algorithm: "SHA256withRSA"
            url: "participantP3.com"
        }
    },
    {
    transactionID: "68.61.66.164:113:1938487366027"
    entry ID: 125
    proposerURL: "participantP1.com"
    state: PROPOSED
    hash:
628d68a88fd6bbbf4930ecb5d279643f49b56df2dae8d817b04a306a
e34cba86
        assertions: {
            assertionID: 12
            referenceID: 10
            type: REVOKE
            statement: "P1 to P3 $0"
            transactonPart: "2/2"
        }
        signatures: {
            algorithm: "SHA256withRSA"
            url: "participantP3.com"
        }
    }
}
```

When P3 processes and signs the proposal as a whole the electronic ledger sends out two accept messages one to P1 and one to P2, as shown in the pseudo code below:

```
Accept (P3 to P2): {
    transactionID: "68.61.66.164:113:1938487366027"
    entry ID: 411
    counterparty Entry ID: 703
    state: ACCEPTED
    signatures: {
        signature:
4ed243ce5b610708f2baed2cbd5a04121c308536d35c0d9af7b4416e
74978908...
        url: "participantP3.com"
    }
}
```

```
Accept (P3 to P1){
    transactionID: "68.61.66.164:113:1938487366027"
    entry ID: 411
    counterparty Entry ID: 125
    state: ACCEPTED
    signatures: {
        signature:
505b68950d697845b75aace5a4348acf6f50e2488550b095273111c2
ede5bae7...
            url: "participantP3.com"
    }
}
```

The same sequence happens for P4. So when P2 gets all the acceptances it then turns around and countersigns the acceptance but sends it to P1. Here is what is sent back to P1 from P2 as shown in the pseudo code below:

```
Accept (P2 to P1, P3 to P2, P4 to P2): {
    transactionID: "68.61.66.164:113:1938487366027"
    entry ID: 700
    counterparty Entry ID: 125
    state: ACCEPTED
    signatures: {
        signature:
6f5c7874833c4cd4854f7381745a552e47dee9293639219e5ebc8c641
52f170e...
            url: "participantP2.com"
    }
},
{
    transactionID: "68.61.66.164:113:1938487366027"
    entry ID: 411
    counterparty Entry ID: 703
    proposerURL: "participantP2 .com"
    state: ACCEPTED
    hash:
a1164be9e230d6861758d0c0bb3e400f9b9b99fa2139268c975fa6700a
fe7dfe
    signatures: {
        signature:
4ed243ce5b610708f2baed2cbd5a04121c308536d35c0d9af7b4416e7
4978908...
            url: "participantP3.com"
    }
    signatures: {
        signature:
58dfaf11199b2d0b252632c90e9f8d58b626746623545af61fce748aa07
18806...
            url: "participantP2.com"
    }
},
{
    transactionID: "68.61.66.164:113:1938487366027"
    entry ID: 506
    counterparty Entry ID: 703
    proposerURL: "participantP2.com"
    state: ACCEPTED
    hash:
2c1e609c8c213eedbf3177d97ab07f785cf6314d88369bf1e49d49733
8f59a50
    signatures: {
        signature:
8eeb6a92334122f39ae25fe57e4e14717cc0938870a7edde15b9f9a32
9156054...
            url: "participantP4.com"
    }
    signatures: {
        signature:
467b80a3e0b40a8513e995aea4c9d5bc1673aa94e33959d8b2af989e4
7f37184...
            url: "participantP2.com"
    }
}
```

Compare this with the original proposal that was sent out to P2. It had two third party assertions. Thus this acceptance had two third party acceptances. P1 can recognize these acceptances because the proposerURL is not P1. The third party acceptances also contain the hash that originally submitted so that P1 can validate the signatures prior to sending out confirmations. We have to at this point stop and consider if P2 could cheat and falsify a signature. The answer is yes. All P2 has to do is take a previous hash and a signature and send it along and have P3 sign off on a completely different assertion. This should be caught in the confirm phase since P3 upon attempting to verify the signature P2 sent via P1, will fail. But in order to catch this early, P2 must include his/her signature along with P3 signature. That is why there are two signatures. Also recall that P1 has also received separate acceptances from P3 and P4 for the individual revocations. Assembling all this together—P1 acts like the transaction coordinator and sends the three confirmations back, one each to P2, P3, and P4 (although we did not list out the interactions with P4, one can imagine it to be the same as the interactions with P3) as shown in the pseudo code below:

```
Confirm (P1 to P2): {
    transactionID: "68.61.66.164:113:1938487366027"
    entry ID: 125
    counterparty Entry ID: 700
    state: CONFIRMED
    signatures: {
        vsignature:
e16ee09be0bc4a617639b6992594864584ab33b7 8cea7e48767f6da0d
39b7695...
            url: "participantP1.com"
    }
}
Confirm (P1 to P3): {
    transactionID: "68.61.66.164:113:1938487366027"
    entry ID: 125
    counterparty Entry ID: 411
    state: CONFIRMED
    signatures: {
        signature:
1c13a87b9ae2c55c7cfdc8418336d5a00b4894d337fc98d841201129eb
6b7b2d...
            url: "participantP1.com"
    },
},
{
    transactionID: "68.61.66.164:113:1938487366027"
    entry ID: 703
    counterparty Entry ID: 411
    state: CONFIRMED
    signatures: {
        signature:
58dfaf11199b2d0b252632c90e9f8d58b626746623545af61fce748aa0
718806...
            url: "participantP2.com"
    }
}
Confirm (P1 to P4): {
    transactionID: "68.61.66.164:113:1938487366027"
    entry ID: 125
    counterparty Entry ID: 454
    state: CONFIRMED
    signatures: {
        signature:
45262646e35886b47e04601b7af71dd34d23a82a65fad9e93f13352ffc
7efbe8...
            url: "participantP1.com"
    },
},
{
    transactionID: "68.61.66.164:113:1938487366027"
    entry ID: 641
    counterparty Entry ID: 411
    state: CONFIRMED
```

-continued

```
        signatures: {
            signature:
be90f896fd6a9428e555c615f3c3ece4fa669c5ca465d492367c84d397
e0fe82...
            url: "participantP2.com"
        }
    }
```

The watcher too gets a giant confirmation as shown in the pseudo code below:

```
        Confirm (P1 to P2, P1 to P3, P1 to P4, P2 to P3, P2 to P4): {
transactionID: "68.61.66.164:113:1938487366027"
entry ID: 125
counterparty Entry ID: 700
proposerURL: "participantP1.com"
state: CONFIRMED
hash:
7fcc1e1be0190ae2a93fcb7ce357a2865aecf8bdae22b50d8d9a456
926a6a671
assertions: {
assertionID: 25
referenceID: 23
            type: REVOKE
                statement: "P2 to P1 $0"
            }
        assertions: {
            assertionID: 26
            statement: "P2 to P3 $2.50"
            counterparty: "participantP3.com"
            transactonPart: "1/2"
            }
        assertions: {
            assertionID: 27
            statement: "P2 to P4 $2.50"
            counterparty: "participantP4.com"
            transactonPart: "1/2"
            }
        signatures: {
            algorithm: "SHA256withRSA"
            signature:
e16ee09be0bc4a617639b6992594864584ab33b78cea7e48767f6da0
d39b7695...
            url: "participantP1.com"
        }
        signatures: {
            algorithm: "SHA256withRSA"
            signature:
6f5c7874833c4cd4854f7381745a552e47dee9293639219e5ebc8c641
52f170e...
            url: "participantP2.com"
        }
    },
    {
        transactionID: "68.61.66.164:113:1938487366027"
        entry ID: 125
        counterparty Entry ID: 411
        proposerURL: "participantP1.com"
        state: CONFIRMED
        hash:
628d68a88fd6bbbf4930ecb5d279643f49b56df2dae8d817b04a306ae
34cba86
            assertions: {
                assertionID: 12
                referenceID: 10
                type: REVOKE
                statement: "P1 to P3 $0"
                transactonPart: "2/2"
            }
            signatures: {
                algorithm: "SHA256withRSA"
                signature:
1c13a87b9ae2c55c7cfdc8418336d5a00b4894d337fc98d8412011
29eb6b7b2d...
                url: "participantP1.com"
            },
            signatures: {
                algorithm: "SHA256withRSA"
                signature:
505b68950d697845b75aace5a4348acf6f50e2488550b0952731
11c2ede5bae7...
                url: "participantP3.com"
            }
    },
    {
        transactionID: "68.61.66.164:113:1938487366027"
        entry ID: 125
        counterpartyEntryID: 454
        proposerURL: "participantP1.com"
        state: CONFIRMED
        hash:
a7cf84d3d5eb9787d5fa7b31ce72076973dc896842223225cfc85
0bec85f88fb
            assertions: {
                assertionID: 18
                referenceID: 12
                type: REVOKE
                statement: "P1 to P4 $0"
                transactonPart: "2/2"
            }
            signatures: {
                algorithm: "SHA256withRSA"
                signature:
45262646e35886b47e04601b7af71dd34d23a82a65fad9e93f133
52ffc7efbe8...
                url: "participantP1.com"
            },
            signatures: {
                algorithm: "SHA256withRSA"
                signature:
27b110acd6078828dc0267b29835d48b9efe8b8e7cb28d6c5c776
730f465dd7f...
                url: "participantP4.com"
            }
    },
    {
        transactionID: "68.61.66.164:113:1938487366027"
        entry ID: 703
        counterparty Entry ID: 411
        proposerURL: "participantP2 .com"
        state: CONFIRMED
        hash:
a1164be9e230d6861758d0c0bb3e400f9b9b99fa2139268c975fa
6700afe7dfe
            assertions: {
                assertionID: 45
                statement: "P2 to P3 $2.50"
                transactonPart: "1/2"
            }
            signatures: {
                algorithm: "SHA256withRSA"
                signature:
4ed243ce5b610708f2baed2cbd5a04121c308536d35c0d9af7b4
416e74978908...
                url: "participantP3.com"
            },
            signatures: {
                algorithm: "SHA256withRSA"
                signature:
58dfaf11199b2d0b252632c90e9f8d58b626746623545af61fce7
48aa0718806...
                url: "participantP2.com"
            }
    },
    {
        transactionID: "68.61.66.164:113:1938487366027"
        entry ID: 703
        counterparty Entry ID: 514
        proposerURL: "participantP2.com"
        state: CONFIRMED
        hash:
f6eb72b66f84a0778ea41a6218bbdc45d8ca8bcb6a66269146353
55748ccf2fa
```

-continued

```
    assertions: {
      assertionID: 45
      statement: "P2 to P3 $2.50"
      transactonPart: "1/2"
    }
    signatures: {
      algorithm: "SHA256withRSA"
      signature:
6502218be977074a75da155cef37df37b671e4690fa2f3bdcb158
b7d1c200146...
      url: "participantP4.com"
    },
    signatures: {
      algorithm: "SHA256withRSA"
      signature:
b9d7991f73c9f65fe52aa3428c05e4b88163e2063790097366996df221
65e369...
      url: "participantP2.com"
    }
  }
```

While the BAM may be implemented using the BDL as described above, it will be appreciated that there may be other ways to implement the BAM. In particular, the BAM may be implemented using, for example, blockchain, using an off-blockchain/permissioned network, or using segregated blockchains. In particular, in order to implement BAM over Blockchain as embodied, for example, by Bitcoin, the system would need to be structured in one of the following ways:

1. Encrypted Data/Permissioned Network
   The fundamental premise of the blockchain is that all participants receive all transactions, therefore all transactions will need to be encrypted in such a way that only authorized parties, e.g. the bilateral parties, are able to decrypt the contents.
   A blockchain transaction would then, in one implementation, contain the following data:
   i. Encrypted transaction payload
   ii. Publicly verifiable cryptographic signatures of both parties
   iii. Shared secret for the payload encrypted to all parties, which should have the ability to access the contents.
   It will be appreciated that such an implementation may suffer capacity issues, as all transactions in their entirety would be distributed to all participants.
   Additionally if the encryption were to be broken or in any way, all previous transactions may be compromised ex post facto.

2. Off-Blockchain Data/Permissioned Network
   In such an implementation, only cryptographic signatures would be distributed over the blockchain. Transaction data would be communicated, i.e. negotiated and distributed, via a another medium, i.e. off the blockchain, thus preserving confidentiality. For example, separate channel of communications may be established between parties over the network, such as via virtual private network, or other secure and/or encapsulating protocol. Alternatively, an entirely different network medium may be used such as a wireless network or other wireless communication medium.
   The blockchain would thereby act as a witness and a mechanism to achieve irrefutability.

3. Segregated Blockchains
   A separate blockchain may be created for each bilateral party permutation, e.g. per partition, as defined above, with specialized gateways coordinating between the networks.

This solves confidentiality and anonymity issues, but may reduce irrefutability and immutability as such an implementation, with a small (2-3 in this case) number of participants, may be subject to fraudulent actions.

The above implementations may further require a sophisticated identity management system to provide the following features: Securely and privately certify participants (as in Know Your Customer ("KYC")); cryptographically signing single use transaction keys in a manner which can be used to verify authenticity of the participant without revealing their identity; and revoke certificates to evict compromised users from the system.

Alternatively, the BAM may also be implemented using a traditional database, such as an Oracle database wherein record level permissions are implemented to restrict record visibility only to interested parties, as described above, as well as remote triggering such that modifications made in a record by one party are communicated to a database of an interested party to effect the validation process as described above.

In one embodiment, the system 700 described above may be coupled with an external process and/or device, not shown, which monitors the portion of the shared data structure 304 for modifications thereto, such as for validated modifications, and implements actions based thereon. For example, in a financial implementation where the validated modification comprises an assertion of a debt to another party, the external process and/or device, upon determining that the assertion has been validated, acts in accordance therewith to cause funds to be transferred or disbursed in satisfaction of the debt. In one embodiment, the system 700 may provide an interface, such as an application program interface, via which other software and/or devices may access the shared data structure 304, such as to make queries, i.e. pull data from the shared data structure 304, or receive unsolicited data, updates or messages, i.e. data pushed from the shared data structure 304. These other software and/or devices may then implement further actions based on the receipt of data and/or the result of the query.

FIG. 10 shows an illustrative embodiment of a general computer system 1000 which may be used to implement the system of FIG. 4. FIG. 10 includes a bus 1002, a display 1004, a drive unit 1006, a computer readable medium 1008, instructions 1010, a connection to the internet and/or other networks 1020, a processor 1004, a network interface 1018, a user interface 1016, a memory 1012, and instructions 1010.

The computer system 1000 may include a set of instructions that may be executed to cause the computer system 1000 to perform any one or more of the methods or computer based functions disclosed herein. The computer system 1000 may operate as a standalone device or may be connected, e.g., using a network, to other computer systems or peripheral devices. Any of the components of the electronic trading system 100 discussed above may be a computer system 1000 or a component in the computer system 1000. The computer system 1000 may implement a match engine, margin processing, payment or clearing function on behalf of an exchange, such as the Chicago Mercantile Exchange, of which the disclosed embodiments are a component thereof.

In a networked deployment, the computer system 1000 may operate in the capacity of a server or as a client user computer in a client-server user network environment, as a peer computer system in a peer-to-peer (or distributed) network environment, or as a network device such as a switch, gateway or router. The computer system 1000 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1000 may be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1004, e.g., a central processing unit (CPU), a graphics processing unit (GPU), or both. The processor 1004 may be a component in a variety of systems. For example, the processor 1004 may be part of a standard personal computer or a workstation. The processor 1004 may be one or more general processors, digital signal processors, application specific integrated circuits, field programmable gate arrays, servers, networks, digital circuits, analog circuits, combinations thereof, or other now known or later developed devices for analyzing and processing data. The processor 1004 may implement a software program, such as code generated manually (i.e., programmed).

The computer system 1000 may include a memory 1012 that may communicate via a bus 1002. The memory 1012 may be a main memory, a static memory, or a dynamic memory. The memory 1012 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 1012 may be a memory component of a reconfigurable logic device, e.g. an FPGA. In one embodiment, the memory 1012 includes a cache or random access memory for the processor 1004. In alternative embodiments, the memory 1012 is separate from the processor 1004, such as a cache memory of a processor, the system memory, or other memory. The memory 1012 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1012 is operable to store instructions executable by the processor 1004. The functions, acts or tasks illustrated in the figures or described herein may be performed by the programmed processor 1004 executing the instructions 1010 stored in the memory 1012, or the instructions 1010 coupled with the processor 1004. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 1000 may further include a display unit 1014, such as a liquid crystal display (LCD), an organic light emitting diode (OLED), a flat panel display, a solid state display, a cathode ray tube (CRT), a projector, a printer or other now known or later developed display device for outputting determined information. The display 1014 may act as an interface for the user to see the functioning of the processor 1004, or specifically as an interface with the software stored in the memory 1012 or in the drive unit 1006.

In a particular embodiment, as depicted in FIG. 10, the computer system 1000 may also include a disk or optical drive unit 1006. The disk drive unit 1006 may include a computer-readable medium 1008 in which one or more sets of instructions 1010, e.g. software, may be embedded. Further, the instructions 1010, may embody one or more of the methods or logic as described herein. In a particular embodiment, the instructions 1010, may reside completely, or at least partially, within the memory 1012 and/or within the processor 1004 during execution by the computer system 1000. The memory 1012 and the processor 1004 also may include computer-readable media as discussed above.

The present disclosure contemplates a computer-readable medium that includes instructions 1010, or receives and executes instructions 1010, responsive to a propagated signal, so that a device connected to a network 1020 may communicate voice, video, audio, images or any other data over the network 1020. Further, the instructions 1010, may be transmitted or received over the network 1010, via a communication interface 1018. The communication interface 1018 may be a part of the processor 1004 or may be a separate component. The communication interface 1018 may be created in software or may be a physical connection in hardware. The communication interface 1018 is configured to connect with a network 1020, external media, the display 1014, or any other components in system 1000, or combinations thereof. The connection with the network 1020 may be a physical connection, such as a wired Ethernet connection or may be established wirelessly as discussed below. Likewise, the additional connections with other components of the system 1000 may be physical connections or may be established wirelessly.

The network 1020 may include wired networks, wireless networks, or combinations thereof. The wireless network may be a cellular telephone network, an 802.11, 802.16, 802.20, or WiMax network. Further, the network 1020 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium may be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these may not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this may not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above may not be understood as requiring such separation in all embodiments, and it may be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it may be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A system comprising:
   a user interface operative to receive one or more proposed transaction records, each comprising one of data indicative of data indicative of a rule or data indicative of an assertion, from a participant of a plurality of participants for storage in a shared data structure stored in a non-transitory memory;
   a network interface which facilitates communication of electronic data transaction messages comprising one or more proposed transaction records via an electronic communications network, each of the one or more proposed transaction records comprising one of data indicative of a rule or data indicative of an assertion, from other participants of a plurality of participants for storage in the shared data structure;
   a validation processor coupled with the user interface, the network interface and the non-transitory memory, the shared data structure including a first portion in which a set of core rules, including data validation rules used to initially operate the system, is stored and a second portion partitioned into one or more substrates for storing one or more transaction records at least one of which comprises data indicative of a previously validated rule and at least one other which comprises a validated assertion of one of the plurality of participants, wherein at least one rule of the set of core rules comprises a rule for communicating the proposed transaction record comprising data indicative of a rule to another participant of the plurality of participants via the electronic communications network and determining whether the other participant has accepted or rejected the rule, a rule for receiving the proposed transaction record comprising data indicative of a rule from another participant and determining whether to accept or reject that rule, and a rule for validating the proposed transaction record, or a combination thereof;

wherein, upon receipt by the validation processor of a proposed transaction record for storage in a substrate of the shared data structure from the participant via the user interface or from the other participant via the network interface, the received proposed transaction record including data specifying either which of the one or more substrates, or a new substrate to be created, in the shared data structure into which the received proposed transaction record is to be validated and stored and further including data indicative of one or more additional rules by which the validation processor must validate subsequently received proposed transaction records in addition to each of the set of core rules and the subset of the validated rules, the validation processor:

communicates the received proposed transaction record to at least a subset of the plurality of participants via the electronic communications network to solicit approval;

determines that at least the subset of the plurality of participants has approved the one or more additional rules;

validates the other proposed transaction record including the one or more additional rules in accordance with each of the set of core rules and at least a subset of the validated rules of the one or more stored transaction records; and stores the proposed transaction record in the specified substrate in response to the validation of the proposed transaction record, wherein the one or more additional rules are subsequently used to validate subsequently received proposed transaction records; and wherein the validation processor enables the electronic transaction processing system to determine consensus among the plurality of participants without the plurality of participants having to communicate independently of the electronic transaction processing system.

2. The system of claim 1, wherein, upon receipt by the validation processor of another proposed transaction record for storage in a substrate of the shared data structure from the participant via the user interface or from another participant via the network interface, the received other proposed transaction record including data specifying either which of the one or more substrates, or a new substrate to be created, in the shared data structure into which the received proposed transaction record is to be validated and stored and further including data indicative of a delegation rule which defines an action to be taken with respect to another substrate of the one or more substrates different from the substrate in which the other proposed transaction record is to be stored, the validation processor further:

validates the received other proposed transaction record in accordance with each of the set of core rules and at least a subset of the validated rules of the one or more stored transaction records; and applies the delegation rule and stores the received other proposed transaction record in the specified substrate in response to the validation.

3. The system of claim 2, wherein the delegation rule specifies a modification to one or more other substrates based upon validation of one or more proposed transaction records into the substrate comprising the delegation rule and/or another substrate.

4. The system of claim 1, wherein the non-transitory memory comprises a portion that is located remote from the validation processor, the validation processor being coupled with the remote portion of the non-transitory memory via the network interface and the electronic communications network.

5. The system of claim 1, wherein the shared data structure comprises a blockchain structure.

6. The system of claim 1, wherein the received proposed transaction record is digitally signed by the participant from which the received proposed transaction record originated.

7. The system of claim 1, wherein a content of the received proposed transaction record is encrypted.

8. The system of claim 1, wherein the received proposed transaction record comprises data indicative of a data transformation function, and further wherein the validation processor further receives the received proposed transaction record for storage in the shared data structure from the participant via the user interface or from the other participant via the network interface and transforms at least a portion of the received proposed transaction record in accordance with each of at least a subset of the validated data transformation functions of the one or more stored transaction records, wherein the validation processor further stores the transformed received proposed transaction record in the shared data structure when validated.

9. The system of claim 1, wherein a substrate of the one or more substrates is accessible only to a subset of the plurality of participants, the remainder of the plurality of participants not having access thereto.

10. The system of claim 1, wherein each of the one or more substrates stores different sets of associated transaction records.

11. The system of claim 10, wherein a substrate of the one or more substrates stores only transaction records comprising data indicative of assertions.

12. The system of claim 10, wherein a substrate of the one or more substrates stores only transaction records comprising data indicative of assertions of one participant.

13. The system of claim 10, wherein a substrate of the one or more substrates stores only transaction records comprising data indicative of rules.

14. The system of claim 1, wherein the one or more substrates comprises a hierarchical arrangement.

15. The system of claim 14, wherein the hierarchical arrangement comprises a Merkle tree.

16. The system of claim 1, wherein at least one of the set of core rules comprises a rule for communicating an invitation to participate to another participant via the electronic communications network and determining whether the other participant has accepted or rejected the invitation, a rule for receiving an invitation to participate from another participant and determining whether to accept or reject the invitation, or a combination thereof.

17. The system of claim 1, wherein at least one of the set of core rules comprises a rule for determining which of a subset of the plurality of participants is a leader participant.

18. The system of claim 1, wherein at least one of the set of core rules comprises a rule for validating the received proposed transaction record.

19. The system of claim 18, wherein the rule for validating the received proposed transaction record comprises a proof of work, a federated agreement, a Practical Byzantine Fault Tolerance, a RAFT or a combination thereof.

20. The system of claim 18, wherein the rule for validating the received proposed transaction record comprises solicitation of approval from at least a subset of the plurality of participants.

21. A computer implemented method comprising:
providing a user interface operative to receive one or more proposed transaction records, each comprising one of data indicative of data indicative of a rule or data indicative of an assertion, from a participant of a plurality of participants for storage in a shared data structure stored in a non-transitory memory, the shared data structure including a first portion in which a set of core rules, including data validation rules used to initially operate the system, is stored and a second portion partitioned into one or more substrates for storing one or more transaction records at least one of which comprises data indicative of a previously validated rule and at least one other which comprises a validated assertion of one of the plurality of participants, wherein at least one rule of the set of core rules comprises a rule for communicating the proposed transaction record comprising data indicative of a rule to another participant of the plurality of participants via the electronic communications network and determining whether the other participant has accepted or rejected the rule, a rule for receiving the proposed transaction record comprising data indicative of a rule from another participant and determining whether to accept or reject that rule, and a rule for validating the proposed transaction record, or a combination thereof;
providing a network interface which facilitates communication of electronic data transaction messages comprising one or more proposed transaction records via an electronic communications network, each of the one or more proposed transaction records comprising one of data indicative of a rule or data indicative of an assertion, from other participants of a plurality of participants for storage in the shared data structure;
receiving, by a validation processor, a proposed transaction record for storage in a substrate of the shared data structure from the participant via the user interface or from the other participant via the network interface, the received proposed transaction record including data specifying either which of the one or more substrates, or a new substrate to be created, in the shared data structure into which the received proposed transaction record is to be validated and stored and further including data indicative of one or more additional rules by which the validation processor must validate subsequently received proposed transaction records in addition to each of the set of core rules and the subset of the validated rules;
communicating, by the validation processor, the received proposed transaction record to at least a subset of the plurality of participants via the electronic communications network to solicit approval;
determining, by the validation processor, that at least the subset of the plurality of participants has approved the one or more additional rules;
validating, by the validation processor, the other proposed transaction record including the one or more additional rules in accordance with each of the set of core rules and at least a subset of the validated rules of the one or more stored transaction records; and
storing, by the validation processor, the proposed transaction record in the specified substrate in response to the validation of the proposed transaction record, wherein the one or more additional rules are subsequently used to validate subsequently received proposed transaction records; and
wherein the validation processor enables the electronic transaction processing system to determine consensus among the plurality of participants without the plurality of participants having to communicate independently of the electronic transaction processing system.

22. The computer implemented method of claim 21, further comprising receiving, by the validation processor, another proposed transaction record for storage in a substrate of the shared data structure from the participant via the user interface or from another participant via the network interface, the received other proposed transaction record including data specifying either which of the one or more substrates, or a new substrate to be created, in the shared data structure into which the received proposed transaction record is to be validated and stored and further including data indicative of a delegation rule which defines an action to be taken with respect to another substrate of the one or more substrates different from the substrate in which the other proposed transaction record is to be stored;
validating, by the validation processor, the received other proposed transaction record in accordance with each of the set of core rules and at least a subset of the validated rules of the one or more stored transaction records; and
applying, by the validation processor, the delegation rule and storing the received other proposed transaction record in the specified substrate in response to the validation.

23. The computer implemented method of claim 22, wherein the delegation rule specifies a modification to one or more other substrates based upon validation of one or more proposed transaction records into the substrate comprising the delegation rule and/or another substrate of the one or more substrates.

24. The computer implemented method of claim 21, wherein the shared data structure comprises a blockchain structure.

25. The computer implemented method of claim 21, wherein the received proposed transaction record is digitally signed by the participant from which the received proposed transaction record originated.

26. The computer implemented method of claim 21, wherein a content of the received proposed transaction record is encrypted.

27. The computer implemented method of claim 21, wherein the received proposed transaction record comprises data indicative of a data transformation function, and further wherein subsequent to receiving the received proposed transaction record for storage in the non-transitory memory from the participant via the user interface from the other participant via the network interface, the validating further comprises transforming at least a portion of the received proposed transaction record in accordance with each of at least a subset of the validated data transformation functions of the one or more stored transaction records, the validating further comprising storing the transformed received transaction record in the determined substrate when validated.

28. The computer implemented method of claim 21, wherein a substrate of the one or more substrates is accessible only to a subset of the plurality of participants, the remainder of the plurality of participants not having access thereto.

29. The computer implemented method of claim 21, wherein each of the one or more substrates stores different sets of associated transaction records.

30. The computer implemented method of claim 29, wherein a substrate of the one or more substrates stores only transaction records comprising data indicative of assertions.

31. The computer implemented method of claim 29, wherein a substrate of the one or more substrates stores only transaction records comprising data indicative of assertions of one participant.

32. The computer implemented method of claim 29, wherein a substrate of the one or more substrates stores only transaction records comprising data indicative of rules.

33. The computer implemented method of claim 21, wherein the one or more substrates comprises a hierarchical arrangement.

34. The computer implemented method of claim 33, wherein the hierarchical arrangement comprises a Merkle tree.

35. The computer implemented method of claim 21, wherein at least one of the set of core rules comprises a rule for communicating an invitation to participate to another participant via the electronic communications network and determining whether the other participant has accepted or rejected the invitation, a rule for receiving an invitation to participate from another participant and determining whether to accept or reject the invitation, or a combination thereof.

36. The computer implemented method of claim 21, wherein at least one of the set of core rules comprises a rule for determining which of a subset of the plurality of participants is a leader participant.

37. The computer implemented method of claim 21, wherein at least one of the set of core rules comprises a rule for validating the proposed transaction record.

38. The computer implemented method of claim 37, wherein the rule for validating the proposed transaction record comprises a proof of work, a federated agreement, a Practical Byzantine Fault Tolerance, a RAFT or a combination thereof.

39. The computer implemented method of claim 37, wherein the rule for validating the proposed transaction record comprises solicitation of approval from at least a subset of the plurality of participants.

40. A system comprising:
   means for receiving one or more proposed transaction records, each comprising one of data indicative of data indicative of a rule or data indicative of an assertion, from a participant of a plurality of participants for storage in a shared data structure stored in a non-transitory memory, the shared data structure including a first portion in which a set of core rules, including data validation rules used to initially operate the system, is stored and a second portion partitioned into one or more substrates for storing one or more transaction records at least one of which comprises data indicative of a previously validated rule and at least one other which comprises a validated assertion of one of the plurality of participants, wherein at least one rule of the set of core rules comprises a rule for communicating the proposed transaction record comprising data indicative of a rule to another participant of the plurality of participants via the electronic communications network and determining whether the other participant has accepted or rejected the rule, a rule for receiving the proposed transaction record comprising data indicative of a rule from another participant and determining whether to accept or reject that rule, and a rule for validating the proposed transaction record, or a combination thereof;
   means for communicating electronic data transaction messages comprising one or more proposed transaction records via an electronic communications network, each of the one or more proposed transaction records comprising one of data indicative of a rule or data indicative of an assertion, from other participants of a plurality of participants for storage in the shared data structure;
   means for receiving a proposed transaction record for storage in a substrate of the shared data structure from the participant via the user interface or from the other participant via the network interface, the received proposed transaction record including data specifying either which of the one or more substrates, or a new substrate to be created, in the shared data structure into which the received proposed transaction record is to be validated and stored and further including data indicative of one or more additional rules by which the validation processor must validate subsequently received proposed transaction records in addition to each of the set of core rules and the subset of the validated rules;
   means for communicating the received proposed transaction record to at least a subset of the plurality of participants via the electronic communications network to solicit approval;
   means for determining that at least the subset of the plurality of participants has approved the one or more additional rules;
   means for validating the other proposed transaction record including the one or more additional rules in accordance with each of the set of core rules and at least a subset of the validated rules of the one or more stored transaction records; and
   means for storing the proposed transaction record in the specified substrate in response to the validation of the proposed transaction record, wherein the one or more additional rules are subsequently used to validate subsequently received proposed transaction records; and
   wherein the determination of consensus among the plurality of participants is electronically enabled without the plurality of participants having to communicate independently of the electronic transaction processing system.

* * * * *